United States Patent
Burshtain et al.

(10) Patent No.: US 10,424,814 B2
(45) Date of Patent: Sep. 24, 2019

(54) INTRODUCING A MOBILE LAYER OF IONIC LIQUID INTO ELECTROLYTES OF LITHIUM ION BATTERIES

(71) Applicant: StoreDot Ltd., Herzeliya (IL)

(72) Inventors: Doron Burshtain, Herzliya (IL); Nir Kedem, Haifa (IL); Daniel Aronov, Netanya (IL)

(73) Assignee: Storedot Ltd., Herzeliya (IL)

( * ) Notice: Subject to any disclaimer, the term of this patent is extended or adjusted under 35 U.S.C. 154(b) by 0 days.

(21) Appl. No.: 16/013,969

(22) Filed: Jun. 21, 2018

(65) Prior Publication Data

US 2018/0301757 A1   Oct. 18, 2018

Related U.S. Application Data

(63) Continuation of application No. 15/447,889, filed on Mar. 2, 2017, now Pat. No. 10,096,859.

(Continued)

(51) Int. Cl.
*H01M 10/0567* (2010.01)
*H01M 10/0525* (2010.01)
(Continued)

(52) U.S. Cl.
CPC ....... *H01M 10/0567* (2013.01); *H01M 4/366* (2013.01); *H01M 4/38* (2013.01);
(Continued)

(58) Field of Classification Search
None
See application file for complete search history.

(56) References Cited

U.S. PATENT DOCUMENTS 3,778,254 A   12/1973   Cole et al.
6,051,340 A   4/2000   Kawakami et al.
(Continued)

FOREIGN PATENT DOCUMENTS

CA   2161076   4/1996
CA   2258026   12/1997
(Continued)

OTHER PUBLICATIONS

Lewandowski, et al., Ionic liquids as electrolytes for Li-ion batteries—An overview of electrochemical studies, J. Power Sources, 194, 601-609 (Year: 2009).*

(Continued)

*Primary Examiner* — Daniel S Gatewood
(74) *Attorney, Agent, or Firm* — Pearl Cohen Zedek Latzer Baratz LLP

(57) ABSTRACT

Electrolytes, anodes, lithium ion cells and methods are provided for preventing lithium metallization in lithium ion batteries to enhance their safety. Electrolytes comprise up to 20% ionic liquid additives which form a mobile solid electrolyte interface during charging of the cell and prevent lithium metallization and electrolyte decomposition on the anode while maintaining the lithium ion mobility at a level which enables fast charging of the batteries. Anodes are typically metalloid-based, for example include silicon, germanium, tin and/or aluminum. A surface layer on the anode bonds, at least some of the ionic liquid additive to form an immobilized layer that provides further protection at the interface between the anode and the electrolyte, prevents metallization of lithium on the former and decomposition of the latter.

37 Claims, 18 Drawing Sheets

Related U.S. Application Data

(60) Provisional application No. 62/441,458, filed on Jan. 2, 2017, provisional application No. 62/435,783, filed on Dec. 18, 2016, provisional application No. 62/427,856, filed on Nov. 30, 2016, provisional application No. 62/426,625, filed on Nov. 28, 2016, provisional application No. 62/421,290, filed on Nov. 13, 2016, provisional application No. 62/401,635, filed on Sep. 29, 2016, provisional application No. 62/401,214, filed on Sep. 29, 2016, provisional application No. 62/371,874, filed on Aug. 8, 2016, provisional application No. 62/337,416, filed on May 17, 2016, provisional application No. 62/319,341, filed on Apr. 7, 2016.

(51) Int. Cl.
*H01M 4/38* (2006.01)
*H01M 4/36* (2006.01)
*H01M 4/58* (2010.01)
*H01M 4/587* (2010.01)
*H01M 4/60* (2006.01)

(52) U.S. Cl.
CPC .............. *H01M 4/58* (2013.01); *H01M 4/587* (2013.01); *H01M 4/5815* (2013.01); *H01M 4/602* (2013.01); *H01M 10/0525* (2013.01)

(56) References Cited

U.S. PATENT DOCUMENTS

| | | |
|---|---|---|
| 6,492,061 B1 | 12/2002 | Gauthier et al. |
| 6,541,156 B1 | 4/2003 | Fuse et al. |
| 6,558,438 B1 | 5/2003 | Satoh et al. |
| 6,599,662 B1 | 7/2003 | Chiang et al. |
| 7,192,673 B1 | 3/2007 | Ikeda et al. |
| 7,906,238 B2 | 3/2011 | Le |
| 8,021,791 B1 | 9/2011 | Plichta |
| 8,945,774 B2 | 2/2015 | Coowar et al. |
| 9,406,927 B1 | 2/2016 | Burshtain et al. |
| 9,472,804 B2 | 10/2016 | Burhstain et al. |
| 9,583,761 B2 | 2/2017 | Burshtain et al. |
| 9,728,776 B2 | 8/2017 | Burshtain et al. |
| 9,871,247 B2 | 1/2018 | Burshtain et al. |
| 2002/0122980 A1 | 9/2002 | Fleischer et al. |
| 2002/0146623 A1 | 10/2002 | Suzuki et al. |
| 2003/0039889 A1 | 2/2003 | Park et al. |
| 2004/0033360 A1 | 2/2004 | Armand et al. |
| 2004/0219428 A1 | 11/2004 | Nagayama |
| 2005/0019659 A1 | 1/2005 | Shiozaki et al. |
| 2007/0281216 A1 | 12/2007 | Petrat et al. |
| 2007/0284159 A1 | 12/2007 | Takami et al. |
| 2009/0111020 A1 | 4/2009 | Yamaguchi et al. |
| 2009/0179181 A1 | 7/2009 | Zhang et al. |
| 2009/0317637 A1 | 12/2009 | Luhrs et al. |
| 2010/0159331 A1 | 6/2010 | Lee et al. |
| 2010/0190059 A1 | 7/2010 | Graetz et al. |
| 2011/0257001 A1 | 10/2011 | Negishi |
| 2012/0045696 A1 | 2/2012 | Herle |
| 2012/0088155 A1 | 4/2012 | Yushin et al. |
| 2012/0164531 A1 | 6/2012 | Chen et al. |
| 2013/0040226 A1 | 2/2013 | Yamauchi et al. |
| 2013/0059174 A1 | 3/2013 | Zhamu |
| 2013/0071731 A1 | 3/2013 | Tokuda et al. |
| 2013/0224594 A1 | 8/2013 | Yushin et al. |
| 2013/0260285 A1 | 10/2013 | Yamauchi et al. |
| 2013/0266875 A1 | 10/2013 | Matsumoto et al. |
| 2013/0337314 A1 | 12/2013 | Essaki et al. |
| 2014/0113202 A1* | 4/2014 | Sun ............... H01M 10/052 429/328 |
| 2014/0127588 A1 | 5/2014 | Kato et al. |
| 2014/0295267 A1 | 10/2014 | Wang |
| 2015/0017515 A1 | 1/2015 | Jeon et al. |
| 2015/0046110 A1 | 2/2015 | Joe et al. |
| 2015/0221977 A1 | 8/2015 | Hallac et al. |
| 2016/0036045 A1 | 2/2016 | Burshtain et al. |
| 2016/0064773 A1 | 3/2016 | Choi et al. |
| 2016/0149220 A1 | 5/2016 | Uhm et al. |
| 2016/0264124 A1 | 9/2016 | Hotta |
| 2016/0372753 A1 | 12/2016 | Fukasawa et al. |
| 2017/0012279 A1 | 1/2017 | Burshtain et al. |
| 2017/0207451 A1 | 7/2017 | Burshtain et al. |
| 2017/0288232 A1 | 10/2017 | Herle |
| 2017/0288271 A1 | 10/2017 | Le |
| 2017/0294643 A1 | 10/2017 | Burshtain et al. |
| 2017/0294644 A1 | 10/2017 | Burshtain et al. |
| 2017/0294648 A1 | 10/2017 | Burshtain et al. |
| 2017/0294649 A1 | 10/2017 | Burshtain et al. |
| 2017/0294680 A1 | 10/2017 | Burshtain et al. |
| 2017/0294681 A1 | 10/2017 | Burshtain et al. |
| 2017/0294687 A1 | 10/2017 | Burshtain et al. |
| 2018/0050602 A1 | 2/2018 | Aronov |
| 2018/0108937 A1 | 4/2018 | Drach et al. |
| 2018/0175634 A1 | 6/2018 | Aronov |
| 2018/0212236 A1 | 7/2018 | Jacob et al. |
| 2018/0212239 A1 | 7/2018 | Jacob et al. |
| 2018/0212240 A1 | 7/2018 | Jacob et al. |
| 2018/0212439 A1 | 7/2018 | Aronov |

FOREIGN PATENT DOCUMENTS

| | | |
|---|---|---|
| CN | 101734675 | 6/2010 |
| CN | 104577081 | 4/2015 |
| EP | 1999818 | 10/2008 |
| EP | 2889097 | 1/2015 |
| JP | 2002-056891 | 2/2002 |
| JP | 2006-216276 | 8/2006 |
| JP | 2007-323837 | 12/2007 |
| JP | 2012/131674 | 7/2012 |
| JP | 2012-131674 A | 7/2012 |
| JP | 2014-002834 | 1/2014 |
| KR | 20120121265 | 11/2013 |
| TW | 200616268 | 5/2006 |
| WO | WO 2013/040356 | 3/2013 |
| WO | WO 2014/068036 | 5/2014 |
| WO | WO 2015/016563 | 2/2015 |
| WO | WO 2015/145521 | 10/2015 |
| WO | WO 2016/031082 | 3/2016 |
| WO | WO 2018/109774 | 6/2018 |

OTHER PUBLICATIONS

U.S. Appl. No. 62/371,874, filed Aug. 8, 2016, Burshtain.
U.S. Appl. No. 62/401,635, filed Sep. 29, 2016, Kedem et al.
U.S. Appl. No. 62/421,290, filed Nov. 13, 2016, Burshtain.
U.S. Appl. No. 62/426,625, filed Nov. 28, 2016, Burshtain et al.
U.S. Appl. No. 62/319,341, filed Apr. 7, 2016, Burshtain.
U.S. Appl. No. 62/337,416, filed May 16, 2016, Burshtain.
U.S. Appl. No. 62/401,214, filed Sep. 29, 2016, Burshtain.
U.S. Appl. No. 62/427,856, filed Nov. 30, 2016, Burshtain et al.
U.S. Appl. No. 62/482,450, filed Apr. 6, 2017, Drach et al.
U.S. Appl. No. 16/013,969, filed Jun. 21, 2018, Burshtain et al.
Jankovski et al. "New boron based salts for lithium-ion batteries using conjugated ligands", Physical Chemistry Chemical Physics, May 19, 2016, vol. 18, pp. 16274-16280.
Chaudhuri et al. "Core/shell nanoparticles: classes, properties, synthesis mechanisms, characterization, and applications", Chemical Reviews, vol. 112, No. 4, pp. 2373-2433, 2012.
Qi et al. "Lithium Concentration Dependent Elastic Properties of Battery Electrode Materials from First Principles Calculations", Journal of the Electrochemical Society, 2014, vol. 161, No. 11, pp. F3010-F3018.
Aurbach et al. "A short review of failure mechanisms of lithium metal and lithiated graphite anodes in liquid electrolyte solutions", Solid State Ionics, 2002, vol. 148, pp. 405-416.
Xu et al. "Reversible Conversion of Conducting Polymer Films from Superhydrophobic to Superhydrophilic", Angewandte Chemie, 2005, vol. 44, pp. 6009-6012.
Byeon "Multifunctional metal-polymer nanoagglomerates from singlepass aerosol self-assembly", Scientific Reports, Aug. 10, 2016, pp. 1-8.

(56) References Cited

OTHER PUBLICATIONS

Dhawan et al. "Development of Highly Hydrophobic and Anticorrosive Conducting Polymer Composite Coating for Corrosion Protection in Marine Environment", American Journal of Polymer Science, 2015, vol. 5, No. 1A, pp. 7-17.
Maoz et al. "Site-Targeted Interfacial Solid-Phase Chemistry: Surface Functionalization of Organic Monolayers via Chemical Transformations Locally Induced at the Boundary between Two Solids", Angewandte Chemie, 2016, vol. 55, pp. 12366-12371.
Molino et al. "Hydrophobic conducting polymer films from post deposition thiol exposure", Synthetic Metals 162, 2012, pp. 1464-1470.
Skameche et al. "Electrodeposition, electrochemical and optical properties of poly(3-cylopropylmethylpyrrole), a new, hydrophobic, conducting polymer film", American Institute of Physics, 1996, vol. 354, No. 75, pp. 75-81.
Zhao et al. "Artificial Solid Electrolyte Interphase-Protected LixSi Nanoparticles: An Efficient and Stable Prelithiation Reagent for Lithium-Ion Batteries", Journal of the American Chemical Society, Jun. 19, 2015, vol. 137, No. 75, pp. 8372-8375.
Gay et al. "Performance Characteristics of Solid Lithium-Aluminium Alloy Electrodes", Journal of the Electrochemical Society, Nov. 1976, vol. 123, No. 11, pp. 1591-1596.
Li et al. "High-rate aluminium yolk-shell nanoparticle anode for Li-ion battery with long cycle life and ultrahigh capacity" Nature Communications, Aug. 5, 2015, pp. 1-7.
Wen et al. "Thermodynamic and Mass Transport Properties of "LiAl"", Solid-State Science and Technology, Dec. 1979, vol. 126, No. 12, pp. 2258-2266.
Qi et al. "Threefold Increase in the Young's Modulus of Graphite Negative Electrode during Lithium Intercalation", Journal of the Electrochemical Society, 2010, vol. 157, No. 5, pp. A558-A566.
Son et al. "Silicon carbide-free graphene growth on silicon for lithium-ion battery with high volumetric energy density", Nature Communications, Jun. 25, 2015, vol. 6, No. 7393, pp. 1-8.
Tow et al. "A Study of Highly Oriented Pyrolytic Graphite as a Model for the Graphite Anode in Li-Ion Batteries", Journal of the Electrochemical Society, 1999, vol. 146, No. 3, pp. 824-832.
Wu et al. "Stable Li-ion battery anodes by in-situ polymerization of conducting hydrogel to conformally coat silicon nanoparticles", Nature Communications, Jun. 4, 2013, vol. 4, No. 1943, pp. 1-6.
Sun et al. "Silicon/Wolfram Carbide@Graphene composite: enhancing conductivity and structure stability in amorphous-silicon for high lithium storage performance", Electrochimica Acta, Jun. 25, 2016, vol. 191, pp. 462-472.
Guriparti et al. "Review on recent progress of nanostructured anode materials for Li-ion batteries", Journal of Power Sources, 2014, vol. 257, pp. 421-443.
Scott et al. "Ultrathin Coatings on Nano-LiCoO2 for Li-Ion Vehicular Applications", Nano Letters, 2011, vol. 11, pp. 414-418.
Cho et al. "Zero-Strain Intercalation Cathode for Rechargeable Li-Ion Cell", Angewandte Chemie, 2001, vol. 40, No. 18, pp. 3367-3369.
Ngo et al. "Mass-scalable synthesis of 30 porous germanium-carbon composite particles as an ultra-high rate anode for lithium ion batteries", Energy & Environmental Science, 2015, vol. 8, pp. 3577-3588.
Chen et al. "Conductive Rigid Skeleton Supported Silicon as High-Performance Li-Ion Battery Anodes", Nano Letters, 2012, vol. 12, pp. 4124-4130.
Kim et al. "Electrochemical properties of carbon-coated Si/B composite anode for lithium ion batteries", Journal of Power Sources, 2009, vol. 189, pp. 108-113.
He et al. "Gassing in Li4Ti5O12-based batteries and its remedy", Scientific Reports, Dec. 3, 2012, vol. 2, No. 913, pp. 1-9.
Scharner et al. "Evidence of Two-Phase Formation upon Lithium Insertion into the Li1.33Ti1.67O4 Spinel", Journal of the Electrochemical Society, 1999, vol. 146, No. 3, pp. 857-861.
Doughty et al. "A General Discussion of Li Ion Battery Safety", The Electrochemical Society Interface, 2012, pp. 37-44.

Wang et al. "Boron-doped carbon nanotube-supported Pt nanoparticles with improved CO tolerance for methanol electro-oxidation", Phys. Chem. Chem. Phys., 2012, vol. 14, pp. 13910-13913.
Liu, et al. "A pomegranate-inspired nanoscale design for large-volume-change lithium battery anodes", Nature Nanotechnology, Mar. 2014, vol. 9, pp. 187-192.
Tao et al. "Hollow core-shell structured Si/C nanocomposites as high-performance anode materials for lithium-ion batteries", Nanoscale, 2014, vol. 6, pp. 3138-3142.
Song et al. "Is Li4Ti5O12 a solid-electrolyte-interphase-free electrode material in Li-ion batteries? Reactivity between the Li4Ti5O12 electrode and electrolyte", Journal of Materials Chemistry A, 2014, vol. 2, pp. 631-636.
He et al. "Effect of solid electrolyte interface (SEI) film on cyclic performance of Li4Ti5O12 anodes for Li ion batteries", Journal of Power Sources, 2013, vol. 239, pp. 269-276.
Chung et al. "Electronically conductive phospho-olivines as lithium storage electrodes", nature materials, Oct. 22, 2002, vol. 1, pp. 123-128.
Kennedy et al. "Nanowire Heterostructures Comprising Germanium Stems and Silicon Branches as High-Capacity Li-Ion Anodes with Tunable Rate Capability", ACS Nano, Jun. 30, 2015, vol. 9, No. 7, pp. 7456-7465.
Wu et al. "Hydrogen Storage in Pillared Li-Dispersed Boron Carbide Nanotubes", J. Phys. Chem. C, 2008, vol. 112, No. 22, pp. 8458-8463.
Secrist "Compound Formation in the Systems Lithium-Carbon and Lithium-Boron", Journal of the American Ceramic Society, Oct. 1967, vol. 50, No. 10, pp. 520-523.
Suzuki et al. "Silicon nitride thin film electrode for lithium-ion batteries", Journal of Power Sources, 2013, vol. 231, pp. 186-189.
Cui et al. "Carbon-Silicon Core-Shell Nanowires as High Capacity Electrode for Lithium Ion Batteries", Nano Letters, May 8, 2009, vol. 9, No. 9, pp. 3370-3374.
Wang et al. "The dimensionality of Sn anodes in Li-ion batteries", materialstoday, Dec. 2012, vol. 15, No. 12, pp. 544-552.
Bhandavat et al. "Improved Electrochemical Capacity of Precursor-Derived Si(B)Cn-Carbon Nanotube Composite as Li-Ion Battery Anode", ACS Applied Materials & Interfaces, Oct. 2, 2012, vol. 4, pp. 5092-5097.
Hu et al. "Silicon/graphene based nanocomposite anode: large-scale production and stable high capacity for lithium ion batteries", Journal of Materials Chemistry A, 2014, vol. 2, No. 9118, pp. 9118-9125.
Konno et al. "Application of Si—C—O glass-like compounds as negative electrode materials for lithium hybrid capacitors", Journal of Power Sources, 2009, vol. 191, pp. 623-627.
Bhandavat et al. "Synthesis, Characterization, and High Temperature Stability of Si(B) Cn-Coated Carbon Nanotubes Using a Boron-Modified Poly(ureamethylvinyl)Silazane Chemistry", Journal of the American Ceramic Society, 2012, vol. 95, No. 5, pp. 1536-1543.
Nowotny et al. "Investigations in the three systems: Molybdenum-Silicon-boron, tungsten-Silicon-boron and in which System: VS12—TaSi2", MB. Chem., 1956, vol. 88, No. 2, pp. 179-182.
Yom et al. "Improved electrochemical behavior of Tungsten Coated Silicon Monoxide-Carbon composite anode in lithium ion battery", Abstract #1041, The Electrochemical Society 224th ECS Meeting, Oct. 27-Nov. 1, 2013.
Kasavajjula et al. "Nano- and bulk-silicon-based insertion anodes for lithium-ion secondary cells", Journal of Power Sources, 2007, Vo. 163, pp. 1003-1039.
Kennedy et al. "High-Performance Germanium Nanowire-Based Lithium-Ion Battery Anodes Extending over 1000 Cycles Through in Situ Formation of a Continuous Porous Network", Nano Letters, 2014, vol. 14, pp. 716-723.
Nitta et al. "High-Capacity Anode Materials for Lithium-Ion Batteries: Choice of Elements and Structures for Active Particles", Particle Systems Characterization, 2014, vol. 31, pp. 317-336.
Hwang et al. "Mesoporous Ge/Ge02/Carbon Lithium-Ion Battery Anodes with High Capacity and High Reversibility", ACS Nano, Apr. 13, 2015, vol. 9, No. 5, pp. 5299-5309.

(56) References Cited

OTHER PUBLICATIONS

Balomenos et al. "Exergy Analysis of Metal Oxide Carbothemic Reduction under Vacuum—Sustainability prospects", International Journal of Thermodynamics, Jun. 4, 2012, vol. 15, No. 3, pp. 141-148.
Barton et al. "The Reduction of Germanium Dioxide With Graphite at High Temperatures", Journal of the Less-Common Metals, 1970, vol. 22, pp. 11-17.
Billaud et al. "Synthesis and electrical resistivity of lithium-pyrographite intercalation compounds (stages I, II and III)", *Materials Research Bulletin*, Jul. 1979, vol. 14, No. 7, pp. 857-864.
Kyotani et al. "Remarkable performance improvement of inexpensive ball-milled Si nanoparticles by carbon-coating for Li-ion batteries", *Journal of Power Sources*, Jul. 1, 2016, vol. 319, pp. 99-103.
E. McRae and J.F. Mareche "Stage dependence of the electrical resistivity of graphite intercalation compounds" *Journal of Physics C: Solid State Physics*, vol. 18, No. 8 , Apr. 5, 1983, pp. 1627-1640, Lab. de Chimie du Solide Miner., Nancy Univ., Vandoeuvre, France.
Takatoshi Kasukabe et al. "Beads-Milling of Waste Si Sawdust into High-Performance Nanoflakes for Lithium-Ion Batteries" *Sci Rep.* 2017; 7: 42734. Published online Feb. 20, 2017.
Yongxin An et al. "Effects of VC-LiBOB binary additives on SEI formation in ionic liquid-organic composite electrolyte" RSC Advances, 2012, 2, Received Nov. 6, 2011, Accepted Feb. 21, 2012, pp. 4097-4102
Aaron M. Chockla "Tin-Seeded Silicon Nanowires for High Capacity Li-Ion Batteries" Department of Chemical Engineering, Texas Materials Institute, Center for Nano- and Molecular Science and Technology,The University of Texas at Austin, Austin, Texas 78712-1062, United States, pp. 3738-3745, Published: Sep. 11, 2012.
Yong-Mao Lin et al."High performance silicon nanoparticle anode in fluoroethylene carbonate-based electrolyte for Li-ion batteriesw" Chem. Commun., 2012, 48, Received Mar. 7, 2012, Accepted May 28, 2012, pp. 7268-7270.
*Rosa Martel Danoary Tsirinomeny* "Contribution to the Ultra-Fast Charging of Electric Vehicles: The Configurable Modular Multi-level Converter (CMMC)" Mots-clés de l'auteur: Ultra-fast; lithium-titanate; UFCEV; CMMC; Flex-EV. Mar. 4, 2016.
Aldrich (Sigma-Aldrich MSDS Lithium hexafluorophosphate {http://www.sigmaaldrich.com/MSDS/MSDS/DisplayMSDSPage.do?country=US&language=en&productNumber=450227&brand=ALDRICH{ Printed Dec. 19, 2017).
Millipore (MSDS 1-Butyl-1-methylpyrrolidinium bis(trifluoromethylsulfonyl)imide high purity {http://www.emdmillipore.com/Web-US-Site/en_CA/-/USD/ProcessMSDS-Start?PlainSKU=MDA_CHEM-492046&Origin=PDF{ date Nov. 4, 2014).
Lewandowski et al. "Ionic liquids as electrolytes for Li-ion batteries—An overview of electrochemical studies", Journal of Power Sources, vol. 194, 2009, pp. 601-609.
Buzzeo et al. "Non-Haloaluminate Room-Temperature Ionic Liquids in Electrochemistry—A Review", ChemPhysChem, 2004, vol. 5, pp. 1106-1120.

Moreno et al. "Ionic Liquid Electrolytes for Safer Lithium Batteries", Journal of the Electrochemical Society, vol. 164, No. 1, 2017, pp. A6026-A6031.
Yao et al. "Ethylene carbonate-free fluoroethylene carbonate-based electrolyte works better for freestanding Si-based composite paper anodes for Li-ion batteries", Journal of Power Sources 381, 2018, pp. 164-170.
Li et al. "Progress in electrolytes for rechargeable Li-based batteries and beyond", Green Energy & Environment, vol. 1, Issue 1, pp. 18-42, Apr. 2016.
U.S. Office Action for U.S. Appl. No. 15/447,889 dated Jul. 17, 2017.
U.S. Final Office Action for U.S. Appl. No. 15/447,889 dated Oct. 23, 2017.
U.S. Office Action for U.S. Appl. No. 15/447,889 dated Dec. 22, 2017.
U.S. Office Action for U.S. Appl. No. 15/783,586, dated Apr. 6, 2018.
European Search Report for Application No. EP17206661.5, dated Apr. 16, 2018.
U.S. Final Office Action for U.S. Appl. No. 15/447,889, dated May 24, 2018.
Non-final office action of U.S. Appl. No. 15/844,689, dated Jan. 31, 2018.
Non-final office action of U.S. Appl. No. 15/853,885, dated Feb. 23, 2018.
Final office action of U.S. Appl. No. 15/414,655, dated Aug. 14, 2017.
Office action of U.S. Appl. No. 14/926,012, dated Apr. 21, 2016.
Office action of U.S. Appl. No. 14/813,499, dated Mar. 10, 2017.
Office action of U.S. Appl. No. 15/480,888, dated Jul. 5, 2017.
International Search Report of PCT Application No. PCT/IL2017/050424, dated Jul. 13, 2017.
Office action of U.S. Appl. No. 15/480,919, dated Jul. 5, 2017.
Office action of U.S. Appl. No. 15/447,889, dated Jul. 17, 2017.
Office action of U.S. Appl. No. 15/447,784, dated Jun. 22, 2017.
Office action of U.S. Appl. No. 15/414,655, dated May 9, 2017.
Office action of U.S. Appl. No. 15/263,399, dated Nov. 14, 2016.
Office Action for U.S. Appl. No. 15/447,784, dated Jun. 22, 2017.
Office Action for U.S. Appl. No. 15/447,784, dated Dec. 28, 2017.
U.S. Appl. No. 16/243,190, filed Jan. 9, 2019, Kuks et al.
Office Action for U.S. Appl. No. 16/254,644, dated Mar. 1, 2019.
Notice of Allowance for U.S. Appl. No. 16/258,728, dated Mar. 6, 2019.
Office Action for U.S. Appl. No. 15/853,885, dated Jan. 10, 2019.
Notice of Allowance for U.S. Appl. No. 15/783,586, dated Jan. 25, 2019.
Office Action for CN Application No. 2015800456854, dated Mar. 22, 2019.
Office Action for U.S. Appl. No. 16/268,527, dated Apr. 2, 2019.
Office Action for U.S. Appl. No. 15/480,888, dated Oct. 1, 2018.
Office Action for U.S. Appl. No. 15/480,904, dated Oct. 29, 2018.
Office Action for U.S. Appl. No. 15/480,911, dated Nov. 8, 2018.
Office Action for U.S. Appl. No. 15/480,922, dated Nov. 8, 2018.
Office Action for U.S. Appl. No. 15/853,885, dated May 1, 2019.
Office Action for U.S. Appl. No. 16/243,190, dated Jun. 12, 2019.

* cited by examiner

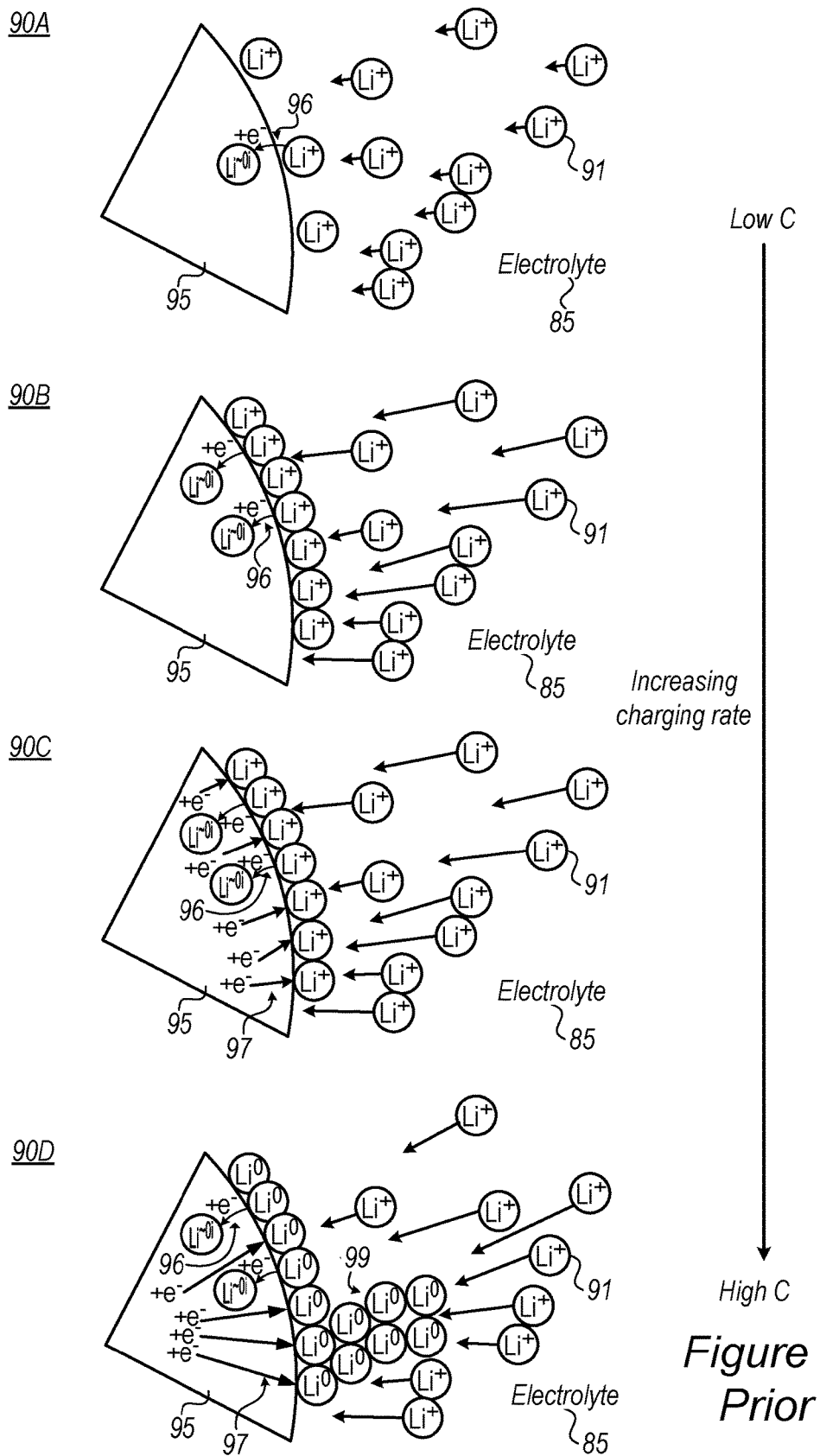
Figure 1A – Prior art

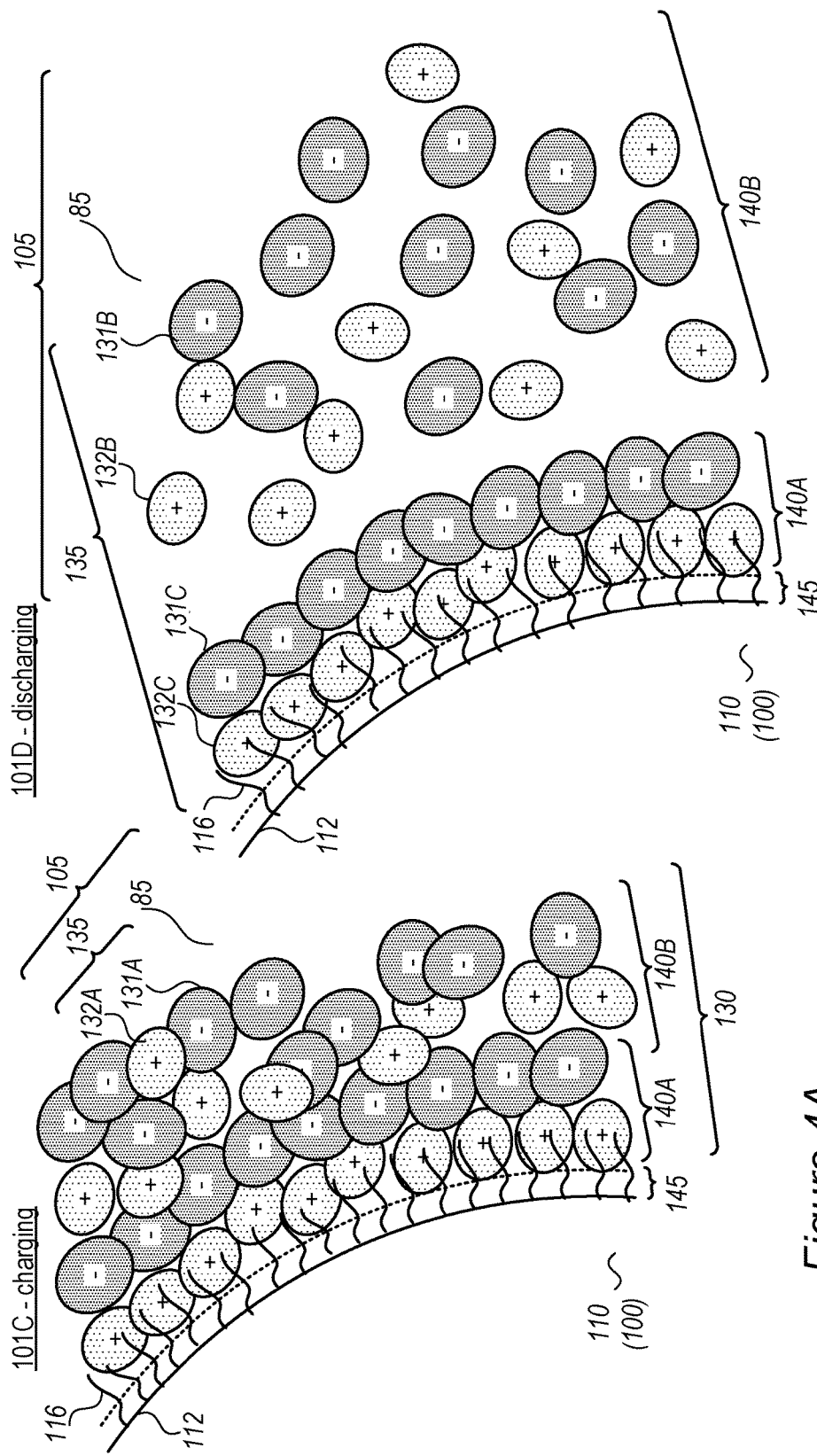

lithium 4-methylbenzenesulfonate

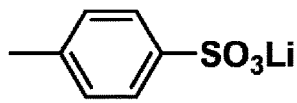

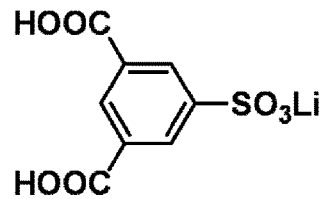

lithium 3,5-dicarboxybenzenesulfonate lithium sulfate    Lithium phosphate / lithium phosphate monobasic

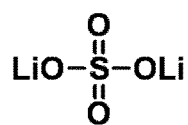 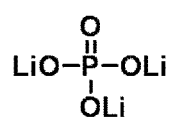 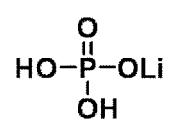

lithium 4-dodecylbenzenesulfonate    lithium propane-1-sulfonate

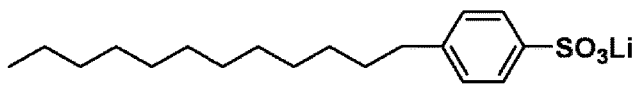 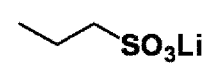

lithium 1,1,2,2,3,3,4,4,5,5,6,6,7,7,8,8,8-heptadecafluorooctane-1-sulfonate

$CF_3CF_2CF_2CF_2CF_2CF_2CF_2CF_2SO_3Li$ lithium 2,6-dimethylbenzene-1,4-disulfonate

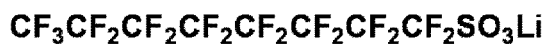

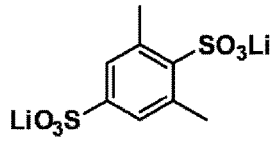 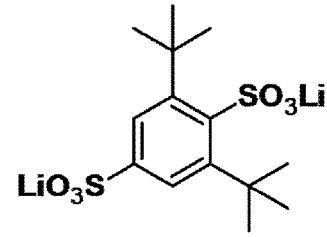

**lithium 2,6-*tert*-butylbenzene-1,4-disulfonate**

3,3'-((1,2-dithiane-4,5-diyl)bis(oxy))bis(*N*-hydroxypropanamide)

3,3'-((4-mercapto-1,2-phenylene)bis(oxy))bis(*N*-hydroxypropanamide)

Lithium aniline sulfonate
(The sulfonate can be p-; m-; o-)

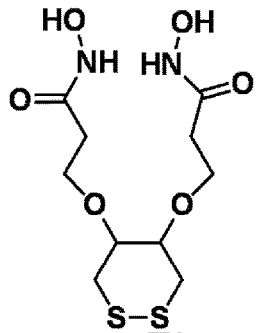 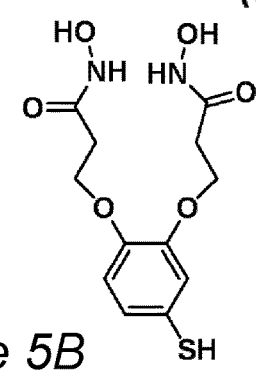 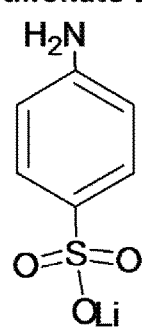 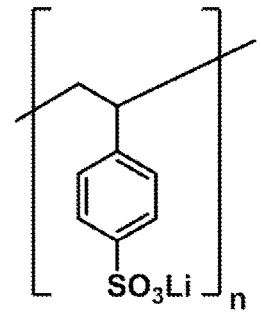

*Figure 5B*    Poly(lithium-4-styrenesulfonate)

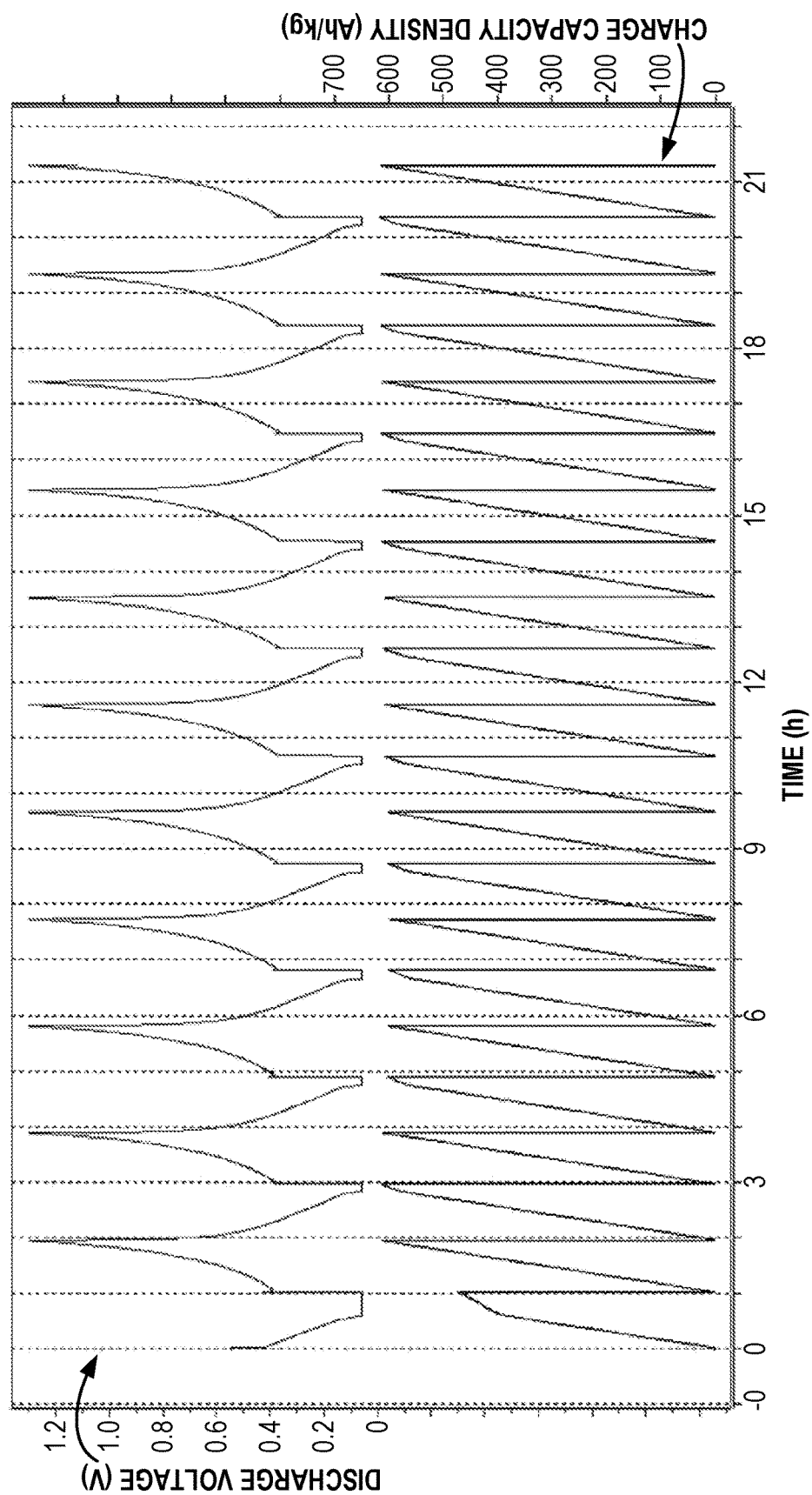
Figure 10B – Prior art

INTRODUCING A MOBILE LAYER OF IONIC LIQUID INTO ELECTROLYTES OF LITHIUM ION BATTERIES

CROSS REFERENCE TO RELATED APPLICATIONS

This application is a continuation of U.S. application Ser. No. 15/447,889, filed Mar. 2, 2017, which claims the benefit of U.S. Provisional Patent Application Nos. 62/319,341, filed Apr. 7, 2016, 62/337,416, filed May 17, 2016, 62/371,874, filed Aug. 8, 2016, 62/401,214, filed Sep. 29, 2016, 62/401,635, filed Sep. 29, 2016, 62/421,290, filed Nov. 13, 2016, 62/426,625, filed Nov. 28, 2016, 62/427,856, filed Nov. 30, 2016, 62/435,783, filed Dec. 18, 2016 and 62/441,458, filed Jan. 2, 2017, all of which are hereby incorporated by reference.

BACKGROUND OF THE INVENTION

1. Technical Field

The present invention relates to the field of lithium ion batteries, and more particularly, to electrolytes for preventing lithium metallization.

2. Discussion of Related Art

With continued success in the portable electronic device market, Li-ion batteries (LIBs) are of increasing interest for applications in electric and hybrid vehicles, surgical tools, and oil and gas drilling, etc., due to their superior energy density and long cycle life. However, current LIBs employ conventional liquid electrolytes based on organic solvents, which poses a safety concern, especially at elevated temperatures. Specifically, the use of carbonate solvents such as ethylene carbonate (EC), dimethyl carbonate (DMC), or diethyl carbonate (DEC) restricts battery operation to less than 60° C. due to their volatile and highly flammable nature. Moreover, when these solvents are used with Li salts, such as lithium hexafluorophosphate ($LiPF_6$), a resistive film forms on the electrode surface affording poor cycle life. These side reactions become more dominating at higher temperatures as the rate of chemical reaction between the dissolved lithium salt and electrolyte solvent increases.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a lithium ion cell comprising an anode and an electrolyte comprising at most 20% vol of at least one ionic liquid additive, wherein the anode comprises a surface layer configured to bond at least a portion of the at least one ionic liquid additive.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 1A is a high-level schematic illustration of a metallization process in lithium ion batteries according to the prior art.

FIGS. 4A and 4B are high level schematic illustrations of an immobilized/mobilized SEI (I/MSEI) during charging and discharging, according to some embodiments of the invention.

FIG. 5B is a high level schematic illustration of non-limiting examples for bonding molecules, according to some embodiments of the invention.

FIGS. 10A and 10B are non-limiting examples which indicate reversible lithiation at the anode when using the ionic liquid additive according to some embodiments of the invention with respect to the prior art.

DETAILED DESCRIPTION OF THE INVENTION

Figure 1B:
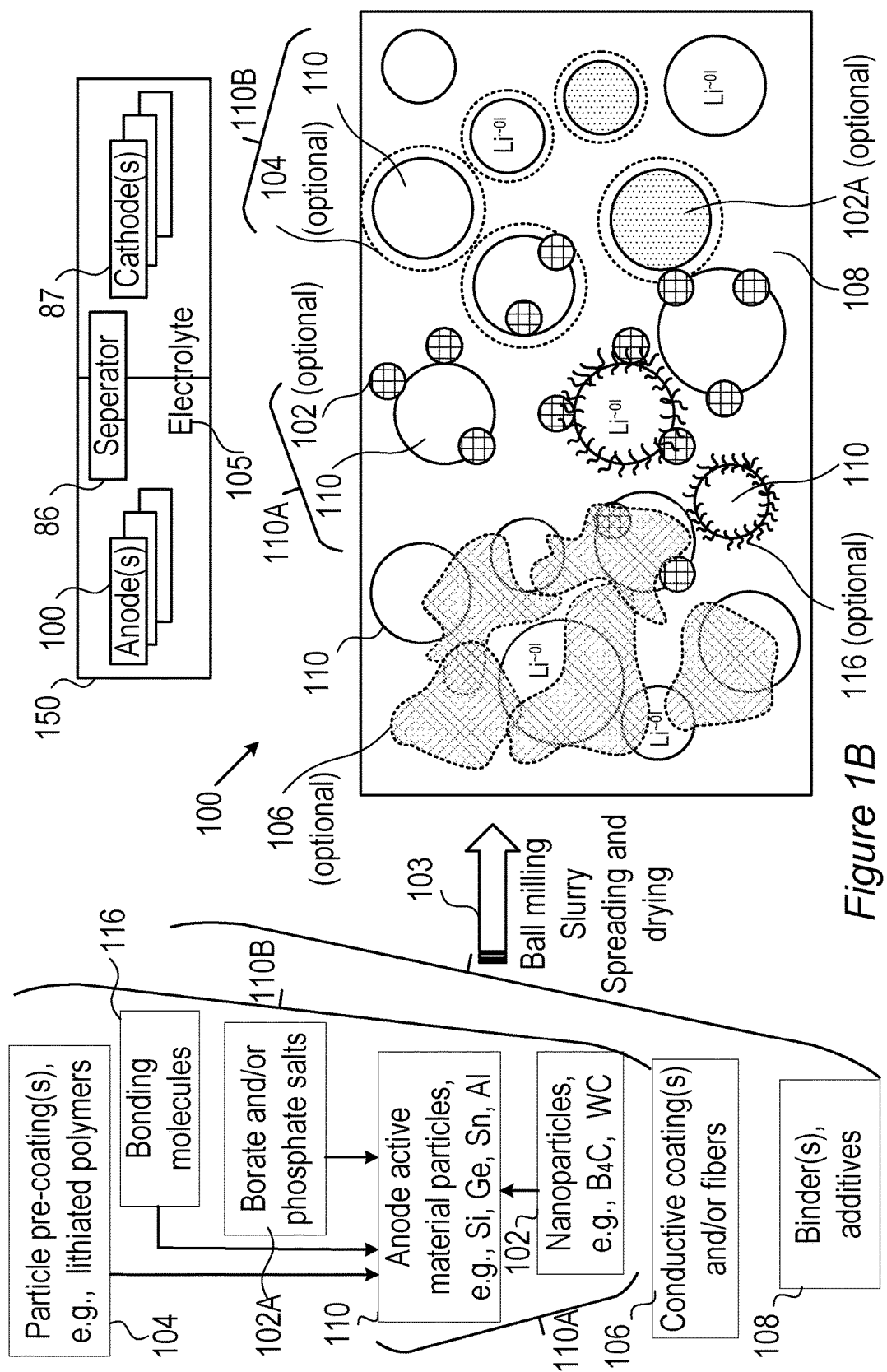
FIG. 1B is a high level schematic illustration of various anode configurations, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

The following analysis of lithium metallization and dendrite growth in some prior art anodes was used to define a problem which is solved by embodiments of the invention. The present disclosure is however not limited by the disclosed analysis, and is in general not bound by theory.

FIG. 1A is a high-level schematic illustration of a metallization process in lithium ion batteries according to the prior art. Typical lithium ion batteries use graphite anodes 95 which receive lithium ions 91 (passing through a prior art electrolyte 85) in an intercalation process between graphite layers. The maximal capacity of the graphite is limited to approximately one lithium ion for every ca. six carbon atoms and is influenced by the solid-electrolyte interface (SEI) formed between anode 95 and electrolyte 85, typically on the intercalation basal planes (e.g., layers in the graphite material between which the lithium ions intercalate). Such lithium ion batteries typically have low charging and discharging rates due to limiting charge transfer rates and limiting lithium ions diffusion rate into the graphite anode. As shown schematically in illustration 90A in FIG. 1A, under low charging rates, the intercalation rate is higher than the lithium ion accumulation rate, resulting in proper intercalation 96 of lithium ions $Li^+$ into graphite anode 95 as $L^{\sim 0i}$, denoting approximately neutral lithium atoms which receive electrons e from the graphite and are intercalated in anode 95. The intercalation rate is limited by the $Li^+$ supply rate. As the charging rate increases (schematic illustrations 90B, 90C, 90D represent gradually increasing charging rate with respect to illustration 90A), the rate of incoming lithium ions increases, and lithium ions accumulate on the surface (of anode 95 or particles thereof, at the solid-electrolyte interface) as illustrated in 90B, with an accumulation rate that exceeds the intercalation rate of the lithium ions. As a result, reduction 97 of the lithium ions is carried out on the interface in addition to the intercalated lithium ions, as illustrated in 90C, which shows schematically the increasing flow of electrons to the interface without lithium ion intercalation in anode 95. Finally, as lithium ion accumulation and reduction at the interface increase (as illustrated in 90D), lithium metallization at the interface and dendrite growth 99 commence and damage the cell. Additional considerations include volume changes of the graphite electrode material, influences of anode additives, characteristics of the SEI and details of the charging and discharging cycles. Without being bound by theory, FIG. 1A illustrates schematically a probable occurrence on the anode surface during slow 90A and fast 90B-D charging, without the problematic catalytic reaction of the active material with the electrolyte (which complicates the schematically illustrated mechanism). While at low C rate the apparent diffusion to the active material is fast enough to compensate the migration of the lithium ions through the electrolyte—at high C rate charging, the migration through the electrolyte is faster than the apparent active material lithiation, which gives rise to metallization process at the interface. Moreover, without proper protective coating around the active material metalloid, the active material-Li entity is highly reactive toward the electrolyte, giving rise to catalytic reaction which decompose the electrolyte.

Embodiments of the present invention provide efficient and economical methods and mechanisms for preventing lithium metallization in lithium ion batteries (LIBs) and thereby provide improvements and enhancing safety in this technological field. It is suggested to use ionic liquids as an additive to prior art organic electrolyte 85 at low concentrations (e.g., up to ~20% v/v) in order, e.g., to create a mobilized SEI (MSEI) zone during charging and dis-charging. These ionic liquids may be selected to be non-reactive or to have a very low reactivity toward metallic lithium. A surface layer on the anode material particles bonds (e.g., electrostatically and/or ionically) at least some of the ionic liquid additive to form an immobilized layer that provides further protection at the interface between the anode and the electrolyte, prevents metallization of lithium on the anode and decomposition of the electrolyte.

Electrolytes, anodes, lithium ion cells and methods are provided for preventing lithium metallization in lithium ion batteries to enhance their safety. Electrolytes comprise up to 20% ionic liquid additives which form a mobile solid electrolyte interface (mobile SEI or MSEI) during charging of the cell and prevent lithium metallization and electrolyte decomposition on the anode while maintaining the lithium ion mobility at a level which enables fast charging of the batteries. Anodes used with the present invention may be metalloid-based, for example the anodes may include silicon, germanium, tin and/or aluminum (as used herein, "metalloid-based"). However, the invention may also be applied for cells having graphite-based anodes.

In certain embodiments, a surface layer on the anode material particles may be applied to bond (e.g., electrostatically and/or ionically) at least some of the ionic liquid additive to form an immobilized layer (I/MSEI) that may provide further protection at the interface between the anode and the electrolyte, may prevent metallization of lithium on the former and decomposition of the latter. It is emphasizes that MSEI and/or I/MSEI may be created independently of each other, and possibly in addition to other types of SEI which may be formed in or at the surface of the anode material particles.

Advantageously, some embodiments of the invention provide alternative electrolytes with superior thermal and chemical stability, which expand the use of LIBs to a wider working temperature range without compromising the electrochemical performance. Moreover, some embodiments of the invention enable use of high energy metalloids and metals as anode active material, including C (graphite), as well as Si, Ge, Sn, Al, as disclosed e.g., in U.S. Pat. No. 9,472,804, filed on Nov. 12, 2015 and U.S. Pat. No. 9,406,927, filed on Feb. 4, 2016; and in U.S. application Ser. No. 14/813,499 filed on Jul. 30, 2015 which are incorporated herein by reference in their entirety.

Advantageously, disclosed MSEI may prevent breaking and/or provide a healing mechanism for damage to fragile SEI layer(s) due to expansion and/or shrinkage of the anode. Moreover, disclosed embodiments reduce, to at least a partial extent during the cycle life of the LIB, decomposition of the electrolyte solvent at the interface with the metalloid, which may act as a catalytic surface due to lithium metal species at the interface such as lithium silicide (Li—Si).

FIG. 1B is a high level schematic illustration of various anode configurations, according to some embodiments of the invention. FIG. 1B illustrates schematically, in a non-limiting manner, a surface of anode 100, which may comprise anode active material particles 110 (e.g., particles of metalloids such as silicon, germanium and/or tin, and/or of aluminum, see below for more details, possibly composite particles 110B) at different sizes (e.g., in the order of magnitude of 100 nm, and/or possible in the order of magnitude of 10 nm or 1μ)—for receiving lithiated lithium during charging and releasing lithium ions during discharging. Anodes 100 may further comprise binder(s) and additive(s) 108 as well as optionally coatings 106 (e.g., conductive polymers, lithium polymers, etc.). Active material particles 110 may be pre-coated by one or more coatings 106 (e.g., by conductive polymers, lithium polymers, etc.), have borate and/or phosphate salt(s) 102A bond to their surface (possibly forming e.g., $B_2O_3$, $P_2O_5$ etc.), bonding molecules 116 (illustrated schematically and disclosed in detail below) which may interact with electrolyte 105 (and/or ionic liquid additives thereto, see below) and/or various nanoparticles 102 (e.g., $B_4C$, WC, VC, TiN), may be attached thereto in anode preparation processes 103 such as ball milling (see, e.g., U.S. Pat. No. 9,406,927, which is incorporated herein by reference in its entirety), slurry formation, spreading of the slurry and drying the spread slurry. For example, anode preparation processes 103 may comprise mixing additive(s) 108 such as e.g., binder(s) (e.g., polyvinylidene fluoride, PVDF, styrene butadiene rubber, SBR, or any other binder), plasticizer(s) and/or conductive filler(s) with a solvent such as water or organic solvent(s) (in which the anode materials have limited solubility) to make an anode slurry which is then dried, consolidated and is positioned in contact with a current collector (e.g., a metal, such as aluminum or copper). Details for some of these possible configurations are disclosed below.

Certain embodiments comprise anode material particles 110 comprising any of silicon active material, germanium active material and/or tin active material, possibly further comprising carbon material, boron and/or tungsten. As non-limiting examples, anode material particles 110 may comprise 5-50 weight % Si, 2-25 weight % B and/or 5-25 weight % W, and 0.01-15 weight % C (e.g., as carbon nanotubes, CNT); anode material particles 110 may comprise 5-80 weight % Ge, 2-20 weight % B and/or 5-20 weight % W, and 0.05-5 weight % C (e.g., as carbon nanotubes, CNT); anode material particles 110 may comprise 5-80 weight % Sn, 2-20 weight % B and/or 5-20 weight % W, and 0.5-5 weight % C (e.g., as carbon nanotubes, CNT); anode material particles 110 may comprise mixtures of Si, Ge and Sn, e.g., at weight ratios of any of at least 4:1 (Ge:Si), at least 4:1 (Sn:Si) or at least 4:1 (Sn+Ge):Si; anode material particles 110 may comprise aluminum and/or any of zinc, cadmium and/or lead, possibly with additions of borate and/or phosphate salt(s) as disclosed below.

Certain embodiments comprise anode material particles 110 comprising nanoparticles 102 attached thereto, such as any of $B_4C$, WC, VC and TiN, possibly having a particle size range of 10-50 nm and providing 5-25 weight % of modified anode material particles 110A. Nanoparticles 102 may be configured to form in modified anode material particles 110A compounds such as $Li_2B_4O_7$ (lithium tetra-borate salt, e.g., via 4Li+7MeO+2$B_4$C→2$Li_2B_4O_7$+C+7Me, not balanced with respect to C and O, with Me denoting active material such as Si, Ge, Sn etc.) or equivalent compounds from e.g., WC, VC, TiN, which have higher affinity to oxygen than the anode active material.

Certain embodiments comprise anode material particles 110 comprising coatings(s) 104 of any of lithium polymers, conductive polymers and/or hydrophobic polymers, such as e.g., any of lithium polyphosphate ($Li_{(n)}$PP or LiPP), lithium polyacrylic acid ($Li_{(n)}$PAA or LiPAA), lithium carboxyl methyl cellulose ($Li_{(n)}$CMC or LiCMC), lithium alginate ($Li_{(n)}$Alg or LiAlg) and combinations thereof, with (n) denoting multiple attached Li; polyaniline or substituted polyaniline, polypyrroles or substituted polypyrroles and so forth.

Any of anode material particles 110, 110A, 110B may be coated by thin films (e.g., 1-50 nm, or 2-10 nm thick) of carbon (e.g., amorphous carbon, graphite, graphene, etc.) and/or transition metal oxide(s) (e.g., $Al_2O_3$, $B_2O_3$, $TiO_2$, $ZrO_2$, MnO etc.)

In certain embodiments, borate and/or phosphate salt(s) 102A may comprise borate salts such as lithium bis(oxalato) borate (LiBOB, $LiB(C_2O_4)_2$), lithium difluoro(oxalato)borate (LiFOB, $LiBF_2(C_2O_4)$), lithium tetraborate ($LiB_4O_7$), lithium bis(malonato)borate (LiBMB), lithium bis(trifluoromethanesulfonylimide) (LiTFSI). or any other compound which may lead to formation of borate salts ($B_2O_3$) on anode active material particles 110, including in certain embodiments $B_4C$ nanoparticles 102.

In certain embodiments, borate and/or phosphate salt(s) 102A may comprise phosphate salts such as lithium phosphate ($LiPO_4$), lithium pyrophosphate ($LiP_2O_7$), lithium tripolyphosphate ($LiP_3O_{10}$) or any other compound which may lead to formation of phosphate salts ($P_2O_5$) on anode active material particles 110.

Certain embodiments comprise composite anode material particles 110B which may be configured as core shell particles (e.g., the shell being provided by any of coating(s) 104 and possible modifications presented above). The different configurations are illustrated schematically in different regions of the anode surface, yet embodiments may comprise any combinations of these configurations as well as any extent of anode surface with any of the disclosed configurations. Anode(s) 100 may then be integrated in cells 150 which may be part of lithium ion batteries, together with corresponding cathode(s) 87, electrolyte 105 and separator 86, as well as other battery components (e.g., current collectors, electrolyte additives—see below, battery pouch, contacts, and so forth).

Anode material particles 110, 110A, 110B, anodes 100 and cells 150 may be configured according to the disclosed principles to enable high charging and/or discharging rates, ranging from 3-10 C-rate, 10-100 C-rate or even above 100 C, e.g., 5 C, 10 C, 15 C, 30 C or more. It is noted that the term C-rate is a measure of charging and/or discharging of cell/battery capacity, e.g., with IC denoting charging and/or discharging the cell in an hour, and XC (e.g., 5 C, 10 C, 50 C etc.) denoting charging and/or discharging the cell in 1/X of an hour—with respect to a given capacity of the cell.

Examples for electrolyte 105 may comprise liquid electrolytes such as ethylene carbonate, diethyl carbonate, propylene carbonate, vinylene carbonate, fluoroethylene carbonate (FEC), and combinations thereof and/or solid electrolytes such as polymeric electrolytes such as polyethylene oxide, fluorine-containing polymers and copolymers (e.g., polytetrafluoroethylene), and combinations thereof. Electrolyte 105 may comprise lithium electrolyte salt(s) such as $LiPF_6$, $LiBF_4$, lithium bis(oxalato)borate, $LiN(CF_3SO_2)_2$, $LiN(C_2FsSO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), lithium 4,5-dicyano-2-(trifluoromethyl)imidazolide (LiTDI), and combinations thereof. Ionic liquid(s) 135 may be added to electrolyte 105 as disclosed below. Cathode(s) 87 may comprise various compositions, such as $LiCoO_2$, $LiCo_{0.33}Mn_{0.33}Ni_{0.33}O_2$, $LiMn_2O_4$, $LiFePO_4$ and/or combinations thereof. Separator(s) 87 may comprise various materials, such as polyethylene (PE), polypropylene (PP) or other appropriate materials.

FIGS. 2A-2D and 3A-3C schematically illustrate at least one electrolyte-buffering zone 130 (MSEI) in an electrolyte 105, according to some embodiments of the invention. Electrolyte-buffering zone(s) 130 may be formed by an ionic liquid additive 135 (one or more salt(s) which are liquid below 100° C., or even at room temperature or at lower temperatures-sometimes referred to as "fused salts") and is illustrated schematically as an accumulation of anions 131 and cations 132, which provides separation between organic electrolyte 85 (as main component of electrolyte 105) and anode 100 (illustrated e.g., with respect to anode material particle 110) and may be configured to further regulate lithium ion movement from electrolyte 105 to anode 100 (illustrated e.g., with respect to anode material particles 110). It is noted that shapes and sizes of anions 131 and cations 132 are used for illustration purposes, anions 131 and cations 132 may have various relative sizes and shapes, depending on the specific ionic liquid(s) which are selected as ionic liquid additive 135. For example, anions 131 and/or cations 132 may be relatively large, e.g., larger than lithium ions 91 and/or significantly larger than lithium ions 91 (e.g., larger than lithium ions by at least 10%, 25%, 50% or more, possibly by at least 100%, 200%, 500% or even more, in either volume or radius) to establish a gradient in physical and/or chemical characteristics in region 130 and possibly provide an interphase transition between electrolyte 105 and anode 100 (illustrated e.g., with respect to anode material particles 110) that enhances the stabilization of transition region and prevents lithium ion accumulation and/or metallization and dendrite growth. Anions 131 may be selected to provide negative electric charge in the region of lithium ions 91 moving towards anode 100 (illustrated e.g., with respect to anode material particles 110), which somewhat, yet not fully, reduces the positive charge of lithium ions 91 to δ+ (e.g., by physical proximity, such as through, e.g., electrostatic and/or ionic interactions, and not by a chemical bond). The relative sizes of anions 131 and cations 132 may vary—anions 131 and cations 132 may have a similar size or one of anions 131 and cations 132 may be larger than the other. Mixtures of different ionic liquid additives 135 may have different size relations between their anions 131 and cations 132.

In certain embodiments, electrolyte 105 may comprise ionic liquid additive 135 (e.g., at 20%, 10%, 5%, 2%, 1% v/v or any other volume part smaller than 20%), added to prior art electrolyte 85, which is selected to at least partially provide anions 131 and/or cations 132 to build electrolyte-buffering zone(s) 130. For example, ionic liquid additive 135 may comprise acidic groups which are selected to be anionic in the environment of lithium ions 91. Anions 131 and/or cations 132 may be relatively large to form a barrier which reduces the approaching speed of lithium ions 91 and which locally increases the resistance of electrolyte-buffering zone(s) 130 to lithium ions 91 to prevent or attenuate accumulation of lithium ions 91 at the surface of anode 100 (illustrated e.g., with respect to anode material particles 110).

Ionic liquid additive 135 may be selected to be not reactive in the cell, not to be reactive with lithium metal (e.g., not decompose in the presence of lithium metal) and not to intercalate with active material 110 of anode 100. The ionic strength and lithium ion mobility may be selected to appropriate values and the ionic conductivity may be controlled in a better way than a single component electrolyte 85. Moreover, ionic liquid additive 135 may be selected to have large volume anions 131 and cations 132 (illustrated schematically in FIGS. 2A-C). Advantageously, using ionic liquid additive 135 in the cell overcomes a prior art need to balance the risk of lithium metallization (requiring low lithium accumulation concentration at the anode surface) with the ability to fast charge the battery over a large number of cycles (requiring high lithium conductivity and mobility).

Figure 2A:
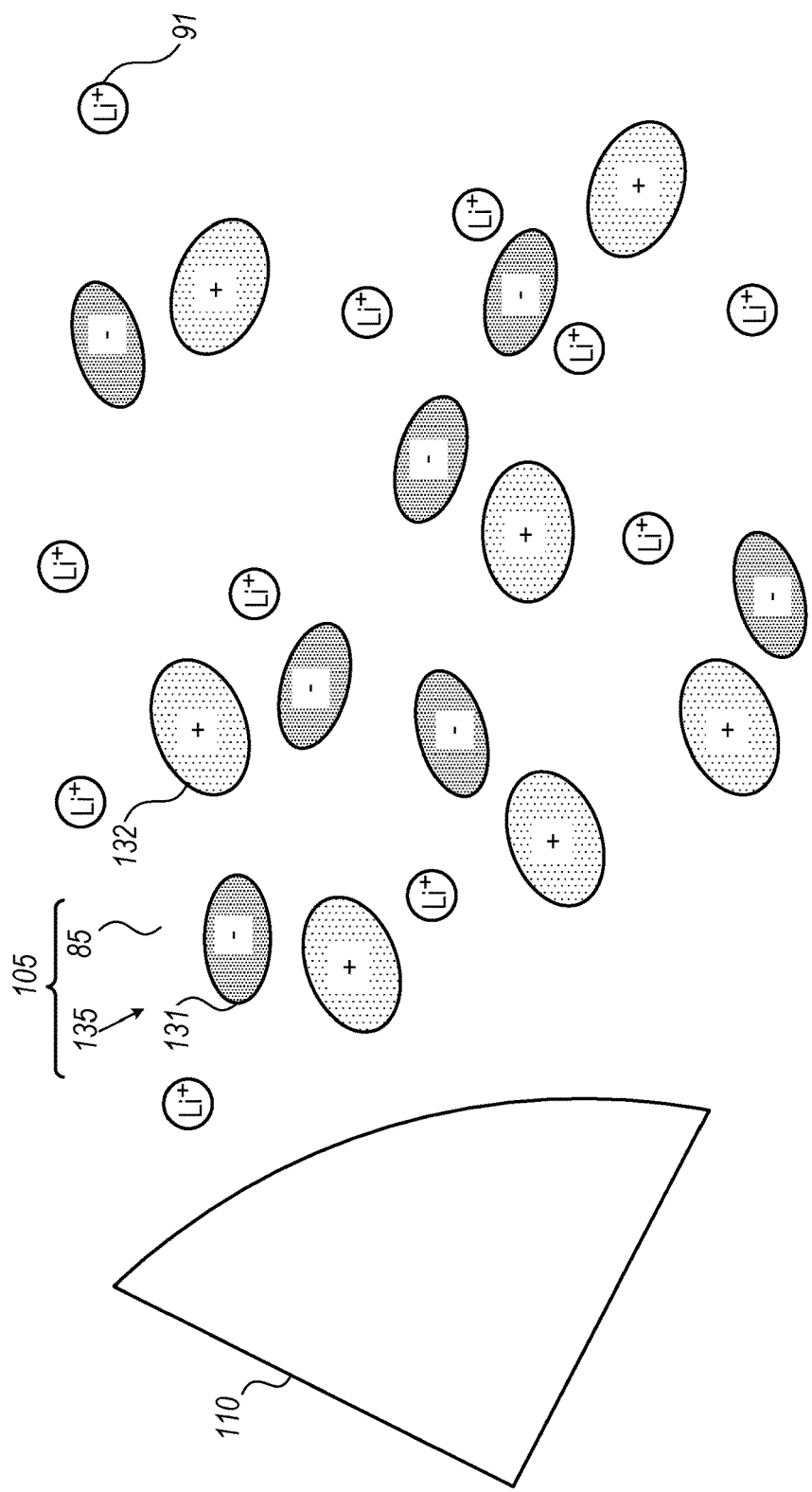
FIGS. 2A-2D and 3A-3C schematically illustrate at least one electrolyte-buffering zone (mobile solid-electrolyte interface, MSEI) in an electrolyte, according to some embodiments of the invention.
Figure 2C:
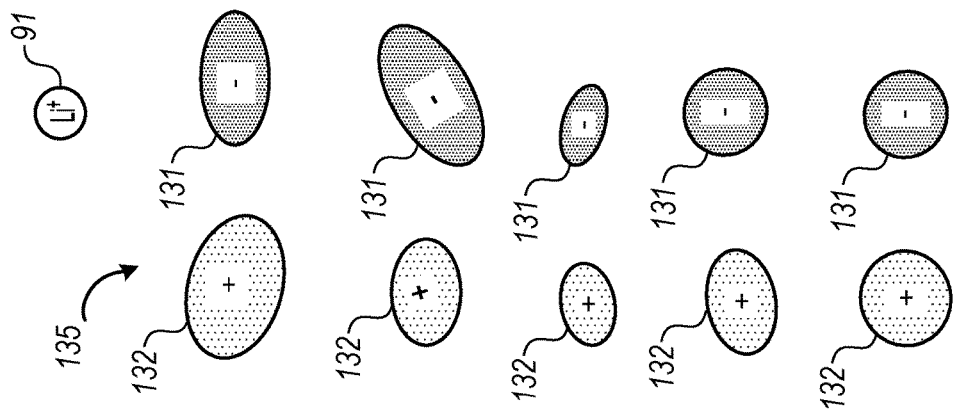
Figure 2B:
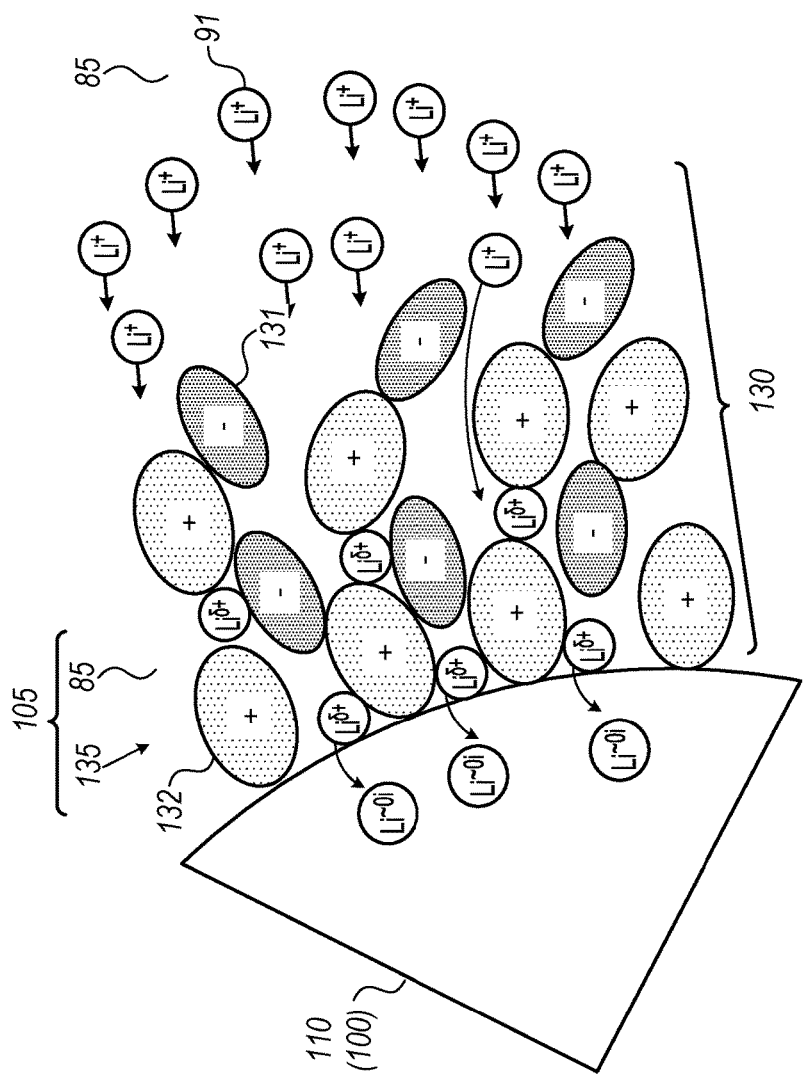
Figure 2D:
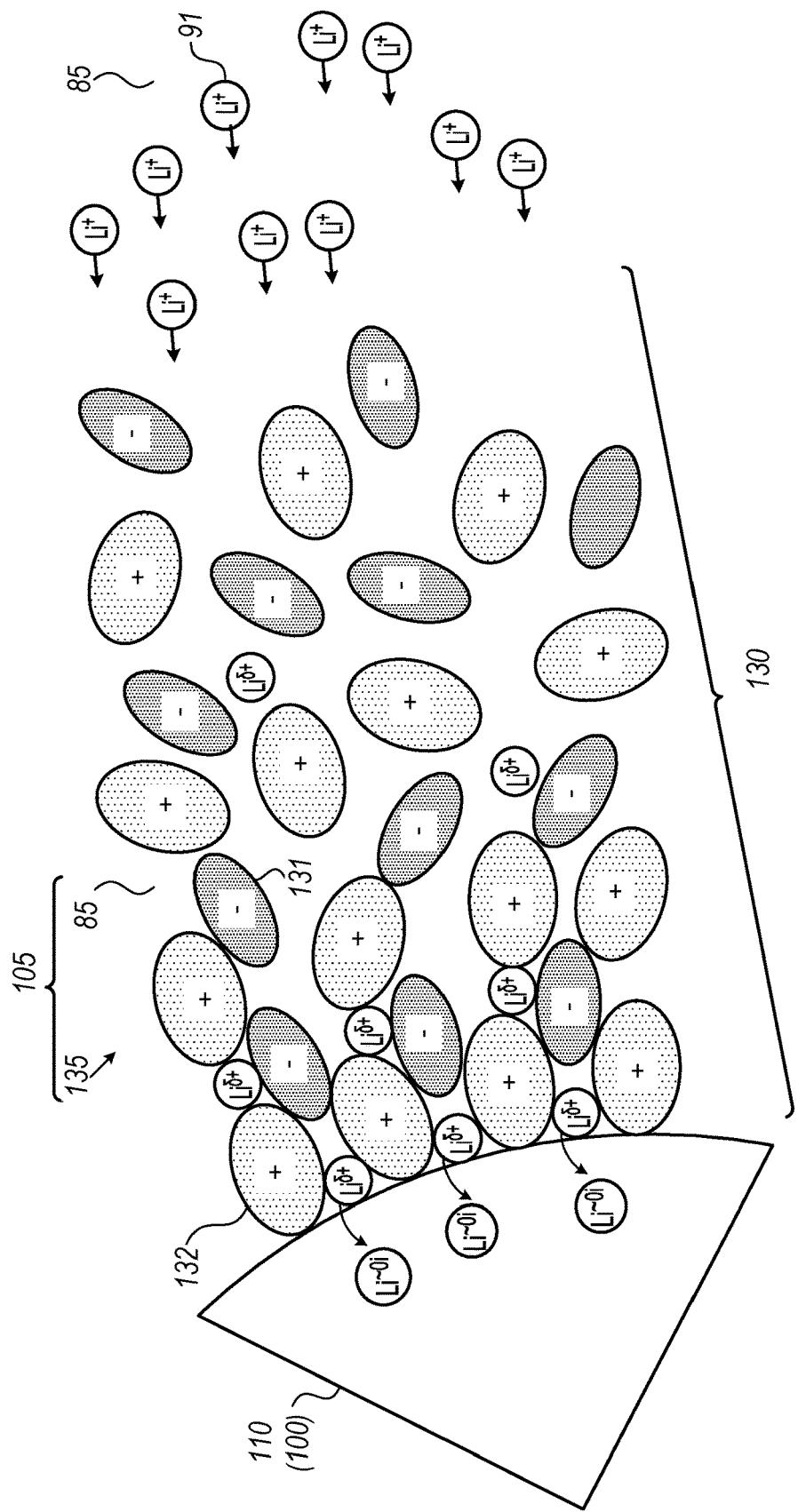

FIG. 2A illustrates schematically the situation prior to application of an electrical field in the vicinity of anode 100 (illustrated e.g., with respect to anode material particles 110) and FIGS. 2B and 2D illustrate schematically the situation during application of an electrical field in the vicinity of anode 100 (e.g., anode material particles 110). In the former case (FIG. 2A), the dispersion of anions 131 and cations 132 of ionic liquid additive 135 in electrolyte 105 may be essentially homogenous while in the latter case (FIGS. 2B, 2D, e.g., during charging of the cell), anions 131 and cations 132 of ionic liquid additive 135 accumulate in zone 130 in electrolyte 105 which is adjacent to the active material surface of anode 100. Without being bound to theory, anions 131 and cations 132 are held adjacent to anode 100 by electrostatic forces, without reacting chemically with the active material of anode 100. Electrolyte-buffering zone(s) 130 may vary in the degree to which anions 131 and cations 132 are ordered, typically the degree of order decreases with increasing distance from the anode surface as the electrostatic forces become weaker.

FIG. 2C is a high level schematic illustration of non-limiting examples for ion sizes and shapes of ionic liquid additive 135, according to some embodiments of the invention. Cations 132 and anions 131 may have various sizes and shapes, e.g., cations 132 may be larger than anions 131, cations 132 may be smaller than anions 131, cations 132 may be about the same size as anions 131, and/or combinations of cations 132 and anions 131 with different size relations may be used together as ionic liquid additive 135. Cations 132 may be elongated or spherical, anions 131 may be elongated or spherical and/or combinations of cations 132 and anions 131 with different shapes may be used together as ionic liquid additive 135. At least one of cations 132 and anions 131 may be larger than lithium ions 91, as illustrated schematically in FIG. 2C. Any of these combinations may be used in any of the disclosed embodiments, and the specific shapes and sizes of cations 132 and anions 131 illustrated in FIGS. 2A, 2B, 2D, 3B and 3C may be replaced with any of the shapes and sizes illustrated in FIG. 2C, and are non-limiting.

FIG. 2D illustrates schematically possible different thicknesses of electrolyte-buffering zone(s) 130 and the spreading of the charge with distance from anode 100 and/or anode material 110. For example, electrolyte-buffering zone(s), MSEI 130, may comprise 1, 2, 4 or more layers of cations 132 and anions 131, depending on electrolyte composition, types of ionic liquid additive 135, sizes of ions, level of charge etc.

Ionic liquid additive 135 may be selected to enable lithium ion transport therethrough while partly reducing the lithium ions and keep them in a partly charged form $Li^{\delta+}$ in zone 130.

Figures 3A, 3B:
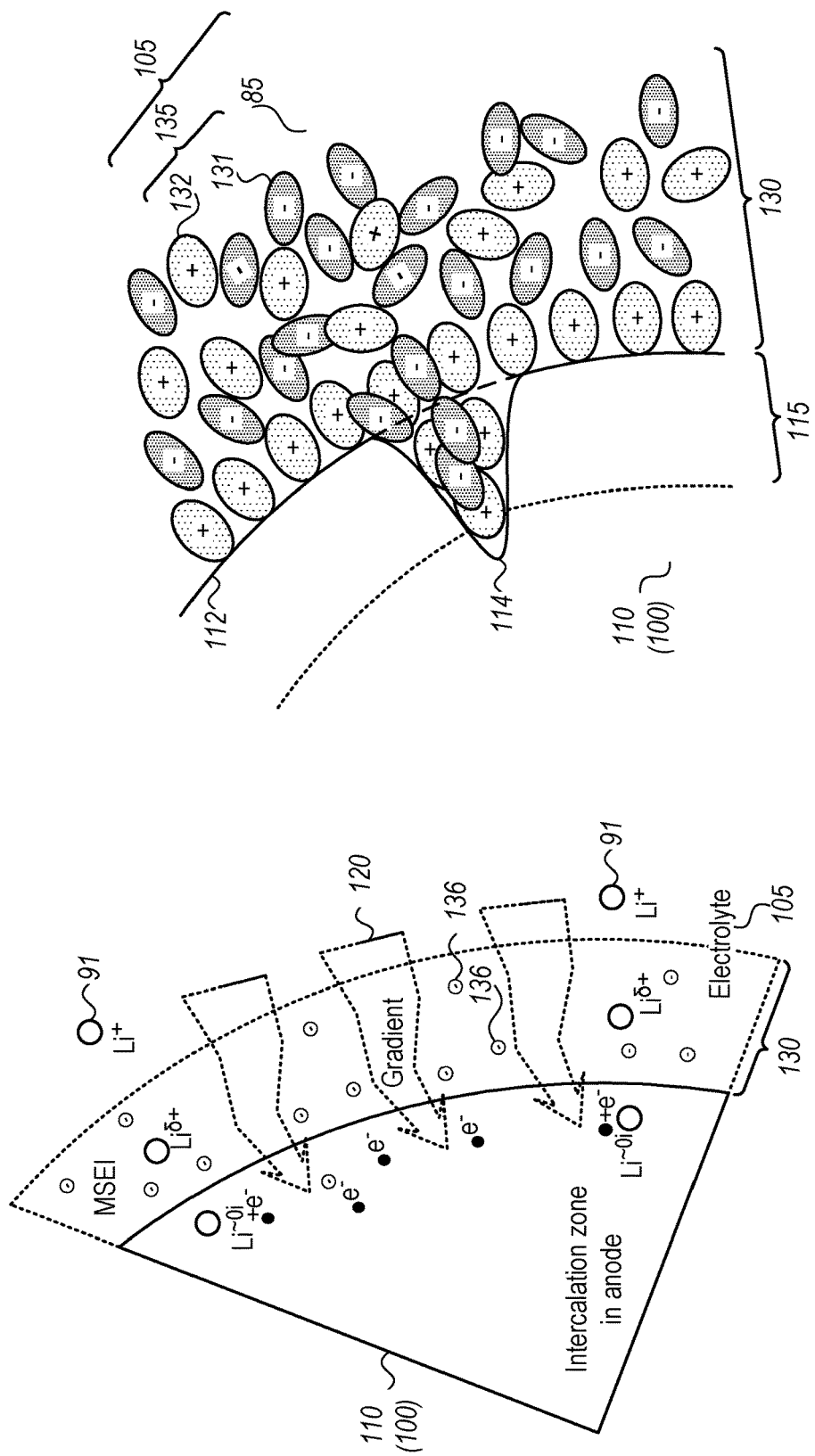

FIG. 3A schematically illustrates at least one electrolyte-buffering zone 130 (MSEI) in an electrolyte 105, which is configured to provide a mobility and charge gradient 120 (indicated schematically by the tapered arrows) having surrounding electric charge 136 (illustrated schematically as a non-specific symbol), according to some embodiments of the invention. Mobility and charge gradient 120 reduces and slows lithium ions 91 entering zone 130 in a gradual manner (indicated schematically by $Li^{\delta+}$, with the partial charge of the lithium ions changing gradually within zone 130) until they reach intercalation in anode 100. Gradient 120 enables modification of the interface (the area where the two immiscible phase surfaces of anode and electrolyte are coming in contact with each other) into an interphase region 130 having a gradual change of parameters which gradually reduces the activation energy of the reduction reaction of the lithium ions, and further prevents metallization of lithium and dendrite growth. MSEI zone 130 helps smooth the lithium ion transport into the active material for full reduction and intercalation (to $Li^{-0i}$). The resulting ionic liquid layer 130 reduces the probability of both lithium metallization and decomposition of the organic solvent (electrolyte 85) at the metalloid-lithium surface. Once the electrical field stops (e.g., at the end or interruption of the charging), ionic liquid 135 may slowly diffuse to form homogenous electrolyte 105. It is explicitly noted, however, that ionic liquid additive 135 may be used in cells having metalloid-based and/or graphite-based anodes (either possibly coated and/or pre-coated).

FIG. 3B schematically illustrates at least one electrolyte-buffering zone 130 (MSEI) in an electrolyte 105, which is configured to fill possible cracks 114 appearing in a surface 112 of anode, e.g., due to cracking of a surface layer 115 (which may be e.g., a SEI, a coating and/or an anode buffering zone, e.g., as disclosed in the applications cited above) upon expansion and contraction of anode 100, according to some embodiments of the invention.

Under various configurations of anodes 100, cracks may appear in surface layer 115 of anode, which may comprise or support a SEI (which may be brittle), a coating and/or a buffering zone. Such cracks may enable renewed contact between the anode material and/or metal lithium and electrolyte 85, or increase the surface area available for such contact—causing further electrolyte decomposition and possible sites for lithium metallization. Ionic liquid additive 135 may be configured to fill in such cracks 114 (illustrated schematically in FIG. 3B) once an electric field is applied, or possibly also after the electric field is applied, to reduce the extent of, or prevent, cracks 114 from enhancing electrolyte decomposition and lithium metallization. Anode 100 may be coated and/or pre-coated by a full or partial coating (e.g., a polymer coating, a nanoparticles coating, etc., e.g., on as at least part of surface layer 115, e.g., as disclosed in the applications cited above, and see FIG. 1B), which may be applied before and/or after anode formation (pre- and/or post-coating). Ionic liquid additive 135 may be configured to fill in cracks or uncoated surface areas as explained above, including possible exposed surfaces in the coating resulting from the expansion and contraction during cell cycles (see also FIG. 3C).

Figure 3C:
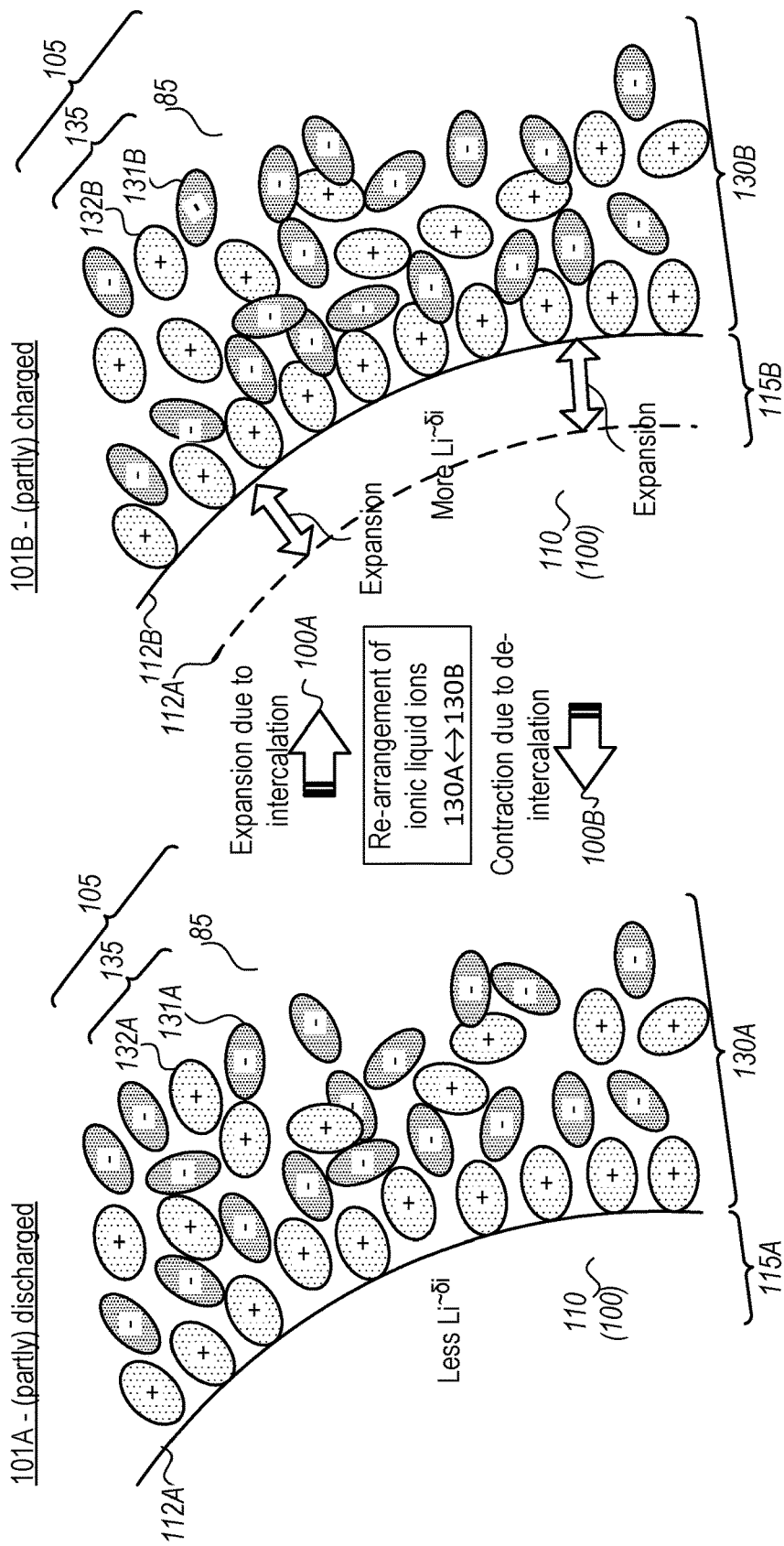

FIG. 3C schematically illustrates the ability of mobilized SEI (MSEI) layer 130 to rearrange and maintain itself as electrolyte-buffering zone(s) 130 upon expansion and contraction of anode 100, according to some embodiments of the invention. Expansion 100A and contraction 100B are illustrated schematically by the respective arrows, the indication of amount of intercalated lithium (denoted $Li^{-0i}$) which correspond to (partly) discharged state 101A and (partly) charged state 101B, the schematically illustrated movement of anode surface 112 from 112A to 112B and expansion of surface layer 115 from 115A to 115B. Ionic liquid additive 135, being a liquid, accommodates itself easily (illustrated schematically by MSEI layers 130A, 130B) upon expansion 100A and contraction 100B by re-arrangement of cations 132 and anions 131 (from schematically illustrated arrangement 132A, 131A to 132B, 131B, corresponding to MSEIs 130A, 130B).

Without being bound by theory, the mechanism of MSEI formation may be both concentration and kinetically controlled, e.g., the more ionic liquid additive 135 is separated from electrolyte 105, the faster mobile SEI layer 130 forms; while an increase of the concentration of ionic liquid additive 135 may reduce the ionic mobility through MSEI 130. The concentration of ionic liquid additive 135 may thus be selected to balance reduced ionic mobility by higher concentration with possible electrolyte decomposition on the active material-electrolyte interface which may be enabled by too low concentrations of ionic liquid additive 135 (which forms MSEI 130 too slowly). Moreover, using ionic liquid additive 135 may maintain or enhance the ionic strength, without compromising the ionic mobility by increasing the ionic resistance, by enabling a reduction of the lithium salt (e.g., $LiPF_6$) concentration, which also further reduces the probability for metallization.

In embodiments, the ionic liquid additive contains a nitrogen atom with a charge. Non-limiting examples of ionic liquid additives 135 include. without limitation, any of the following and their combinations: 1-butyl-1-methylpyrrolidinium as cation 132 and bis(trifluoromethanesulfonyl)imide as anion 131 (melting point −6° C.); 1-butyl-3-methylimidazolium as cation 132 and bis(trifluoromethanesulfonyl)imide as anion 131 (melting point −4° C.); 1-butyl-3-methylimidazolium as cation 132 and bis(fluorosulfonyl)imide as anion 131 (melting point −13° C.); N,N-Diethyl-N-methyl-N-propylammonium as cation 132 and bis(fluorosulfonyl)imide as anion 131; and N-propyl-N-methylpiperidinium as cation 132 and bis(trifluoromethanesulfonyl)imide as anion 131. Certain embodiments comprise ionic liquids which are derived from these combinations, i.e., having various substituents. As illustrated in the examples above, ionic liquid additives 135 may be based on sulfonylimides as anions 131 and on piperidinium derivatives as cations 132, referred to below as ionic liquids based on sulfonylimides and piperidinium derivatives.

Advantageously, certain embodiments use, as ionic liquid additives 135, ionic liquids having a negligible vapor pressure and which are liquid at room temperature, a wide electrochemical potential window (e.g., up to 5.0 V in ionic liquids based on sulfonylimides and piperidinium derivatives), and structural stability across a large temperature range (e.g., up to 385° C. in ionic liquids based on sulfonylimides and piperidinium derivatives). For example, the ionic liquids may have melting temperatures of 10-20° C., 0-10° C., or possibly even <0° C., e.g., 0-−4° C., −4°-−13° C., or even lower, e.g., below −20° C., having melting points down to −40° C., as non-limiting examples. The lithium ion conductivity in certain ionic liquids based on sulfonylimides and piperidinium derivatives at room temperature may be, for example, between 1-20 mS/cm (at 20° C.), in some embodiments, between 1.4-15.4 mS/cm (at 20° C.), wherein exact values can be provided according to requirements.

The use of ionic liquids as additive 135 solves prior art problems in attempting to use ionic liquids as electrolytes 85, such as their high viscosity and low Li-ion conductivity at room temperature and reduced cathodic stability. Their use as additives 135 (e.g., up to 20% vol of electrolyte 105, the rest comprising electrolyte 85) mitigates their prior art disadvantages and utilizes their advantageous property exactly where needed, e.g., at the anode-electrolyte interface. Moreover, the use of ionic liquids based on sulfonylimides and piperidinium derivatives with C (e.g., graphite), or metalloid (e.g., Si, Sn, Ge or Al)-based anodes solves prior art problems of co-intercalation of the piperidinium cations along with the Li-ion in graphite-based electrodes at lower potentials during the charge-discharge process—as metalloid-based anodes do not co-intercalate the piperidinium cations. Nevertheless, some embodiments comprise using disclosed electrolytes 105 with ionic liquid additives 135 in lithium ion cells employing graphite anodes.

Figure 3D:
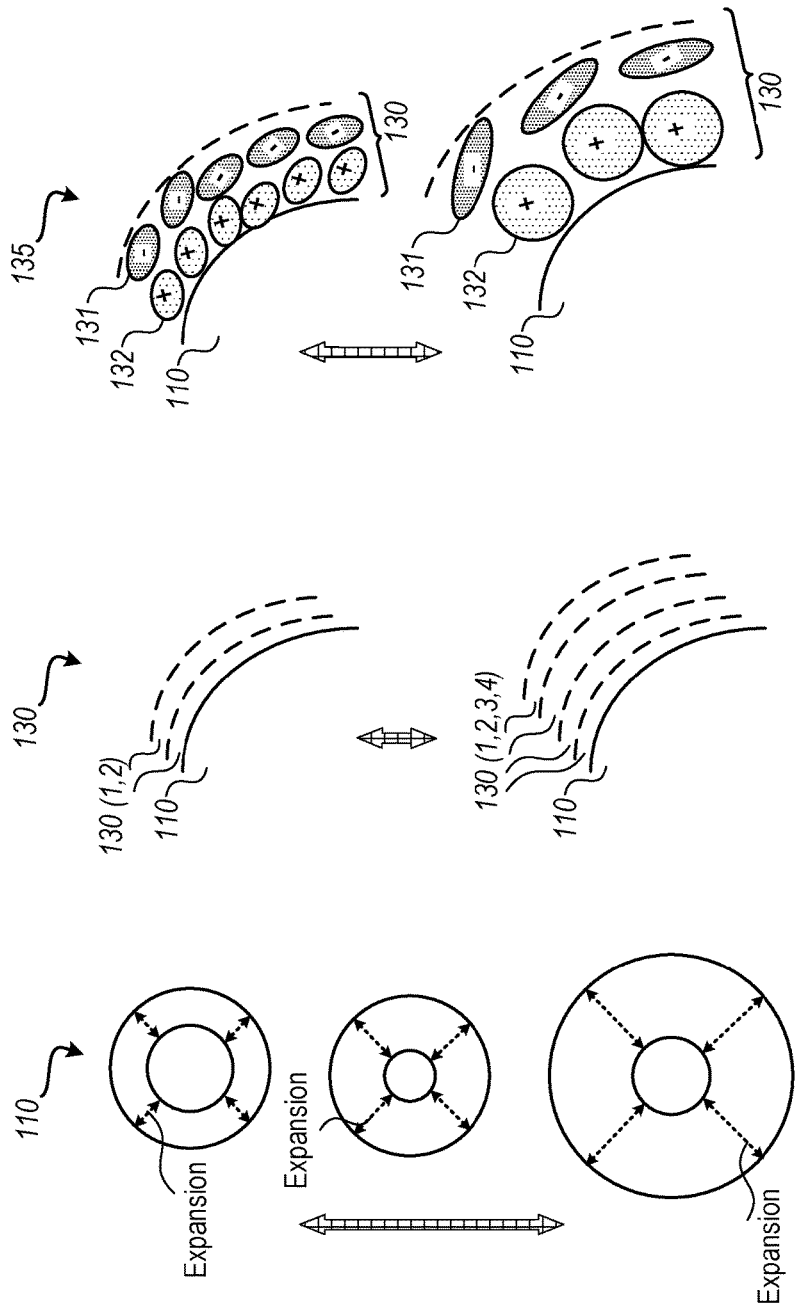
FIG. 3D is a high level schematic illustration of some of the considerations in determining an amount of ionic liquid additive, according to some embodiments of the invention.

FIG. 3D is a high level schematic illustration of some of the considerations in determining an amount of ionic liquid additive 135, according to some embodiments of the invention. The considerations are shown schematically as the cross-hatched arrows. The amount of ionic liquid additive 135 in electrolyte 105, may be determined according to the specific parameters and characteristics of cells 150 (see schematic FIGS. 8A and 8B below) such as the type of the anode active material from which anode material particles 110 are made, the expansion coefficient of the anode active material, the expected and/or specified extent of expansion of anode material particles 110 during operation (see, e.g., FIG. 3C), expected level of cracking in the SEI (see, e.g., FIG. 3B) parameters of anode material particles 110 such as dimensions (diameter, volume, surface area), relative amount and number in anode 100, anode porosity, coatings of particles 110 and/or other materials in anode 100 (see e.g., FIG. 1B), as well as parameters of electrolyte 105 and its components, such as their molecular weight, density, reactivity towards the anode active material, ionic conductivity and the amount of electrolyte, and clearly according to the specific parameters and characteristics of ionic liquid additive(s) 135 such as size, molecular weight, form, electrostatic characteristics of the respective cation(s) 132 and anion(s) 131 (see, e.g., FIG. 2C), and the expected and/or specified number of layers of ionic liquid additive(s) 135 on anode material particles 110 during charging (see, e.g., FIGS. 2B and 2D). A few (non-limiting) of these considerations are illustrated in FIG. 3D schematically by the cross-hatched arrows, namely the type, expansion characteristics and dimensions of anode material particles 110, the number of layers of cations 132 and anions 131 of ionic liquid additive 135 which take part in MSEI 130 (indicated schematically as 130(1 . . . n), for non-limiting n=2 and n=4), which may further depend, among other parameters on the expansion state of anode material particles 110 and on other ingredients of electrolyte 105, and the shape, size, and electrostatic characteristics of cation(s) 132 and anion(s) 131 of ionic liquid additive(s) 135.

For example, in quantitative, non-limiting examples, assuming germanium as anode active material which may reach 270% expansion upon lithiation, and particle diameter of 100 nm, the surface area per particle upon lithiation may increase from ca. 31,000 nm$^2$ to ca. 61,000 nm$^2$. Depending on the number of required ionic liquid additive molecular layers 130(1 . . . n) and on the molecule area, the number of required ionic liquid molecules for covering the overall surface area of the anode active material particles may be calculated. For example, in a non-limiting calculation assuming three layers (n=3) at the maximal expansion of the particles and N,N-Diethyl-N-methyl-N-propylammonium (cation 132) and bis(fluorosulfonyl)imide (anion 131) as ionic liquid additive 135 (relating to cations 132 thereof for molecule size calculation—ca. 0.3 nm$^2$), ca. 620,000 molecules are required per particle, or ca. $10^{-18}$ mol ionic liquid additive 135. Proceeding with estimating the overall number of particles, their mass, the molar weight of the electrolyte and the ionic liquid additive, the volume % of ionic liquid additive 135 may be calculated. For example, for 70% active material in the anode, the number of particle was estimated as ca. 5.10$^{11}$, requiring ca. 5.10$^{-7}$ mol of ionic liquid additive 135 which is equivalent to ca. 0.05 mol/liter ionic liquid additive in electrolyte 105 (assuming electrolyte 85 comprising FEC:DMC (3:7) and 2% VC—FEC denoting fluorinated ethylene carbonates, DMC denoting dimethyl carbonate and VC denoting vinylene carbonate), or ca. 1.2% vol of ionic liquid additive 135 in electrolyte 105. Clearly, any adaptation of electrolyte 105 with respect to its ingredients, as well as any modification of the required number of layers 130 (e.g., n=1, 2, 5, 10 etc.) in expanded state yields different percentage, which may be taken into account when preparing electrolyte 105. For example, in certain embodiments, ionic liquid additive 135 concentration of 0.4% vol may be sufficient to provide one layer 130 at most expanded state of anode material particles 110 which corresponds to full lithiation. In other embodiments, lower percentage of active material in the anode may require using less ionic liquid additive 135, but not necessarily at a linear relation.

Similar calculations may be carried out for other anode active materials such as silicon (which may reach 400% expansion upon lithiation), tin (which may reach 330% expansion upon lithiation), alloys and/or mixtures thereof (with or without germanium) which may have intermediate expansion coefficients, and even less expanding anode active materials such as graphite (which typically expands by 10% upon intercalation), LTO (lithium titanate oxide) with minimal expansion (0.02%). Similar calculations may be carried out with respect to particle sizes and surface area, various types of ionic liquid 135 and various types of electrolyte 105, which are disclosed herein. The calculations presented above may be modified to determine the required concentration of ionic liquid additive 135 in electrolyte 105 using the corresponding materials.

Concluding from the examples presented above, the concentration of ionic liquid additive 135 in electrolyte 105 may be determined according to the disclosed guidelines and may vary greatly from embodiment to embodiment. While large concentrations of up to 20% may be used, some embodiments may comprise lower concentrations of 1% vol, 1-0.1% vol, 2-0.1% vol, or possibly even concentrations lower than 0.1%.

FIGS. 4A and 4B are high level schematic illustrations of an immobilized/mobilized SEI (I/MSEI) during charging and discharging, according to some embodiments of the invention. In certain embodiments, surface functionalization of the anode active material may enhance the functionality of MSEI 130, e.g., by increasing the affinity of ionic liquid 135 to the active material-electrolyte interface, and protect the interface from direct interaction with the organic solvent (of electrolyte 85). Surface functionalization may be applied by anode coatings or pre-coatings and/or by additional modifications of surface 112 of anode 100 (e.g., of anode material particles 110) and/or of the active material on anode surface 112. For example, a chemically bonded coating 145 of bonding molecules 116 such as large volume salt(s) on active material surface 112 may be used to keep some of ionic liquid 135 on surface 112 and reduce the probability of the organic solvent decomposition prior to the MSEI re-arrangement at the interface. FIGS. 4A and 4B schematically illustrate this effect by the retainment of at least some of cations 132 bonded to surface 112 even when the cell is not charged. FIGS. 4A and 4B schematically illustrate anode 100 (e.g., anode material particles 110) during charging 101C and discharging (or no charging, 101D) with ionic liquid additive 135 building MSEI 130 in charging state 101C, which may comprise an immobilized section 140A and a mobile section 140B, the former remaining in discharging state 101D bonded or associate with anode surface while the latter returning into electrolyte 105 in discharging state 101D. Coating 145 may represent a layer in which bonding molecules 116 are associated with an anode coating and/or attached to anode 100. Cations 132C and possibly anions 131C which stay bonded to bonding molecules 116 (immobilized section 140A of ionic liquid additive 135) are denoted differently from cations 132B and anions 131B which stay in electrolyte 105 (mobile section 140B of ionic liquid additive 135), to illustrate that a part (or possibly all) of electrolyte additive 135 is immobilized onto layer 145 of anode 100 during operation of the cell. Immobilized layer 140A at the interface may have a better affinity to ionic liquid 135 and less affinity toward organic solvent of electrolyte 85, and therefore keep the organic solvent away from the interface and reduce the probability for its decomposition.

In some embodiments, the bonding of ions of ionic liquid additive(s) 135 may involve bonding cations 132 or possibly anions 131 by bonding molecules 116 as the layer closest to surface 112. The bonding may be carried out during one or more first charging and discharging cycles of cell 150. In certain embodiments, the bonding of cations 132 and/or anions 131 may be carried out, at least partially, on active material 110 itself, even before the first charging cycle. The bonding of the ionic liquid to bonding layer 145 may be electrostatic and/or salt-like (ionic). In certain embodiments, the bonding may be at least partly covalent. The bonding may involve any number of ionic layers, typically a few layers, possibly providing a salt layer which isolates the organic solvent used for electrolyte 85 at least from active material 110 of anode 100.

Bonding molecules 116 may be ionic or have electron rich groups such as sodium aniline sulfonate. Bonding molecules 116 may comprise lithium cations and/or possibly magnesium cations, the latter possibly when the anode material is graphite. Non-limiting examples for bonding molecules 116 comprise lithium alkylsulfonate, poly(lithium alkylsulfonate), lithium sulfate, lithium phosphate, lithium phosphate monobasic, alkylhydroxamate salts and their acidic forms (e.g., lithium sulfonic acid, $LiHSO_4$, instead of lithium sulfonate, $Li_2SO_4$). In case of aluminum as anode material, bonding molecules 116 may comprise lithium cations and/or aluminum cations. The lithium in the following examples may thus be replaced in some embodiments by magnesium and/or aluminum. In case of graphite anodes, a wide range of activation techniques which yield oxidized graphite may be used to enhance chemical bonding of molecules 116 (e.g., using halides or alkoxides). See below an elaboration of bonding molecules 116 and their characteristics.

The chemical bonding of molecules 116 to anode 100 (e.g., to anode material particles 110) may be carried out, for example, in the anode slurry solution and/or in dry ball milling with anode material particles. The bonding mechanism may comprise, e.g., reaction(s) of the lithium sulfonates and/or salts with metal oxides, releasing the oxide and creating a direct chemical bond to metalloid surface 112, where the lithium cation remain partly charged ($Li^{\delta+}$) in the metalloid. For example, using a large volume salt with an additional anion group as bonding molecules 116 may create a salt surface 145 on metalloid material 110, which can both protect the interface and co-operate with ionic liquid additive 135 in electrolyte 105. Layer 145 may bind a stationary portion of ionic liquid additive 135 on metalloid surface 112 while the rest of ionic liquid additive 135 is mobilized in electrolyte 105, providing a hybrid ionic liquid additive which is partly bonded and partly free in electrolyte 105. Stationary portion 140A may increase the re-ordering rate of ionic liquid additive 135 on surface 115 during charging (101C), help repel organic electrolyte 85 from the interface and hence reduce the probability for the decomposition of the organic solvent. Non-limiting examples for bonding molecules 116 include large anionic salts or their acids which may be selected to sterically repel the smaller organic carbonates solvents (of electrolyte 85) from active material surface 112. Layer 145 and stationary portion 140A of ionic liquid additive 135 on metalloid surface 112 may be highly effective during the initial charging, and enable or support the building of a stable SEI during the formation cycle(s) which protects surface 112 and anode 100 during later operation, and prevent decomposition of electrolyte on anode 100 as well as lithium metallization thereupon.

The resulting SEI may be modified toward enhanced stability and be possibly provided with self-healing mechanisms through layer 145 and stationary portion 140A of ionic liquid additive 135.

In some embodiments, bonding molecules 116 are represented by formula I:

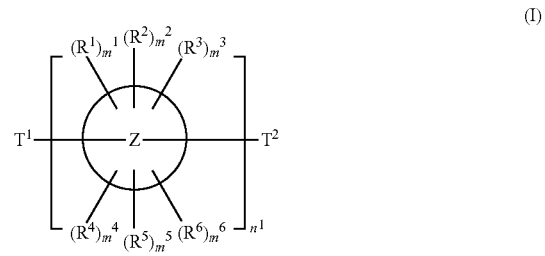

(I)

wherein:

each Z is independently selected from aryl, heterocycloalkyl, crown etheryl, cyclamyl, cyclenyl, 1,4,7-Triazacyclononanyl, hexacyclenyl, cryptandyl, naphthalenyl, anthracenyl, phenanthrenyl, tetracenyl, chrysenyl, triphenylenyl pyrenyl and pentacenyl;

$R^1$ is $[C(L^1)_2]_q^1$-$R^{101}$;

each $L^1$ is independently selected from H, F and $R^{101}$;

$R^2$, $R^3$, $R^4$, $R^5$, $R^6$ and $R^{101}$ are each independently selected from $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, C(O)$NH_2$, halide, tosylate, mesylate, $SO_2NHR$, triflate, isocyanate, cyanate, thiocyanate, isothiocyanate, R, cyano, $CF_3$, and $Si(OR)_3$;

each R is independently selected from methyl, ethyl, isopropyl, n-propyl, alkyl, haloalkyl, cycloalkyl, heterocycloalkyl, aryl, and benzyl;

each $M^1$ is independently Li, Na, K, Rb or Cs;

each $M^2$ is independently Be, Mg, Ca, Sr or Ba;

$T^1$ and $T^2$ are each independently absent, or selected from H, $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, C(O)$NH_2$, halide, tosylate, mesylate, $SO_2NHR$, triflate, isocyanate, cyanate, thiocyanate, isothiocyanate, R, cyano, $CF_3$, and $Si(OR)_3$;

$m^1$, $m^2$, $m^3$, $m^4$, $m^5$, and $m^6$ are each independently an integer between 0-6;

$n^1$ is an integer between 1-10;

$q^1$ is an integer between 0-10; and

Z is connected to any of $R^1$-$R^6$, $T^1$-$T^2$ or to any neighboring repeating unit in any possible substitution position and via one or more atoms, In some embodiments, bonding molecules 116 are represented by formula II:

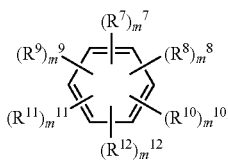
(II)

wherein:

$R^7$ is $[C(L^2)_2]_q{}^2$-$R^{102}$;

each $L^2$ is independently selected from H, F and $R^{102}$;

$R^8$, $R^9$, $R^{10}$, $R^{11}$, $R^{12}$ and $R^{102}$ are each independently selected from $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano and $Si(OR)_3$;

each R is independently selected from methyl, ethyl, isopropyl, n-propyl, alkyl, haloalkyl, cycloalkyl, heterocycloalkyl, aryl, and benzyl;

each $M^1$ is independently Li, Na, K, Rb or Cs;

each $M^2$ is independently Be, Mg, Ca, Sr or Ba;

$m^7$, $m^8$, $m^9$, $m^{10}$, $m^{11}$ and $m^{12}$ are each independently an integer between 0-6; and $q^2$ is an integer between 0-10.

In some embodiments, bonding molecules 116 are represented by formula III:

$$(L^3)_3C-R^{103} \quad (III)$$

wherein $R^{103}$ is $[C(L^4)_2]_q{}^3$-$R^{105}$;

each $L^3$ is independently selected from H, F and $R^{104}$;

each $L^4$ is independently selected from H, F and $R^{106}$;

$R^{104}$, $R^{105}$, and $R^{106}$ are each independently selected from $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;

each R is independently selected from methyl, ethyl, isopropyl, n-propyl, alkyl, haloalkyl, cycloalkyl, heterocycloalkyl, aryl, or benzyl;

each $M^1$ is independently Li, Na, K, Rb or Cs;

each $M^2$ is independently Be, Mg, Ca, Sr or Ba; and $q^3$ is an integer between 0-10.

In some embodiments, bonding molecules 116 are represented by formula IV:

(IV)

wherein:

$X^1$ and $X^2$ are each independently selected from S, O and $CH_2$;

$R^{13}$ and $R^{14}$ are each independently selected from $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;

each $M^1$ is independently Li, Na, K, Rb or Cs;

each $M^2$ is independently Be, Mg, Ca, Sr or Ba;

each R is independently selected from methyl, ethyl, isopropyl, n-propyl, alkyl, haloalkyl, cycloalkyl, heterocycloalkyl, aryl, or benzyl; and $n^2$, $n^3$, $n^4$ and $n^5$ are each independently an integer between 0-10, In some embodiments, bonding molecules 116 are represented by formula V:

(V)

wherein:

$X^3$ and $X^4$ are each independently selected from S, O and $CH_2$;

$R^{15}$ and $R^{16}$ are each independently selected from $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;

each $M^1$ is independently Li, Na, K, Rb or Cs;

each $M^2$ is independently Be, Mg, Ca, Sr or Ba;

each R is independently selected from methyl, ethyl, isopropyl, n-propyl, alkyl, haloalkyl, cycloalkyl, heterocycloalkyl, aryl, or benzyl; and $n^6$, and $n^7$ are each independently an integer between 0-10

In some embodiments, bonding molecules 116 are represented by formula VI:

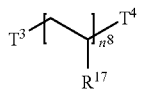
(VI)

wherein:
each $R^{17}$ is independently selected from $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
$T^3$ and $T^4$ are each independently selected from H, $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
each $M^1$ is independently Li, Na, K, Rb or Cs;
each $M^2$ is independently Be, Mg, Ca, Sr or Ba;
each R is independently selected from methyl, ethyl, isopropyl, n-propyl, alkyl, haloalkyl, cycloalkyl, heterocycloalkyl, aryl, or benzyl; and
$n^8$ is an integer between 2-10000.

In some embodiments, bonding molecules 116 are represented by formula VII:

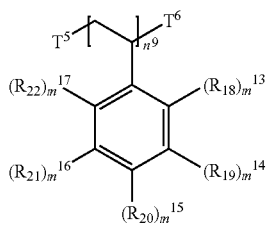
(VII)

wherein:
$R^{18}$, $R^{19}$, $R^{20}$, $R^{21}$ and $R^{22}$ are each independently selected from $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ and $Si(OR)_3$;
$T^5$ and $T^6$ are each independently selected from H, $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
each $M^1$ is independently Li, Na, K, Rb or Cs;
each $M^2$ is independently Be, Mg, Ca, Sr or Ba;
each R is independently selected from methyl, ethyl, isopropyl, n-propyl, alkyl, haloalkyl, cycloalkyl, heterocycloalkyl, aryl, and benzyl;
$n^9$ is an integer between 20-10000; and
$m^7$, $m^8$, $m^9$, $m^{10}$, $m^{11}$ and $m^{12}$ are each independently an integer between 0-5.

In some embodiments, bonding molecules 116 may be polymers, possibly crosslinked with inorganic crosslinkers. Non limiting examples of polymers include polymers represented by formula VI, polyvinylalcohol (PVA), polymethylmetacrylate (PMMA), polyacrylic acid (PAA), polyethylene glycol (PEG), polyvinylsulfonic acid and polyvinylpyrrolidone (PVP), or any combination thereof. Non limiting examples of inorganic crosslinkers include boron (B) oxides, zirconium complexes and tetralkoxysilanes or any combination thereof. Non limiting examples of boron (B) oxides include boric acid ($H_3BO_3$), salts of tetraborate ($B_4O_7{}^{2-}$) and boron trioxide ($B_2O_3$). In some embodiments, salts of tetraborate ($B_4O_7{}^{2-}$) are selected from the anion tetraborate and a cation of alkali metal or alkaline earth metal, aluminum cation ($Al^3$) or any combination thereof. In some embodiments, the boron (B) oxide is a lithium tetraborate salt ($Li_2B_4O_7$) (and see also borate salts 102A). Non limiting examples of zirconium complexes include zirconium complex of tetra-2-hydroxypropyl ethylenediamine and ammonium zirconium carbonate. Non limiting examples of tetraalkoxysilane include teraethoxysilane and tetrapropoxylsilane.

In some embodiments, bonding molecules 116 may comprise salts comprising cations selected from $H^+$, Li, Na, K, Rb, Cs, Be, Mg, Ca, Sr and Ba, $Al^{3+}$ or any combination thereof and anions selected from $RCOO^-$, $RSO_3^-$, $RPO_3{}^{2-}$, $RPO_4{}^{2-}$ or any combination thereof. In some embodiments, the salt is lithium sulfate ($Li_2SO_4$). In some embodiments, the salt is lithium phosphate monobasic ($H_2LiPO_4$). In some embodiments, the salt is lithium phosphate ($Li_3PO_4$). In some embodiments, the salt is phosphoric acid ($H_3PO_4$).

In some embodiments, bonding molecules 116 are represented at least by one of formulas I-VII.

In some embodiments, the invention is directed to a lithium ion cell comprising a modified graphite anode, represented by the formula Gr-Bz, wherein Gr is graphite anode and Bz is a benzyl moiety. In some embodiments, a benzyl moiety with a good leaving group is reacted with graphite anode and also with a non-nucleophilic base to form a modified graphite anode, wherein the graphite is attached covalently to the $CH_2$ moiety of the benzylic compound. Non-limiting examples of non-nucleophilic bases include 1,8-Diazabicyclo(5.4.0)undec-7-ene (DBU), N,N-Diisopropylethylamine (DIPEA) and 2,6-Di-tert-butylpyridine. In some embodiments, the non-nucleophilic base is 1,8-Diazabicyclo(5.4.0)undec-7-ene (DBU). In some embodiments the non-nucleophilic base is N,N-Diisopropylethylamine (DIPEA). In some embodiments the non-nucleophilic base is 2,6-Di-tert-butylpyridine. In some embodiments the non-nucleophilic base is any combination of the above referenced non nucleophilic bases. Non limiting examples of good leaving groups are selected from halides (e.g., Cl, Br, I), mesylate, triflate and tosylate.

In some embodiments, the invention directs to a lithium ion cell comprising a modified graphite anode, represented by the formula Gr-SR, wherein Gr is graphite anode, SR is a thiolether moiety, wherein R is selected from alkyl, haloalkyl, cycloalkyl, heterocycloalkyl, aryl, and benzyl. In some embodiments, a thiol, RSH, is reacted with graphite anode and a radical initiator, to form a modified graphite anode, wherein the graphite is attached covalently to the S atom of the thiolether compound. Non-limiting examples of a radical initiator include azo compounds such as azobisisobutyronitrile (AIBN) and 1,1'-Azobis(cyclohexanecarbonitrile) (ABCN), organic peroxides such as benzoyl peroxide and ditertbutylperoxide and inorganic peroxides, e.g. peroxydisulfate. In some embodiments, the radical initiator is azobisisobutyronitrile (AIBN). In some embodiments, the radical initiator is 1,1'-Azobis(cyclohexanecarbonitrile) (ABCN). In some embodiments, the radical initiator is benzoyl peroxide. In some embodiments, the radical initiator is ditertbutylperoxide. In some embodiments, the radical initiator is peroxydisulfate. In some embodiments, the radical initiator is any combination of the above referenced radical initiators.

In some embodiments, the invention directs to a lithium ion cell comprising a modified Si anode. In some embodiments, the Si anode is connected covalently to bonding molecule 116, represented by formula I-VII. In some embodiments, a Si anode rich in silanol bonds, Si—OH, is reacted with the bonding molecule to afford the modified Si anode. In some embodiments, a Si anode rich in silanol bonds, Si—OH, is reacted with $Si(OR)_3$ moiety in the bonding molecule to afford the modified Si anode. In some embodiments, bonding molecule 116, represented by formula I-VII, is connected to the Si anode via silanol linkage, Si—O—Si.

In some embodiments, Z is aryl, heterocycloalkyl, crown etheryl, cyclamyl, cyclenyl, cryptandyl, naphthalenyl, anthracenyl, phenanthrenyl, tetracenyl, chrysenyl, triphenylenyl pyrenyl or pentacenyl. In some embodiments, Z is aryl. In some embodiments, Z is heterocycloalkyl. In some embodiments, Z is crown etheryl. In some embodiments, Z is cyclamyl. In some embodiments, Z is cyclenyl. In some embodiments, Z is cryptandyl. In some embodiments, Z is naphthalenyl. In some embodiments, Z is anthracenyl. In some embodiments, Z is anthracenyl. In some embodiments, Z is phenanthrenyl. In some embodiments, Z is tetracenyl. In some embodiments, Z is chrysenyl. In some embodiments, Z is triphenylenyl. In some embodiments, Z is pyrenyl. In some embodiments, Z is pentacenyl.

In some embodiments, $L^1$ is H, F or $R^{101}$. In some embodiments, $L^1$ is H. In some embodiments, $L^1$ is F. In some embodiments, $L^1$ is $R^{101}$.

In some embodiments, $L^2$ is H, F or $R^{102}$. In some embodiments, $L^2$ is H. In some embodiments, $L^2$ is F. In some embodiments, $L^2$ is $R^{102}$.

In some embodiments, $L^3$ is H, F or $R^{104}$. In some embodiments, $L^3$ is H. In some embodiments, $L^3$ is F. In some embodiments, $L^3$ is $R^{104}$.

In some embodiments, $L^4$ is H, F or $R^{106}$. In some embodiments, $L^4$ is H. In some embodiments, $L^4$ is F. In some embodiments, $L^4$ is $R^{106}$.

In some embodiments, $R^2$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^2$ is $CO_2H$. In some embodiments, $R^2$ is $CO_2M^1$. In some embodiments, $R^2$ is $CO_2R$. In some embodiments, $R^2$ is $SO_3H$. In some embodiments, $R^2$ is $SO_3M^1$. In some embodiments, $R^2$ is $PO_3H_2$. In some embodiments, $R^2$ is $PO_3M^1_2$. In some embodiments, $R^2$ is $PO_3M^1H$. In some embodiments, $R^2$ is $PO_4H_2$. In some embodiments, $R^2$ is $PO_4M^1_2$. In some embodiments, $R^2$ is $PO_4M^1H$. In some embodiments, $R^2$ is $PO_4M^2$. In some embodiments, $R^2$ is C(O)NHOH. In some embodiments, $R^2$ is $NH_2$. In some embodiments, $R^2$ is NHR. In some embodiments, $R^2$ is $N(R)_2$. In some embodiments, $R^2$ is $NO_2$. In some embodiments, $R^2$ is COOR. In some embodiments, $R^2$ is CHO. In some embodiments, $R^2$ is $CH_2OH$. In some embodiments, $R^2$ is OH. In some embodiments, $R^2$ is OR. In some embodiments, $R^3$ is SH. In some embodiments, $R^2$ is SR. In some embodiments, $R^2$ is $C(O)N(R)_2$. In some embodiments, $R^2$ is C(O)NHR. In some embodiments, $R^2$ is $C(O)NH_2$. In some embodiments, $R^2$ is halide. In some embodiments, $R^2$ is tosylate. In some embodiments, $R^2$ is mesylate. In some embodiments, $R^2$ is $SO_2NHR$. In some embodiments, $R^2$ is triflate. In some embodiments, $R^2$ is isocyanate. In some embodiments, $R^2$ is cyanate. In some embodiments, $R^2$ is thiocyanate. In some embodiments, $R^2$ is isothiocyanate. In some embodiments, $R^2$ is R. In some embodiments, $R^2$ is cyano. In some embodiments, $R^2$ is $CF_3$. In some embodiments, $R^2$ is $Si(OR)_3$.

In some embodiments, $R^3$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^3$ is $CO_2H$. In some embodiments, $R^3$ is $CO_2M^1$. In some embodiments, $R^3$ is $CO_2R$. In some embodiments, $R^3$ is $SO_3H$. In some embodiments, $R^3$ is $SO_3M^1$. In some embodiments, $R^3$ is $PO_3H_2$. In some embodiments, $R^3$ is $PO_3M^1_2$. In some embodiments, $R^3$ is $PO_3M^1H$. In some embodiments, $R^3$ is $PO_4H_2$. In some embodiments, $R^3$ is $PO_4M^1_2$. In some embodiments, $R^3$ is $PO_4M^1H$. In some embodiments, $R^3$ is $PO_4M^2$. In some embodiments, $R^3$ is C(O)NHOH. In some embodiments, $R^3$ is $NH_2$. In some embodiments, $R^3$ is NHR. In some embodiments, $R^3$ is $N(R)_2$. In some embodiments, $R^3$ is $NO_2$. In some embodiments, $R^3$ is COOR. In some embodiments, $R^3$ is CHO. In some embodiments, $R^3$ is $CH_2OH$. In some embodiments, $R^3$ is OH. In some embodiments, $R^3$ is OR. In some embodiments, $R^3$ is SH. In some embodiments, $R^3$ is SR. In some embodiments, $R^3$ is $C(O)N(R)_2$. In some embodiments, $R^3$ is C(O)NHR. In some embodiments, $R^3$ is $C(O)NH_2$. In some embodiments, $R^3$ is halide. In some embodiments, $R^3$ is tosylate. In some embodiments, $R^3$ is mesylate. In some embodiments, $R^3$ is $SO_2NHR$. In some embodiments, $R^3$ is triflate. In some embodiments, $R^3$ is isocyanate. In some embodiments, $R^3$ is cyanate. In some embodiments, $R^3$ is thiocyanate. In some embodiments, $R^3$ is isothiocyanate. In some embodiments, $R^3$ is R. In some embodiments, $R^3$ is cyano. In some embodiments, $R^3$ is $CF_3$. In some embodiments, $R^3$ is $Si(OR)_3$.

In some embodiments, $R^4$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^4$ is $CO_2H$. In some embodiments, $R^4$ is $CO_2M^1$. In some embodiments, $R^4$ is $CO_2R$. In some embodiments, $R^4$ is $SO_3H$. In some embodiments, $R^4$ is $SO_3M^1$. In some embodiments, $R^4$ is $PO_3H_2$. In some embodiments, $R^4$ is $PO_3M^1_2$. In some embodiments, $R^4$ is $PO_3M^1H$. In some embodiments, $R^4$ is $PO_4H_2$. In some embodiments, $R^4$ is $PO_4M^1_2$. In some embodiments, $R^4$ is $PO_4M^1H$. In some embodiments, $R^4$ is $PO_4M^2$. In some embodiments, $R^4$ is C(O)NHOH. In some embodiments, $R^4$ is $NH_2$. In some embodiments, $R^4$ is NHR. In some embodiments, $R^4$ is $N(R)_2$. In some embodiments, $R^4$ is $NO_2$. In some embodiments, $R^4$ is COOR. In some embodiments, $R^4$ is CHO. In some embodiments, $R^4$ is $CH_2OH$. In some embodiments, $R^4$ is OH. In some embodiments, $R^4$ is OR. In some embodiments, $R^4$ is SH. In some embodiments, $R^4$ is SR. In some embodiments, $R^4$ is $C(O)N(R)_2$. In some embodiments, $R^4$ is $C(O)NHR$. In some embodiments, $R^4$ is $C(O)NH_2$. In some embodiments, $R^4$ is halide. In some embodiments, $R^4$ is tosylate. In some embodiments, $R^4$ is mesylate. In some embodiments, $R^4$ is $SO_2NHR$. In some embodiments, $R^4$ is triflate. In some embodiments, $R^4$ is isocyanate. In some embodiments, $R^4$ is cyanate. In some embodiments, $R^4$ is thiocyanate. In some embodiments, $R^4$ is isothiocyanate. In some embodiments, $R^4$ is R. In some embodiments, $R^4$ is cyano. In some embodiments, $R^4$ is $CF_3$. In some embodiments, $R^4$ is $Si(OR)_3$.

In some embodiments, $R^5$ is $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^5$ is $CO_2H$. In some embodiments, $R^5$ is $CO_2M^1$. In some embodiments, $R^5$ is $CO_2R$. In some embodiments, $R^5$ is $SO_3H$. In some embodiments, $R^5$ is $SO_3M^1$. In some embodiments, $R^5$ is $PO_3H_2$. In some embodiments, $R^5$ is $PO_3M^1{}_2$. In some embodiments, $R^5$ is $PO_3M^1H$. In some embodiments, $R^5$ is $PO_4H_2$. In some embodiments, $R^5$ is $PO_4M^1{}_2$. In some embodiments, $R^5$ is $PO_4M^1H$. In some embodiments, $R^5$ is $PO_4M^2$. In some embodiments, $R^5$ is $C(O)NHOH$. In some embodiments, $R^5$ is $NH_2$. In some embodiments, $R^5$ is $NHR$. In some embodiments, $R^5$ is $N(R)_2$. In some embodiments, $R^5$ is $NO_2$. In some embodiments, $R^5$ is $COOR$. In some embodiments, $R^5$ is $CHO$. In some embodiments, $R^5$ is $CH_2OH$. In some embodiments, $R^5$ is $OH$. In some embodiments, $R^5$ is $OR$. In some embodiments, $R^5$ is $SH$. In some embodiments, $R^5$ is $SR$. In some embodiments, $R^5$ is $C(O)N(R)_2$. In some embodiments, $R^5$ is $C(O)NHR$. In some embodiments, $R^5$ is $C(O)NH_2$. In some embodiments, $R^5$ is halide. In some embodiments, $R^5$ is tosylate. In some embodiments, $R^5$ is mesylate. In some embodiments, $R^5$ is $SO_2NHR$. In some embodiments, $R^5$ is triflate. In some embodiments, $R^5$ is isocyanate. In some embodiments, $R^5$ is cyanate. In some embodiments, $R^5$ is thiocyanate. In some embodiments, $R^5$ is isothiocyanate. In some embodiments, $R^5$ is R. In some embodiments, $R^5$ is cyano. In some embodiments, $R^5$ is $CF_3$. In some embodiments, $R^5$ is $Si(OR)_3$.

In some embodiments, $R^6$ is $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^6$ is $CO_2H$. In some embodiments, $R^6$ is $CO_2M^1$. In some embodiments, $R^6$ is $CO_2R$. In some embodiments, $R^6$ is $SO_3H$. In some embodiments, $R^6$ is $SO_3M^1$. In some embodiments, $R^6$ is $PO_3H_2$. In some embodiments, $R^6$ is $PO_3M^1{}_2$. In some embodiments, $R^6$ is $PO_3M^1H$. In some embodiments, $R^6$ is $PO_4H_2$. In some embodiments, $R^6$ is $PO_4M^1{}_2$. In some embodiments, $R^6$ is $PO_4M^1H$. In some embodiments, $R^6$ is $PO_4M^2$. In some embodiments, $R^6$ is $C(O)NHOH$. In some embodiments, $R^6$ is $NH_2$. In some embodiments, $R^6$ is $NHR$. In some embodiments, $R^6$ is $N(R)_2$. In some embodiments, $R^6$ is $NO_2$. In some embodiments, $R^6$ is $COOR$. In some embodiments, $R^6$ is $CHO$. In some embodiments, $R^6$ is $CH_2OH$. In some embodiments, $R^6$ is $OH$. In some embodiments, $R^6$ is $OR$. In some embodiments, $R^6$ is $SH$. In some embodiments, $R^6$ is $SR$. In some embodiments, $R^5$ is $C(O)N(R)_2$. In some embodiments, $R^5$ is $C(O)NHR$. In some embodiments, $R^5$ is $C(O)NH_2$. In some embodiments, $R^6$ is halide. In some embodiments, $R^6$ is tosylate. In some embodiments, $R^6$ is mesylate. In some embodiments, $R^6$ is $SO_2NHR$. In some embodiments, $R^6$ is triflate. In some embodiments, $R^6$ is isocyanate. In some embodiments, $R^6$ is cyanate. In some embodiments, $R^6$ is thiocyanate. In some embodiments, $R^6$ is isothiocyanate. In some embodiments, $R^6$ is R. In some embodiments, $R^6$ is cyano. In some embodiments, $R^6$ is $CF_3$. In some embodiments, $R^6$ is $Si(OR)_3$.

In some embodiments, $R^8$ is $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^8$ is $CO_2H$. In some embodiments, $R^8$ is $CO_2M^1$. In some embodiments, $R^8$ is $CO_2R$. In some embodiments, $R^8$ is $SO_3H$. In some embodiments, $R^8$ is $SO_3M^1$. In some embodiments, $R^8$ is $PO_3H_2$. In some embodiments, $R^8$ is $PO_3M^1{}_2$. In some embodiments, $R^5$ is $PO_3M^1H$. In some embodiments, $R^8$ is $PO_4H_2$. In some embodiments, $R^8$ is $PO_4M^1{}_2$. In some embodiments, $R^8$ is $PO_4M^1H$. In some embodiments, $R^8$ is $PO_4M^2$. In some embodiments, $R^8$ is $C(O)NHOH$. In some embodiments, $R^8$ is $NH_2$. In some embodiments, $R^8$ is $NHR$. In some embodiments, $R^8$ is $N(R)_2$. In some embodiments, $R^8$ is $NO_2$. In some embodiments, $R^8$ is $COOR$. In some embodiments, $R^8$ is $CHO$. In some embodiments, $R^8$ is $CH_2OH$. In some embodiments, $R^8$ is $OH$. In some embodiments, $R^8$ is $OR$. In some embodiments, $R^8$ is $SH$. In some embodiments, $R^8$ is $SR$. In some embodiments, $R^8$ is $C(O)N(R)_2$. In some embodiments, $R^8$ is $C(O)NHR$. In some embodiments, $R^8$ is $C(O)NH_2$. In some embodiments, $R^8$ is halide. In some embodiments, $R^8$ is tosylate. In some embodiments, $R^8$ is mesylate. In some embodiments, $R^8$ is $SO_2NHR$. In some embodiments, $R^8$ is triflate. In some embodiments, $R^8$ is isocyanate. In some embodiments, $R^8$ is cyanate. In some embodiments, $R^8$ is thiocyanate. In some embodiments, $R^8$ is isothiocyanate. In some embodiments, $R^8$ is R. In some embodiments, $R^8$ is cyano. In some embodiments, $R^8$ is $CF_3$. In some embodiments, $R^8$ is $Si(OR)_3$.

In some embodiments, $R^9$ is $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$ or $Si(OR)_3$. In some embodiments, $R^9$ is $CO_2H$. In some embodiments, $R^9$ is $CO_2M^1$. In some embodiments, $R^9$ is $CO_2R$. In some embodiments, $R^9$ is $SO_3H$. In some embodiments, $R^9$ is $SO_3M^1$. In some embodiments, $R^9$ is $PO_3H_2$. In some embodiments, $R^9$ is $PO_3M^1{}_2$. In some embodiments, $R^9$ is $PO_3M^1H$. In some embodiments, $R^9$ is $PO_4H_2$. In some embodiments, $R^9$ is $PO_4M^1{}_2$. In some embodiments, $R^9$ is $PO_4M^1H$. In some embodiments, $R^9$ is $PO_4M^2$. In some embodiments, $R^9$ is $C(O)NHOH$. In some embodiments, $R^9$ is $NH_2$. In some embodiments, $R^9$ is $NHR$. In some embodiments, $R^9$ is $N(R)_2$. In some embodiments, $R^9$ is $NO_2$. In some embodiments, $R^9$ is $COOR$. In some embodiments, $R^9$ is $CHO$. In some embodiments, $R^9$ is $CH_2OH$. In some embodiments, $R^9$ is $OH$. In some embodiments, $R^9$ is $OR$. In some embodiments, $R^5$ is $SH$. In some embodiments, $R^9$ is $SR$. In some embodiments, $R^9$ is $C(O)N(R)_2$. In some embodiments, $R^9$ is $C(O)NHR$. In some embodiments, $R^9$ is $C(O)$ $NH_2$. In some embodiments, $R^9$ is halide. In some embodiments, $R^9$ is tosylate. In some embodiments, $R^9$ is mesylate. In some embodiments, $R^9$ is $SO_2NHR$. In some embodiments, $R^9$ is triflate. In some embodiments, $R^9$ is isocyanate. In some embodiments, $R^9$ is cyanate. In some embodiments, $R^9$ is thiocyanate. In some embodiments, $R^9$ is isothiocyanate. In some embodiments, $R^9$ is R. In some embodiments, $R^9$ is cyano. In some embodiments, $R^9$ is $CF_3$. In some embodiments, $R^9$ is $Si(OR)_3$.

In some embodiments, $R^{10}$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{10}$ is $CO_2H$. In some embodiments, $R^{10}$ is $CO_2M^1$. In some embodiments, $R^{10}$ is $CO_2R$. In some embodiments, $R^{10}$ is $SO_3H$. In some embodiments, $R^{10}$ is $SO_3M^1$. In some embodiments, $R^{10}$ is $PO_3H_2$. In some embodiments, $R^{10}$ is $PO_3M^1_2$. In some embodiments, $R^{10}$ is $PO_3M^1H$. In some embodiments, $R^{10}$ is $PO_4H_2$. In some embodiments, $R^{10}$ is $PO_4M^1_2$. In some embodiments, $R^{10}$ is $PO_4M^1H$. In some embodiments, $R^{10}$ is $PO_4M^2$. In some embodiments, $R^{10}$ is $C(O)NHOH$. In some embodiments, $R^{10}$ is $NH_2$. In some embodiments, $R^{10}$ is $NHR$. In some embodiments, $R^{10}$ is $N(R)_2$. In some embodiments, $R^{10}$ is $NO_2$. In some embodiments, $R^{10}$ is $COOR$. In some embodiments, $R^{10}$ is $CHO$. In some embodiments, $R^{10}$ is $CH_2OH$. In some embodiments, $R^{10}$ is $OH$. In some embodiments, $R^{10}$ is $OR$. In some embodiments, $R^{10}$ is $SH$. In some embodiments, $R^{10}$ is $SR$. In some embodiments, $R^{10}$ is $C(O)N(R)_2$. In some embodiments, $R^{10}$ is $C(O)NHR$. In some embodiments, $R^{10}$ is $C(O)NH_2$. In some embodiments, $R^{10}$ is halide. In some embodiments, $R^{10}$ is tosylate. In some embodiments, $R^{10}$ is mesylate. In some embodiments, $R^{10}$ is $SO_2NHR$. In some embodiments, $R^{10}$ is triflate. In some embodiments, $R^{10}$ is isocyanate. In some embodiments, $R^{10}$ is cyanate. In some embodiments, $R^{10}$ is thiocyanate. In some embodiments, $R^{10}$ is isothiocyanate. In some embodiments, $R^{10}$ is R. In some embodiments, $R^{10}$ is cyano. In some embodiments, $R^{10}$ is $CF_3$. In some embodiments, $R^{10}$ is $Si(OR)_3$.

In some embodiments, $R^{11}$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{11}$ is $CO_2H$. In some embodiments, $R^{11}$ is $CO_2M^1$. In some embodiments, $R^{11}$ is $CO_2R$. In some embodiments, $R^{11}$ is $SO_3H$. In some embodiments, $R^{11}$ is $SO_3M^1$. In some embodiments, $R^{11}$ is $PO_3H_2$. In some embodiments, $R^{11}$ is $PO_3M^1_2$. In some embodiments, $R^{11}$ is $PO_3M^1H$. In some embodiments, $R^{11}$ is $PO_4H_2$. In some embodiments, $R^{11}$ is $PO_4M^1_2$. In some embodiments, $R^{11}$ is $PO_4M^1H$. In some embodiments, $R^{11}$ is $PO_4M^2$. In some embodiments, $R^{11}$ is $C(O)NHOH$. In some embodiments, $R^{11}$ is $NH_2$. In some embodiments, $R^{11}$ is $NHR$. In some embodiments, $R^{11}$ is $N(R)_2$. In some embodiments, $R^{11}$ is $NO_2$. In some embodiments, $R^{11}$ is $COOR$. In some embodiments, $R^{11}$ is $CHO$. In some embodiments, $R^{11}$ is $CH_2OH$. In some embodiments, $R^{11}$ is $OH$. In some embodiments, $R^{11}$ is $OR$. In some embodiments, $R^{11}$ is $SH$. In some embodiments, $R^{11}$ is $SR$. In some embodiments, $R^{11}$ is $C(O)N(R)_2$. In some embodiments, $R^{11}$ is $C(O)NHR$. In some embodiments, $R^{11}$ is $C(O)NH_2$. In some embodiments, $R^{11}$ is halide. In some embodiments, $R^{11}$ is tosylate. In some embodiments, $R^{11}$ is mesylate. In some embodiments, $R^{11}$ is $SO_2NHR$. In some embodiments, $R^{11}$ is triflate. In some embodiments, $R^{11}$ is isocyanate. In some embodiments, $R^{11}$ is cyanate. In some embodiments, $R^{11}$ is thiocyanate. In some embodiments, $R^{11}$ is isothiocyanate. In some embodiments, $R^{11}$ is R. In some embodiments, $R^{11}$ is cyano. In some embodiments, $R^{11}$ is $CF_3$. In some embodiments, $R^{11}$ is $Si(OR)_3$.

In some embodiments, $R^{12}$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{12}$ is $CO_2H$. In some embodiments, $R^{12}$ is $CO_2M^1$. In some embodiments, $R^{12}$ is $CO_2R$. In some embodiments, $R^{12}$ is $SO_3H$. In some embodiments, $R^{12}$ is $SO_3M^1$. In some embodiments, $R^{12}$ is $PO_3H_2$. In some embodiments, $R^{12}$ is $PO_3M^1_2$. In some embodiments, $R^{12}$ is $PO_3M^1H$. In some embodiments, $R^{12}$ is $PO_4H_2$. In some embodiments, $R^{12}$ is $PO_4M^1_2$. In some embodiments, $R^{12}$ is $PO_4M^1H$. In some embodiments, $R^{12}$ is $PO_4M^2$. In some embodiments, $R^{12}$ is $C(O)NHOH$. In some embodiments, $R^{12}$ is $NH_2$. In some embodiments, $R^{12}$ is $NHR$. In some embodiments, $R^{12}$ is $N(R)_2$. In some embodiments, $R^{12}$ is $NO_2$. In some embodiments, $R^{12}$ is $COOR$. In some embodiments, $R^{12}$ is $CHO$. In some embodiments, $R^{12}$ is $CH_2OH$. In some embodiments, $R^{12}$ is $OH$. In some embodiments, $R^{12}$ is $OR$. In some embodiments, $R^{12}$ is $SH$. In some embodiments, $R^{12}$ is $SR$. In some embodiments, $R^{12}$ is $C(O)N(R)_2$. In some embodiments, $R^{12}$ is $C(O)NHR$. In some embodiments, $R^{12}$ is $C(O)NH_2$. In some embodiments, $R^{12}$ is halide. In some embodiments, $R^{12}$ is tosylate. In some embodiments, $R^{12}$ is mesylate. In some embodiments, $R^{12}$ is $SO_2NHR$. In some embodiments, $R^{12}$ is triflate. In some embodiments, $R^{12}$ is isocyanate. In some embodiments, $R^{12}$ is cyanate. In some embodiments, $R^{12}$ is thiocyanate. In some embodiments, $R^{12}$ is isothiocyanate. In some embodiments, $R^{12}$ is R. In some embodiments, $R^{12}$ is cyano. In some embodiments, $R^{12}$ is $CF_3$. In some embodiments, $R^5$ is $Si(OR)_3$.

In some embodiments, $R^{13}$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{13}$ is $CO_2H$. In some embodiments, $R^{13}$ is $CO_2M^1$. In some embodiments, $R^{13}$ is $CO_2R$. In some embodiments, $R^{13}$ is $SO_3H$. In some embodiments, $R^{13}$ is $SO_3M^1$. In some embodiments, $R^{13}$ is $PO_3H_2$. In some embodiments, $R^{13}$ is $PO_3M^1_2$. In some embodiments, $R^{13}$ is $PO_3M^1H$. In some embodiments, $R^{13}$ is $PO_4H_2$. In some embodiments, $R^{13}$ is $PO_4M^1_2$. In some embodiments, $R^{13}$ is $PO_4M^1H$. In some embodiments, $R^{13}$ is $PO_4M^2$. In some embodiments, $R^{13}$ is $C(O)NHOH$. In some embodiments, $R^{13}$ is $NH_2$. In some embodiments, $R^{13}$ is $NHR$. In some embodiments, $R^{13}$ is $N(R)_2$. In some embodiments, $R^{13}$ is $NO_2$. In some embodiments, $R^{13}$ is $COOR$. In some embodiments, $R^{13}$ is $CHO$. In some embodiments, $R^{13}$ is $CH_2OH$. In some embodiments, $R^{13}$ is $OH$. In some embodiments, $R^{13}$ is $OR$. In some embodiments, $R^{13}$ is $SH$. In some embodiments, $R^5$ is $SR$. In some embodiments, $R^{13}$ is $C(O)N(R)_2$. In some embodiments, $R^{13}$ is $C(O)NHR$. In some embodiments, $R^{13}$ is $C(O)NH_2$. In some embodiments, $R^{13}$ is halide. In some embodiments, $R^{13}$ is tosylate. In some embodiments, $R^{13}$ is mesylate. In some embodiments, $R^{13}$ is $SO_2NHR$. In some embodiments, $R^{13}$ is triflate. In some embodiments, $R^{13}$ is isocyanate. In some embodiments, $R^{13}$ is cyanate. In some embodiments, $R^{13}$ is thiocyanate. In some embodiments, $R^{13}$ is isothiocyanate. In some embodiments, $R^{13}$ is R. In some embodiments, $R^{13}$ is cyano. In some embodiments, $R^{13}$ is $CF_3$. In some embodiments, $R^{13}$ is $Si(OR)_3$.

In some embodiments, $R^{14}$ is $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{14}$ is $CO_2H$. In some embodiments, $R^{14}$ is $CO_2M^1$. In some embodiments, $R^{14}$ is $CO_2R$. In some embodiments, $R^{14}$ is $SO_3H$. In some embodiments, $R^{14}$ is $SO_3M^1$. In some embodiments, $R^{14}$ is $PO_3H_2$. In some embodiments, $R^{14}$ is $PO_3M^1{}_2$. In some embodiments, $R^{14}$ is $PO_3M^1H$. In some embodiments, $R^{14}$ is $PO_4H_2$. In some embodiments, $R^{14}$ is $PO_4M^1{}_2$. In some embodiments, $R^{14}$ is $PO_4M^1H$. In some embodiments, $R^{14}$ is $PO_4M^2$. In some embodiments, $R^{14}$ is $C(O)NHOH$. In some embodiments, $R^{14}$ is $NH_2$. In some embodiments, $R^{14}$ is NHR. In some embodiments, $R^{14}$ is $N(R)_2$. In some embodiments, $R^{14}$ is $NO_2$. In some embodiments, $R^{14}$ is COOR. In some embodiments, $R^{14}$ is CHO. In some embodiments, $R^{14}$ is $CH_2OH$. In some embodiments, $R^{14}$ is OH. In some embodiments, $R^{14}$ is OR. In some embodiments, $R^{14}$ is SH. In some embodiments, $R^{14}$ is SR. In some embodiments, $R^{14}$ is $C(O)N(R)_2$. In some embodiments, $R^{14}$ is $C(O)NHR$. In some embodiments, $R^{14}$ is $C(O)NH_2$. In some embodiments, $R^{14}$ is halide. In some embodiments, $R^{14}$ is tosylate. In some embodiments, $R^{14}$ is mesylate. In some embodiments, $R^{14}$ is $SO_2NHR$. In some embodiments, $R^{14}$ is triflate. In some embodiments, $R^{14}$ is isocyanate. In some embodiments, $R^{14}$ is cyanate. In some embodiments, $R^{14}$ is thiocyanate. In some embodiments, $R^{14}$ is isothiocyanate. In some embodiments, $R^{14}$ is R. In some embodiments, $R^{14}$ is cyano. In some embodiments, $R^{14}$ is $CF_3$. In some embodiments, $R^{14}$ is $Si(OR)_3$.

In some embodiments, $R^{15}$ is $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{15}$ is $CO_2H$. In some embodiments, $R^{15}$ is $CO_2M^1$. In some embodiments, $R^{15}$ is $CO_2R$. In some embodiments, $R^{15}$ is $SO_3H$. In some embodiments, $R^{15}$ is $SO_3M^1$. In some embodiments, $R^{15}$ is $PO_3H_2$. In some embodiments, $R^{15}$ is $PO_3M^1{}_2$. In some embodiments, $R^{15}$ is $PO_3M^1H$. In some embodiments, $R^{15}$ is $PO_4H_2$. In some embodiments, $R^{15}$ is $PO_4M^1{}_2$. In some embodiments, $R^{15}$ is $PO_4M^1H$. In some embodiments, $R^{15}$ is $PO_4M^2$. In some embodiments, $R^{15}$ is $C(O)NHOH$. In some embodiments, $R^{15}$ is $NH_2$. In some embodiments, $R^{15}$ is NHR. In some embodiments, $R^{15}$ is $N(R)_2$. In some embodiments, $R^{15}$ is $NO_2$. In some embodiments, $R^{15}$ is COOR. In some embodiments, $R^{15}$ is CHO. In some embodiments, $R^{15}$ is $CH_2OH$. In some embodiments, $R^{15}$ is OH. In some embodiments, $R^{15}$ is OR. In some embodiments, $R^{15}$ is SH. In some embodiments, $R^{15}$ is SR. In some embodiments, $R^{15}$ is $C(O)N(R)_2$. In some embodiments, $R^{15}$ is $C(O)NHR$. In some embodiments, $R^{15}$ is $C(O)NH_2$. In some embodiments, $R^{15}$ is halide. In some embodiments, $R^{15}$ is tosylate. In some embodiments, $R^{15}$ is mesylate. In some embodiments, $R^{15}$ is $SO_2NHR$. In some embodiments, $R^{15}$ is triflate. In some embodiments, $R^{15}$ is isocyanate. In some embodiments, $R^{15}$ is cyanate. In some embodiments, $R^{15}$ is thiocyanate. In some embodiments, $R^{15}$ is isothiocyanate. In some embodiments, $R^{15}$ is R. In some embodiments, $R^{15}$ is cyano. In some embodiments, $R^{15}$ is $CF_3$. In some embodiments, $R^{15}$ is $Si(OR)_3$.

In some embodiments, $R^{16}$ is $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{16}$ is $CO_2H$. In some embodiments, $R^{16}$ is $CO_2M^1$. In some embodiments, $R^{16}$ is $CO_2R$. In some embodiments, $R^{16}$ is $SO_3H$. In some embodiments, $R^{16}$ is $SO_3M^1$. In some embodiments, $R^{16}$ is $PO_3H_2$. In some embodiments, $R^{16}$ is $PO_3M^1{}_2$. In some embodiments, $R^{16}$ is $PO_3M^1H$. In some embodiments, $R^{16}$ is $PO_4H_2$. In some embodiments, $R^{16}$ is $PO_4M^1{}_2$. In some embodiments, $R^{16}$ is $PO_4M^1H$. In some embodiments, $R^{16}$ is $PO_4M^2$. In some embodiments, $R^{16}$ is $C(O)NHOH$. In some embodiments, $R^{16}$ is $NH_2$. In some embodiments, $R^{16}$ is NHR. In some embodiments, $R^{16}$ is $N(R)_2$. In some embodiments, $R^{16}$ is $NO_2$. In some embodiments, $R^{16}$ is COOR. In some embodiments, $R^{16}$ is CHO. In some embodiments, $R^{16}$ is $CH_2OH$. In some embodiments, $R^{16}$ is OH. In some embodiments, $R^{16}$ is OR. In some embodiments, $R^{16}$ is SH. In some embodiments, $R^{16}$ is SR. In some embodiments, $R^{16}$ is $C(O)N(R)_2$. In some embodiments, $R^{16}$ is $C(O)NHR$. In some embodiments, $R^{16}$ is $C(O)NH_2$. In some embodiments, $R^{16}$ is halide. In some embodiments, $R^{16}$ is tosylate. In some embodiments, $R^{16}$ is $SO_2NHR$. In some embodiments, $R^{16}$ is triflate. In some embodiments, $R^{16}$ is isocyanate. In some embodiments, $R^{16}$ is cyanate. In some embodiments, $R^{16}$ is thiocyanate. In some embodiments, $R^{16}$ is isothiocyanate. In some embodiments, $R^{16}$ is R. In some embodiments, $R^{16}$ is cyano. In some embodiments, $R^{16}$ is $CF_3$. In some embodiments, $R^{16}$ is $Si(OR)_3$.

In some embodiments, $R^{17}$ is $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{17}$ is $CO_2H$. In some embodiments, $R^{17}$ is $CO_2M^1$. In some embodiments, $R^{17}$ is $CO_2R$. In some embodiments, $R^{17}$ is $SO_3H$. In some embodiments, $R^{17}$ is $SO_3M^1$. In some embodiments, $R^{17}$ is $PO_3H_2$. In some embodiments, $R^{17}$ is $PO_3M^1{}_2$. In some embodiments, $R^{17}$ is $PO_3M^1H$. In some embodiments, $R^{17}$ is $PO_4H_2$. In some embodiments, $R^{17}$ is $PO_4M^1{}_2$. In some embodiments, $R^{17}$ is $PO_4M^1H$. In some embodiments, $R^{17}$ is $PO_4M^2$. In some embodiments, $R^{17}$ is $C(O)NHOH$. In some embodiments, $R^{17}$ is $NH_2$. In some embodiments, $R^{17}$ is NHR. In some embodiments, $R^{17}$ is $N(R)_2$. In some embodiments, $R^{17}$ is $NO_2$. In some embodiments, $R^{17}$ is COOR. In some embodiments, $R^{17}$ is CHO. In some embodiments, $R^{17}$ is $CH_2OH$. In some embodiments, $R^{17}$ is OH. In some embodiments, $R^{17}$ is OR. In some embodiments, $R^{17}$ is SH. In some embodiments, $R^{17}$ is SR. In some embodiments, $R^{17}$ is $C(O)N(R)_2$. In some embodiments, $R^{17}$ is $C(O)NHR$. In some embodiments, $R^{17}$ is $C(O)NH_2$. In some embodiments, $R^{17}$ is halide. In some embodiments, $R^{17}$ is tosylate. In some embodiments, $R^{17}$ is mesylate. In some embodiments, $R^{17}$ is $SO_2NHR$. In some embodiments, $R^{17}$ is triflate. In some embodiments, $R^{17}$ is isocyanate. In some embodiments, $R^{17}$ is cyanate. In some embodiments, $R^{17}$ is thiocyanate. In some embodiments, $R^{17}$ is isothiocyanate. In some embodiments, $R^{17}$ is R. In some embodiments, $R^{17}$ is cyano. In some embodiments, $R^{17}$ is $CF_3$. In some embodiments, $R^{17}$ is $Si(OR)_3$.

In some embodiments, $R^{18}$ is $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{18}$ is $CO_2H$. In some embodiments, $R^{18}$ is $CO_2M^1$. In some embodiments, $R^{18}$ is $CO_2R$. In some embodiments, $R^{18}$ is $SO_3H$. In some embodiments, $R^{18}$ is $SO_3M^1$. In some embodiments, $R^{18}$ is $PO_3H_2$. In some embodiments, $R^{18}$ is $PO_3M^1{}_2$. In some embodiments, $R^{18}$ is $PO_3M^1H$. In some embodiments, $R^{18}$ is $PO_4H_2$. In some embodiments, $R^{18}$ is $PO_4M^1{}_2$. In some embodiments, $R^{18}$ is $PO_4M^1H$. In some embodiments, $R^{18}$ is $PO_4M^2$. In some embodiments, $R^{18}$ is $C(O)NHOH$. In some embodiments, $R^{18}$ is $NH_2$. In some embodiments, $R^{18}$ is NHR. In some embodiments, $R^{18}$ is $N(R)_2$. In some embodiments, $R^{18}$ is $NO_2$. In some embodiments, $R^{18}$ is COOR. In some embodiments, $R^{18}$ is CHO. In some embodiments, $R^{18}$ is $CH_2OH$. In some embodiments, $R^{18}$ is OH. In some embodiments, $R^{18}$ is OR. In some embodiments, $R^{13}$ is SH. In some embodiments, $R^{18}$ is SR. In some embodiments, $R^{18}$ is $C(O)N(R)_2$. In some embodiments, $R^{18}$ is C(O)NHR. In some embodiments, $R^{18}$ is $C(O)NH_2$. In some embodiments, $R^{18}$ is halide. In some embodiments, $R^{18}$ is tosylate. In some embodiments, $R^{18}$ is mesylate. In some embodiments, $R^{18}$ is $SO_2NHR$. In some embodiments, $R^{18}$ is triflate. In some embodiments, $R^{18}$ is isocyanate. In some embodiments, $R^{18}$ is cyanate. In some embodiments, $R^{18}$ is thiocyanate. In some embodiments, $R^{18}$ is isothiocyanate. In some embodiments, $R^{18}$ is R. In some embodiments, $R^{18}$ is cyano. In some embodiments, $R^{18}$ is $CF_3$. In some embodiments, $R^{13}$ is $Si(OR)_3$.

In some embodiments, $R^{19}$ is $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{19}$ is $CO_2H$. In some embodiments, $R^{19}$ is $CO_2M^1$. In some embodiments, $R^{19}$ is $CO_2R$. In some embodiments, $R^{19}$ is $SO_3H$. In some embodiments, $R^{19}$ is $SO_3M^1$. In some embodiments, $R^{19}$ is $PO_3H_2$. In some embodiments, $R^{19}$ is $PO_3M^1{}_2$. In some embodiments, $R^{19}$ is $PO_3M^1H$. In some embodiments, $R^{19}$ is $PO_4H_2$. In some embodiments, $R^{19}$ is $PO_4M^1{}_2$. In some embodiments, $R^{19}$ is $PO_4M^1H$. In some embodiments, $R^{19}$ is $PO_4M^2$. In some embodiments, $R^{19}$ is $C(O)NHOH$. In some embodiments, $R^{19}$ is $NH_2$. In some embodiments, $R^{19}$ is NHR. In some embodiments, $R^{19}$ is $N(R)_2$. In some embodiments, $R^{19}$ is $NO_2$. In some embodiments, $R^{19}$ is COOR. In some embodiments, $R^{19}$ is CHO. In some embodiments, $R^{19}$ is $CH_2OH$. In some embodiments, $R^{19}$ is OH. In some embodiments, $R^{19}$ is OR. In some embodiments, $R^{19}$ is SH. In some embodiments, $R^{19}$ is SR. In some embodiments, $R^{19}$ is $C(O)N(R)_2$. In some embodiments, $R^{19}$ is C(O)NHR. In some embodiments, $R^{19}$ is $C(O)NH_2$. In some embodiments, $R^{19}$ is halide. In some embodiments, $R^{19}$ is tosylate. In some embodiments, $R^{19}$ is mesylate. In some embodiments, $R^{19}$ is $SO_2NHR$. In some embodiments, $R^{19}$ is triflate. In some embodiments, $R^{19}$ is isocyanate. In some embodiments, $R^{19}$ is cyanate. In some embodiments, $R^{19}$ is thiocyanate. In some embodiments, $R^{19}$ is isothiocyanate. In some embodiments, $R^{19}$ is R. In some embodiments, $R^{19}$ is cyano. In some embodiments, $R^{19}$ is $CF_3$. In some embodiments, $R^{19}$ is $Si(OR)_3$.

In some embodiments, $R^{20}$ is $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{20}$ is $CO_2H$. In some embodiments, $R^{20}$ is $CO_2M^1$. In some embodiments, $R^{20}$ is $CO_2R$. In some embodiments, $R^{20}$ is $SO_3H$. In some embodiments, $R^{20}$ is $SO_3M^1$. In some embodiments, $R^{20}$ is $PO_3H_2$. In some embodiments, $R^{20}$ is $PO_3M^1{}_2$. In some embodiments, $R^{20}$ is $PO_3M^1H$. In some embodiments, $R^{20}$ is $PO_4H_2$. In some embodiments, $R^{20}$ is $PO_4M^1{}_2$. In some embodiments, $R^{20}$ is $PO_4M^1H$. In some embodiments, $R^{20}$ is $PO_4M^2$. In some embodiments, $R^{20}$ is $C(O)NHOH$. In some embodiments, $R^{20}$ is $NH_2$. In some embodiments, $R^{20}$ is NHR. In some embodiments, $R^{20}$ is $N(R)_2$. In some embodiments, $R^{20}$ is $NO_2$. In some embodiments, $R^{20}$ is COOR. In some embodiments, $R^{20}$ is CHO. In some embodiments, $R^{20}$ is $CH_2OH$. In some embodiments, $R^{20}$ is OH. In some embodiments, $R^{20}$ is OR. In some embodiments, $R^{13}$ is SH. In some embodiments, $R^{20}$ is SR. In some embodiments, $R^{20}$ is $C(O)N(R)_2$. In some embodiments, $R^{20}$ is C(O)NHR. In some embodiments, $R^{20}$ is $C(O)NH_2$. In some embodiments, $R^{20}$ is halide. In some embodiments, $R^{20}$ is tosylate. In some embodiments, $R^{20}$ is mesylate. In some embodiments, $R^{20}$ is $SO_2NHR$. In some embodiments, $R^{20}$ is triflate. In some embodiments, $R^{20}$ is isocyanate. In some embodiments, $R^{20}$ is cyanate. In some embodiments, $R^{20}$ is thiocyanate. In some embodiments, $R^{20}$ is isothiocyanate. In some embodiments, $R^{20}$ is R. In some embodiments, $R^{20}$ is cyano. In some embodiments, $R^{20}$ is $CF_3$. In some embodiments, $R^{20}$ is $Si(OR)_3$.

In some embodiments, $R^{21}$ is $CO_2H$, $CO_2M^1$, $CO_2R$, $SO_3H$, $SO_3M^1$, $PO_3H_2$, $PO_3M^1{}_2$. $PO_3M^1H$, $PO_4H_2$, $PO_4M^1{}_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{21}$ is $CO_2H$. In some embodiments, $R^{21}$ is $CO_2M^1$. In some embodiments, $R^{21}$ is $CO_2R$. In some embodiments, $R^{21}$ is $SO_3H$. In some embodiments, $R^{21}$ is $SO_3M^1$. In some embodiments, $R^{21}$ is $PO_3H_2$. In some embodiments, $R^{21}$ is $PO_3M^1{}_2$. In some embodiments, $R^{21}$ is $PO_3M^1H$. In some embodiments, $R^{21}$ is $PO_4H_2$. In some embodiments, $R^{21}$ is $PO_4M^1{}_2$. In some embodiments, $R^{21}$ is $PO_4M^1H$. In some embodiments, $R^{21}$ is $PO_4M^2$. In some embodiments, $R^{21}$ is $C(O)NHOH$. In some embodiments, $R^{21}$ is $NH_2$. In some embodiments, $R^{21}$ is NHR. In some embodiments, $R^{21}$ is $N(R)_2$. In some embodiments, $R^{21}$ is $NO_2$. In some embodiments, $R^{21}$ is COOR. In some embodiments, $R^{21}$ is CHO. In some embodiments, $R^{21}$ is $CH_2OH$. In some embodiments, $R^{21}$ is OH. In some embodiments, $R^{21}$ is OR. In some embodiments, $R^{13}$ is SH. In some embodiments, $R^{21}$ is SR. In some embodiments, $R^{21}$ is $C(O)N(R)_2$. In some embodiments, $R^{21}$ is C(O)NHR. In some embodiments, $R^{21}$ is $C(O)NH_2$. In some embodiments, $R^{21}$ is halide. In some embodiments, $R^{21}$ is tosylate. In some embodiments, $R^{21}$ is mesylate. In some embodiments, $R^{21}$ is $SO_2NHR$. In some embodiments, $R^{21}$ is triflate. In some embodiments, $R^{21}$ is isocyanate. In some embodiments, $R^{21}$ is cyanate. In some embodiments, $R^{21}$ is thiocyanate. In some embodiments, $R^{21}$ is isothiocyanate. In some embodiments, $R^{21}$ is R. In some embodiments, $R^{21}$ is cyano. In some embodiments, $R^{2'}$ is $CF_3$. In some embodiments, $R^{2'}$ is $Si(OR)_3$.

In some embodiments, $R^{22}$ is $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{22}$ is $CO_2H$. In some embodiments, $R^{22}$ is $CO_2M^1$. In some embodiments, $R^{22}$ is $CO_2R$. In some embodiments, $R^{22}$ is $SO_3H$. In some embodiments, $R^{22}$ is $SO_3M^1$. In some embodiments, $R^{22}$ is $PO_3H_2$. In some embodiments, $R^{22}$ is $PO_3M^1_2$. In some embodiments, $R^{22}$ is $PO_3M^1H$. In some embodiments, $R^{22}$ is $PO_4H_2$. In some embodiments, $R^{22}$ is $PO_4M^1_2$. In some embodiments, $R^{22}$ is $PO_4M^1H$. In some embodiments, $R^{22}$ is $PO_4M^2$. In some embodiments, $R^{22}$ is $C(O)NHOH$. In some embodiments, $R^{22}$ is $NH_2$. In some embodiments, $R^{22}$ is $NHR$. In some embodiments, $R^{22}$ is $N(R)_2$. In some embodiments, $R^{22}$ is $NO_2$. In some embodiments, $R^{22}$ is $COOR$. In some embodiments, $R^{22}$ is $CHO$. In some embodiments, $R^{22}$ is $CH_2OH$. In some embodiments, $R^{22}$ is $OH$. In some embodiments, $R^{22}$ is $OR$. In some embodiments, $R^{22}$ is $SH$. In some embodiments, $R^{22}$ is $SR$. In some embodiments, $R^{22}$ is $C(O)N(R)_2$. In some embodiments, $R^{22}$ is $C(O)NHR$. In some embodiments, $R^{22}$ is $C(O)NH_2$. In some embodiments, $R^{22}$ is halide. In some embodiments, $R^{22}$ is tosylate. In some embodiments, $R^{22}$ is mesylate. In some embodiments, $R^{22}$ is $SO_2NHR$. In some embodiments, $R^{22}$ is triflate. In some embodiments, $R^{22}$ is isocyanate. In some embodiments, $R^{22}$ is cyanate. In some embodiments, $R^{22}$ is thiocyanate. In some embodiments, $R^{22}$ is isothiocyanate. In some embodiments, $R^{22}$ is R. In some embodiments, $R^{22}$ is cyano. In some embodiments, $R^{22}$ is $CF_3$. In some embodiments, $R^{22}$ is $Si(OR)_3$.

In some embodiments, $R^{101}$ is $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{101}$ is $CO_2H$. In some embodiments, $R^{101}$ is $CO_2M^1$. In some embodiments, $R^{101}$ is $CO_2R$. In some embodiments, $R^{101}$ is $SO_3H$. In some embodiments, $R^{101}$ is $SO_3M^1$. In some embodiments, $R^{101}$ is $PO_3H_2$. In some embodiments, $R^{101}$ is $PO_3M^1_2$. In some embodiments, $R^{101}$ is $PO_3M^1H$. In some embodiments, $R^{101}$ is $PO_4H_2$. In some embodiments, $R^{101}$ is $PO_4M^1_2$. In some embodiments, $R^{101}$ is $PO_4M^1H$. In some embodiments, $R^{101}$ is $PO_4M^2$. In some embodiments, $R^{101}$ is $C(O)NHOH$. In some embodiments, $R^{101}$ is $NH_2$. In some embodiments, $R^{101}$ is $NHR$. In some embodiments, $R^{101}$ is $N(R)_2$. In some embodiments, $R^{101}$ is $NO_2$. In some embodiments, $R^{101}$ is $COOR$. In some embodiments, $R^{101}$ is $CHO$. In some embodiments, $R^{101}$ is $CH_2OH$. In some embodiments, $R^{101}$ is $OH$. In some embodiments, $R^{101}$ is $OR$. In some embodiments, $R^{101}$ is $SH$. In some embodiments, $R^{101}$ is $SR$. In some embodiments, $R^{101}$ is $C(O)N(R)_2$. In some embodiments, $R^{101}$ is $C(O)NHR$. In some embodiments, $R^{101}$ is $C(O)NH_2$. In some embodiments, $R^{101}$ is halide. In some embodiments, $R^{101}$ is tosylate. In some embodiments, $R^{101}$ is mesylate. In some embodiments, $R^{101}$ is $SO_2NHR$. In some embodiments, $R^{101}$ is triflate. In some embodiments, $R^{101}$ is isocyanate. In some embodiments, $R^{101}$ is cyanate. In some embodiments, $R^{101}$ is thiocyanate. In some embodiments, $R^{101}$ is isothiocyanate. In some embodiments, $R^{101}$ is R. In some embodiments, $R^{101}$ is cyano. In some embodiments, $R^{101}$ is $CF_3$. In some embodiments, $R^{101}$ is $Si(OR)_3$.

In some embodiments, $R^{102}$ is $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{102}$ is $CO_2H$. In some embodiments, $R^{102}$ is $CO_2M^1$. In some embodiments, $R^{102}$ is $CO_2R$. In some embodiments, $R^{102}$ is $SO_3H$. In some embodiments, $R^{102}$ is $SO_3M^1$. In some embodiments, $R^{102}$ is $PO_3H_2$. In some embodiments, $R^{102}$ is $PO_3M^1_2$. In some embodiments, $R^{102}$ is $PO_3M^1H$. In some embodiments, $R^{102}$ is $PO_4H_2$. In some embodiments, $R^{102}$ is $PO_4M^1_2$. In some embodiments, $R^{102}$ is $PO_4M^1H$. In some embodiments, $R^{102}$ is $PO_4M^2$. In some embodiments, $R^{102}$ is $C(O)NHOH$. In some embodiments, $R^{102}$ is $NH_2$. In some embodiments, $R^{102}$ is $NHR$. In some embodiments, $R^{102}$ is $N(R)_2$. In some embodiments, $R^{102}$ is $NO_2$. In some embodiments, $R^{102}$ is $COOR$. In some embodiments, $R^{102}$ is $CHO$. In some embodiments, $R^{102}$ is $CH_2OH$. In some embodiments, $R^{102}$ is $OH$. In some embodiments, $R^{102}$ is $OR$. In some embodiments, $R^{102}$ is $SH$. In some embodiments, $R^{102}$ is $SR$. In some embodiments, $R^{102}$ is $C(O)N(R)_2$. In some embodiments, $R^{102}$ is $C(O)NHR$. In some embodiments, $R^{102}$ is $C(O)NH_2$. In some embodiments, $R^{102}$ is halide. In some embodiments, $R^{102}$ is tosylate. In some embodiments, $R^{102}$ is mesylate. In some embodiments, $R^{102}$ is $SO_2NHR$. In some embodiments, $R^{102}$ is triflate. In some embodiments, $R^{102}$ is isocyanate. In some embodiments, $R^{102}$ is cyanate. In some embodiments, $R^{102}$ is thiocyanate. In some embodiments, $R^{102}$ is isothiocyanate. In some embodiments, $R^{102}$ is R. In some embodiments, $R^{102}$ is cyano. In some embodiments, $R^{102}$ is $CF_3$. In some embodiments, $R^{102}$ is $Si(OR)_3$.

In some embodiments, $R^{104}$ is $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{104}$ is $CO_2H$. In some embodiments, $R^{104}$ is $CO_2M^1$. In some embodiments, $R^{104}$ is $CO_2R$. In some embodiments, $R^{104}$ is $SO_3H$. In some embodiments, $R^{104}$ is $SO_3M^1$. In some embodiments, $R^{104}$ is $PO_3H_2$. In some embodiments, $R^{104}$ is $PO_3M^1_2$. In some embodiments, $R^{104}$ is $PO_3M^1H$. In some embodiments, $R^{104}$ is $PO_4H_2$. In some embodiments, $R^{104}$ is $PO_4M^1_2$. In some embodiments, $R^{104}$ is $PO_4M^1H$. In some embodiments, $R^{104}$ is $PO_4M^2$. In some embodiments, $R^{104}$ is $C(O)NHOH$. In some embodiments, $R^{104}$ is $NH_2$. In some embodiments, $R^{104}$ is $NHR$. In some embodiments, $R^{104}$ is $N(R)_2$. In some embodiments, $R^{104}$ is $NO_2$. In some embodiments, $R^{104}$ is $COOR$. In some embodiments, $R^{104}$ is $CHO$. In some embodiments, $R^{104}$ is $CH_2OH$. In some embodiments, $R^{104}$ is $OH$. In some embodiments, $R^{104}$ is $OR$. In some embodiments, $R^{104}$ is $SH$. In some embodiments, $R^{104}$ is $SR$. In some embodiments, $R^{104}$ is $C(O)N(R)_2$. In some embodiments, $R^{104}$ is $C(O)NHR$. In some embodiments, $R^{104}$ is $C(O)NH_2$. In some embodiments, $R^{104}$ is halide. In some embodiments, $R^{104}$ is tosylate. In some embodiments, $R^{104}$ is mesylate. In some embodiments, $R^{104}$ is $SO_2NHR$. In some embodiments, $R^{104}$ is triflate. In some embodiments, $R^{104}$ is isocyanate. In some embodiments, $R^{104}$ is cyanate. In some embodiments, $R^{104}$ is thiocyanate. In some embodiments, $R^{104}$ is isothiocyanate. In some embodiments, $R^{104}$ is R. In some embodiments, $R^{104}$ is cyano. In some embodiments, $R^{104}$ is $CF_3$. In some embodiments, $R^{104}$ is $Si(OR)_3$.

In some embodiments, $R^{105}$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{105}$ is $CO_2H$. In some embodiments, $R^{105}$ is $CO_2M^1$. In some embodiments, $R^{105}$ is $CO_2R$. In some embodiments, $R^{105}$ is $SO_3H$. In some embodiments, $R^{105}$ is $SO_3M^1$. In some embodiments, $R^{105}$ is $PO_3H_2$. In some embodiments, $R^{105}$ is $PO_3M^1_2$. In some embodiments, $R^{105}$ is $PO_3M^1H$. In some embodiments, $R^{105}$ is $PO_4H_2$. In some embodiments, $R^{105}$ is $PO_4M^1_2$. In some embodiments, $R^{105}$ is $PO_4M^1H$. In some embodiments, $R^{105}$ is $PO_4M^2$. In some embodiments, $R^{105}$ is $C(O)NHOH$. In some embodiments, $R^{105}$ is $NH_2$. In some embodiments, $R^{105}$ is NHR. In some embodiments, $R^{105}$ is $N(R)_2$. In some embodiments, $R^{105}$ is $NO_2$. In some embodiments, $R^{105}$ is $COOR$. In some embodiments, $R^{105}$ is CHO. In some embodiments, $R^{105}$ is $CH_2OH$. In some embodiments, $R^{105}$ is OH. In some embodiments, $R^{105}$ is OR. In some embodiments, $R^{105}$ is SH. In some embodiments, $R^{105}$ is SR. In some embodiments, $R^{105}$ is $C(O)N(R)_2$. In some embodiments, $R^{105}$ is $C(O)NHR$. In some embodiments, $R^{105}$ is $C(O)NH_2$. In some embodiments, $R^{105}$ is halide. In some embodiments, $R^{105}$ is tosylate. In some embodiments, $R^{105}$ is mesylate. In some embodiments, $R^{105}$ is $SO_2NHR$. In some embodiments, $R^{105}$ is triflate. In some embodiments, $R^{105}$ is isocyanate. In some embodiments, $R^{105}$ is cyanate. In some embodiments, $R^{105}$ is thiocyanate. In some embodiments, $R^{105}$ is isothiocyanate. In some embodiments, $R^{105}$ is R. In some embodiments, $R^{105}$ is cyano. In some embodiments, $R^{105}$ is $CF_3$. In some embodiments, $R^{105}$ is $Si(OR)_3$.

In some embodiments, $R^{106}$ is $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $R^{106}$ is $CO_2H$. In some embodiments, $R^{106}$ is $CO_2M^1$. In some embodiments, $R^{106}$ is $CO_2R$. In some embodiments, $R^{106}$ is $SO_3H$. In some embodiments, $R^{106}$ is $SO_3M^1$. In some embodiments, $R^{106}$ is $PO_3H_2$. In some embodiments, $R^{106}$ is $PO_3M^1_2$. In some embodiments, $R^{106}$ is $PO_3M^1H$. In some embodiments, $R^{106}$ is $PO_4H_2$. In some embodiments, $R^{106}$ is $PO_4M^1_2$. In some embodiments, $R^{106}$ is $PO_4M^1H$. In some embodiments, $R^{106}$ is $PO_4M^2$. In some embodiments, $R^{106}$ is $C(O)NHOH$. In some embodiments, $R^{106}$ is $NH_2$. In some embodiments, $R^{106}$ is NHR. In some embodiments, $R^{106}$ is $N(R)_2$. In some embodiments, $R^{106}$ is $NO_2$. In some embodiments, $R^{106}$ is $COOR$. In some embodiments, $R^{106}$ is CHO. In some embodiments, $R^{106}$ is $CH_2OH$. In some embodiments, $R^{106}$ is OH. In some embodiments, $R^{106}$ is OR. In some embodiments, $R^{106}$ is SH. In some embodiments, $R^{106}$ is SR. In some embodiments, $R^{106}$ is $C(O)N(R)_2$. In some embodiments, $R^{106}$ is $C(O)NHR$. In some embodiments, $R^{106}$ is $C(O)NH_2$. In some embodiments, $R^{106}$ is halide. In some embodiments, $R^{106}$ is tosylate. In some embodiments, $R^{106}$ is mesylate. In some embodiments, $R^{106}$ is $SO_2NHR$. In some embodiments, $R^{106}$ is triflate. In some embodiments, $R^{106}$ is isocyanate. In some embodiments, $R^{106}$ is cyanate. In some embodiments, $R^{106}$ is thiocyanate. In some embodiments, $R^{106}$ is isothiocyanate. In some embodiments, $R^{106}$ is R. In some embodiments, $R^{106}$ is $CF_3$. In some embodiments, $R^{106}$ is $Si(OR)_3$.

In some embodiments, $T^1$ is H, $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^2$ is H. In some embodiments, $T^1$ is $CO_2H$. In some embodiments, $T^1$ is $CO_2M^1$. In some embodiments, $T^1$ is $CO_2R$. In some embodiments, $T^1$ is $SO_3H$. In some embodiments, $T^1$ is $SO_3M^1$. In some embodiments, $T^1$ is $PO_3H_2$. In some embodiments, $T^1$ is $PO_3M^1_2$. In some embodiments, $T^1$ is $PO_3M^1H$. In some embodiments, $T^1$ is $PO_4H_2$. In some embodiments, $T^1$ is $PO_4M^1_2$. In some embodiments, $T^1$ is $PO_4M^1H$. In some embodiments, $T^1$ is $PO_4M^2$. In some embodiments, $T^1$ is $C(O)NHOH$. In some embodiments, $T^1$ is $NH_2$. In some embodiments, $T^1$ is NHR. In some embodiments, $T^1$ is $N(R)_2$. In some embodiments, $T^1$ is $NO_2$. In some embodiments, $T^1$ is COOR. In some embodiments, $T^1$ is CHO. In some embodiments, $T^1$ is $CH_2OH$. In some embodiments, $T^1$ is OH. In some embodiments, $T^1$ is OR. In some embodiments, $T^1$ is SH. In some embodiments, $T^1$ is SR. In some embodiments, $T^1$ is $C(O)N(R)_2$. In some embodiments, $T^1$ is $C(O)NHR$. In some embodiments, $T^1$ is $C(O)NH_2$. In some embodiments, $T^1$ is halide. In some embodiments, $T^1$ is tosylate. In some embodiments, $T^1$ is mesylate. In some embodiments, $T^1$ is $SO_2NHR$. In some embodiments, $T^1$ is triflate. In some embodiments, $T^1$ is isocyanate. In some embodiments, $T^1$ is cyanate. In some embodiments, $T^1$ is thiocyanate. In some embodiments, $T^1$ is isothiocyanate. In some embodiments, $T^1$ is R. In some embodiments, $T^1$ is cyano. In some embodiments, $T^1$ is $CF_3$. In some embodiments, $T^1$ is $Si(OR)_3$.

In some embodiments, $T^2$ is H, $CO_2H$, $CO_2M^1$, $CO_2R$, $SO_3H$, $SO_3M^1$, $PO_3H_2$, $PO_3M^1_2$, $PO_3M^1H$, $PO_4H_2$, $PO_4M^1_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^2$ is H. In some embodiments, $T^2$ is $CO_2H$. In some embodiments, $T^2$ is $CO_2M^1$. In some embodiments, $T^2$ is $CO_2R$. In some embodiments, $T^2$ is $SO_3H$. In some embodiments, $T^2$ is $SO_3M^1$. In some embodiments, $T^2$ is $PO_3H_2$. In some embodiments, $T^2$ is $PO_3M^1_2$. In some embodiments, $T^2$ is $PO_3M^1H$. In some embodiments, $T^2$ is $PO_4H_2$. In some embodiments, $T^2$ is $PO_4M^1_2$. In some embodiments, $T^2$ is $PO_4M^1H$. In some embodiments, $T^2$ is $PO_4M^2$. In some embodiments, $T^2$ is $C(O)NHOH$. In some embodiments, $T^2$ is $NH_2$. In some embodiments, $T^2$ is NHR. In some embodiments, $T^2$ is $N(R)_2$. In some embodiments, $T^2$ is $NO_2$. In some embodiments, $T^2$ is COOR. In some embodiments, $T^2$ is CHO. In some embodiments, $T^2$ is $CH_2OH$. In some embodiments, $T^2$ is OH. In some embodiments, $T^2$ is OR. In some embodiments, $T^2$ is SH. In some embodiments, $T^2$ is SR. In some embodiments, $T^2$ is $C(O)N(R)_2$. In some embodiments, $T^2$ is $C(O)NHR$. In some embodiments, $T^2$ is $C(O)NH_2$. In some embodiments, $T^2$ is halide. In some embodiments, $T^2$ is tosylate. In some embodiments, $T^2$ is mesylate. In some embodiments, $T^2$ is $SO_2NHR$. In some embodiments, $T^2$ is triflate. In some embodiments, $T^2$ is isocyanate. In some embodiments, $T^2$ is cyanate. In some embodiments, $T^2$ is thiocyanate. In some embodiments, $T^2$ is isothiocyanate. In some embodiments, $T^2$ is R. In some embodiments, $T^2$ is cyano. In some embodiments, $T^2$ is $CF_3$. In some embodiments, $T^2$ is $Si(OR)_3$.

In some embodiments, $T^3$ is H, $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^3$ is H. In some embodiments, $T^3$ is $CO_2H$. In some embodiments, $T^3$ is $CO_2M^1$. In some embodiments, $T^3$ is $CO_2R$. In some embodiments, $T^3$ is $SO_3H$. In some embodiments, $T^3$ is $SO_3M^1$. In some embodiments, $T^3$ is $PO_3H_2$. In some embodiments, $T^3$ is $PO_3M^1_2$. In some embodiments, $T^3$ is $PO_3M^1H$. In some embodiments, $T^3$ is $PO_4H_2$. In some embodiments, $T^3$ is $PO_4M^1_2$. In some embodiments, $T^3$ is $PO_4M^1H$. In some embodiments, $T^3$ is $PO_4M^2$. In some embodiments, $T^3$ is C(O)NHOH. In some embodiments, $T^3$ is $NH_2$. In some embodiments, $T^3$ is NHR. In some embodiments, $T^3$ is $N(R)_2$. In some embodiments, $T^3$ is $NO_2$. In some embodiments, $T^3$ is COOR. In some embodiments, $T^3$ is CHO. In some embodiments, $T^3$ is $CH_2OH$. In some embodiments, $T^3$ is OH. In some embodiments, $T^3$ is OR. In some embodiments, $T^3$ is SH. In some embodiments, $T^3$ is SR. In some embodiments, $T^3$ is $C(O)N(R)_2$. In some embodiments, $T^3$ is C(O)NHR. In some embodiments, $T^3$ is $C(O)NH_2$. In some embodiments, $T^3$ is halide. In some embodiments, $T^3$ is tosylate. In some embodiments, $T^3$ is mesylate. In some embodiments, $T^3$ is $SO_2NHR$. In some embodiments, $T^3$ is triflate. In some embodiments, $T^3$ is isocyanate. In some embodiments, $T^3$ is cyanate. In some embodiments, $T^3$ is thiocyanate. In some embodiments, $T^3$ is isothiocyanate. In some embodiments, $T^3$ is R. In some embodiments, $T^3$ is cyano. In some embodiments, $T^3$ is $CF_3$. In some embodiments, $T^3$ is $Si(OR)_3$.

In some embodiments, $T^4$ is H, $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^4$ is H. In some embodiments, $T^4$ is $CO_2H$. In some embodiments, $T^4$ is $CO_2M^1$. In some embodiments, $T^4$ is $CO_2R$. In some embodiments, $T^4$ is $SO_3H$. In some embodiments, $T^4$ is $SO_3M^1$. In some embodiments, $T^4$ is $PO_3H_2$. In some embodiments, $T^4$ is $PO_3M^1_2$. In some embodiments, $T^4$ is $PO_3M^1H$. In some embodiments, $T^4$ is $PO_4H_2$. In some embodiments, $T^4$ is $PO_4M^1_2$. In some embodiments, $T^4$ is $PO_4M^1H$. In some embodiments, $T^4$ is $PO_4M^2$. In some embodiments, $T^4$ is C(O)NHOH. In some embodiments, $T^4$ is $NH_2$. In some embodiments, $T^4$ is NHR. In some embodiments, $T^4$ is $N(R)_2$. In some embodiments, $T^4$ is $NO_2$. In some embodiments, $T^4$ is COOR. In some embodiments, $T^4$ is CHO. In some embodiments, $T^4$ is $CH_2OH$. In some embodiments, $T^4$ is OH. In some embodiments, $T^4$ is OR. In some embodiments, $T^3$ is SH. In some embodiments, $T^4$ is SR. In some embodiments, $T^4$ is $C(O)N(R)_2$. In some embodiments, $T^4$ is C(O)NHR. In some embodiments, $T^4$ is $C(O)NH_2$. In some embodiments, $T^4$ is halide. In some embodiments, $T^4$ is tosylate. In some embodiments, $T^4$ is mesylate. In some embodiments, $T^4$ is $SO_2NHR$. In some embodiments, $T^4$ is triflate. In some embodiments, $T^4$ is isocyanate. In some embodiments, $T^4$ is cyanate. In some embodiments, $T^4$ is thiocyanate. In some embodiments, $T^4$ is isothiocyanate. In some embodiments, $T^4$ is R. In some embodiments, $T^4$ is cyano. In some embodiments, $T^4$ is $CF_3$. In some embodiments, $T^4$ is $Si(OR)_3$.

In some embodiments, $T^5$ is H, $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^5$ is H. In some embodiments, $T^5$ is $CO_2H$. In some embodiments, $T^5$ is $CO_2M^1$. In some embodiments, $T^5$ is $CO_2R$. In some embodiments, $T^5$ is $SO_3H$. In some embodiments, $T^5$ is $SO_3M^1$. In some embodiments, $T^5$ is $PO_3H_2$. In some embodiments, $T^5$ is $PO_3M^1_2$. In some embodiments, $T^5$ is $PO_3M^1H$. In some embodiments, $T^5$ is $PO_4H_2$. In some embodiments, $T^5$ is $PO_4M^1_2$. In some embodiments, $T^5$ is $PO_4M^1H$. In some embodiments, $T^5$ is $PO_4M^2$. In some embodiments, $T^5$ is C(O)NHOH. In some embodiments, $T^5$ is $NH_2$. In some embodiments, $T^5$ is NHR. In some embodiments, $T^5$ is $N(R)_2$. In some embodiments, $T^5$ is $NO_2$. In some embodiments, $T^5$ is COOR. In some embodiments, $T^5$ is CHO. In some embodiments, $T^5$ is $CH_2OH$. In some embodiments, $T^5$ is OH. In some embodiments, $T^5$ is OR. In some embodiments, $T^5$ is SH. In some embodiments, $T^5$ is SR. In some embodiments, $T^5$ is $C(O)N(R)_2$. In some embodiments, $T^5$ is C(O)NHR. In some embodiments, $T^5$ is $C(O)NH_2$. In some embodiments, $T^5$ is halide. In some embodiments, $T^5$ is tosylate. In some embodiments, $T^5$ is mesylate. In some embodiments, $T^5$ is $SO_2NHR$. In some embodiments, $T^5$ is triflate. In some embodiments, $T^{5s}$ is isocyanate. In some embodiments, $T^5$ is cyanate. In some embodiments, $T^5$ is thiocyanate. In some embodiments, $T^5$ is isothiocyanate. In some embodiments, $T^5$ is R. In some embodiments, $T^5$ is cyano. In some embodiments, $T^5$ is $CF_3$. In some embodiments, $T^5$ is $Si(OR)_3$.

In some embodiments, $T^6$ is H, $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, $C(O)NHOH$, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano $CF_3$ or $Si(OR)_3$. In some embodiments, $T^6$ is H. In some embodiments, $T^6$ is $CO_2H$. In some embodiments, $T^6$ is $CO_2M^1$. In some embodiments, $T^6$ is $CO_2R$. In some embodiments, $T^6$ is $SO_3H$. In some embodiments, $T^6$ is $SO_3M^1$. In some embodiments, $T^6$ is $PO_3H_2$. In some embodiments, $T^6$ is $PO_3M^1_2$. In some embodiments, $T^6$ is $PO_3M^1H$. In some embodiments, $T^6$ is $PO_4H_2$. In some embodiments, $T^6$ is $PO_4M^1_2$. In some embodiments, $T^6$ is $PO_4M^1H$. In some embodiments, $T^6$ is $PO_4M^2$. In some embodiments, $T^6$ is C(O)NHOH. In some embodiments, $T^6$ is $NH_2$. In some embodiments, $T^6$ is NHR. In some embodiments, $T^6$ is $N(R)_2$. In some embodiments, $T^6$ is $NO_2$. In some embodiments, $T^6$ is COOR. In some embodiments, $T^6$ is CHO. In some embodiments, $T^6$ is $CH_2OH$. In some embodiments, $T^6$ is OH. In some embodiments, $T^6$ is OR. In some embodiments, $T^6$ is SH. In some embodiments, $T^6$ is SR. In some embodiments, $T^6$ is $C(O)N(R)_2$. In some embodiments, $T^6$ is C(O)NHR. In some embodiments, $T^6$ is $C(O)NH_2$. In some embodiments, $T^6$ is halide. In some embodiments, $T^6$ is tosylate. In some embodiments, $T^6$ is mesylate. In some embodiments, $T^6$ is $SO_2NHR$. In some embodiments, $T^6$ is triflate. In some embodiments, $T^6$ is isocyanate. In some embodiments, $T^6$ is cyanate. In some embodiments, $T^6$ is thiocyanate. In some embodiments, $T^6$ is isothiocyanate. In some embodiments, $T^6$ is R. In some embodiments, $T^6$ is cyano. In some embodiments, $T^6$ is $CF_3$. In some embodiments, $T^6$ is $Si(OR)_3$.

In some embodiments, R is methyl, ethyl, isopropyl, n-propyl, alkyl, haloalkyl, cycloalkyl, heterocycloalkyl, aryl, or benzyl. In some embodiments, R is methyl. In some embodiments, R is ethyl. In some embodiments, R is isopropyl. In some embodiments, R is n-propyl. In some embodiments, R is alkyl. In some embodiments, R is haloalkyl. In some embodiments, R is cycloalkyl. In some embodiments, R is heterocycloalkyl. In some embodiments, R is aryl. In some embodiments, R is benzyl.

In some embodiments, $M^1$ is selected from any alkali metal. In some embodiments, $M^1$ is Li, Na, K, Rb or Cs. In some embodiments, $M^1$ is Li. In some embodiments, $M^1$ is Na. In some embodiments, $M^1$ is K. In some embodiments, $M^1$ is Rb. In some embodiments, $M^1$ is Cs.

In some embodiments, $M^2$ is selected from any alkaline earth metal. In some embodiments, $M^1$ is Be, Mg, Ca, Sr, Ba or Ra. In some embodiments, $M^1$ is Be. In some embodiments, $M^1$ is Mg. In some embodiments, $M^1$ is Ca. In some embodiments, $M^1$ is Sr. In some embodiments, $M^1$ is Ba. In some embodiments, $M^1$ is Ra.

An "alkyl" group refers, in some embodiments, to a saturated aliphatic hydrocarbon, including straight-chain or branched-chain. In some embodiments, alkyl is linear or branched. In some embodiments, alkyl is optionally substituted linear or branched. In some embodiments, alkyl is methyl. In some embodiments alkyl is ethyl. In some embodiments, the alkyl group has 1-20 carbons. In some embodiments, the alkyl group has 1-8 carbons. In some embodiments, the alkyl group has 1-7 carbons. In some embodiments, the alkyl group has 1-6 carbons. In some embodiments, non-limiting examples of alkyl groups include methyl, ethyl, isopropyl, n-propyl, isobutyl, butyl, pentyl or hexyl. In some embodiments, the alkyl group has 1-4 carbons. In some embodiments, the alkyl group may be optionally substituted by one or more groups selected from halide, hydroxy, alkoxy, carboxylic acid, aldehyde, carbonyl, amido, cyano, nitro, amino, alkenyl, alkynyl, aryl, azide, epoxide, ester, acyl chloride and thiol.

A "cycloalkyl" group refers, in some embodiments, to a ring structure comprising carbon atoms as ring atoms, which are saturated, substituted or unsubstituted. In some embodiments the cycloalkyl is a 3-12 membered ring. In some embodiments the cycloalkyl is a 6 membered ring. In some embodiments the cycloalkyl is a 5-7 membered ring. In some embodiments the cycloalkyl is a 3-8 membered ring. In some embodiments, the cycloalkyl group may be unsubstituted or substituted by a halogen, alkyl, haloalkyl, hydroxyl, alkoxy, carbonyl, amido, alkylamido, dialkylamido, cyano, nitro, $CO_2H$, amino, alkylamino, dialkylamino, carboxyl, thio and/or thioalkyl. In some embodiments, the cycloalkyl ring may be fused to another saturated or unsaturated 3-8 membered ring. In some embodiments, the cycloalkyl ring is an unsaturated ring. Non limiting examples of a cycloalkyl group comprise cyclohexyl, cyclohexenyl, cyclopropyl, cyclopropenyl, cyclopentyl, cyclopentenyl, cyclobutyl, cyclobutenyl, cyclooctyl, cyclooctadienyl (COD), cyclooctaene (COE) etc.

A "heterocycloalkyl" group refers in some embodiments, to a ring structure of a cycloalkyl as described herein comprising in addition to carbon atoms, sulfur, oxygen, nitrogen or any combination thereof, as part of the ring. In some embodiments, non-limiting examples of heterocycloalkyl include pyrrolidine, pyrrole, tetrahydrofuran, furan, thiolane, thiophene, imidazole, pyrazole, pyrazolidine, oxazolidine, oxazole, isoxazole, thiazole, isothiazole, thiazolidine, dioxolane, dithiolane, triazole, furazan, oxadiazole, thiadiazole, dithiazole, tetrazole, piperidine, oxane, thiane, pyridine, pyran, thiopyran, piperazine, morpholine, thiomorpholine, dioxane, dithiane, diazine, oxazine, thiazine, dioxine, triazine, and trioxane.

A "crown etheryl" group refers in some embodiments to a cyclic structure that comprises several ether groups. In some embodiments, the cyclic structure comprises a —$CH_2CH_2O$— repeating unit. In some embodiments, the cyclic structure optionally comprises a —$CH_2CH_2NH$— repeating unit. In some embodiments, non-limiting examples of the cyclic structure has between 4-10 repeating units. In some embodiments, the cyclic structure is substituted. Substitutions include but are not limited to: F, Cl, Br, I, $C_1$-$C_5$ linear or branched alkyl, $C_1$-$C_5$ linear or branched haloalkyl, $C_1$-$C_5$ linear or branched alkoxy, $C_1$-$C_5$ linear or branched haloalkoxy, $CF_3$, CN, $NO_2$, —$CH_2CN$, $NH_2$, NH-alkyl, N(alkyl)$_2$, hydroxyl, —OC(O)$CF_3$, —$OCH_2Ph$, —NHCO-alkyl, COOH, —C(O)Ph, C(O)O-alkyl, C(O)H, or—or —C(O)$NH_2$.

A cyclamyl, cyclenyl, 1,4,7-Triazacyclononanyl, hexacyclenyl, groups refer in some embodiment to cyclic structures that comprise several repeating units that contain alkylamino groups. In some other embodiments, the cyclic structures are substituted. Substitutions include but are not limited to: F, Cl, Br, I, $C_1$-$C_5$ linear or branched alkyl, $C_1$-$C_5$ linear or branched haloalkyl, $C_1$-$C_5$ linear or branched alkoxy, $C_1$-$C_5$ linear or branched haloalkoxy, $CF_3$, CN, $NO_2$, —$CH_2CN$, $NH_2$, NH-alkyl, N(alkyl)$_2$, hydroxyl, —OC(O)$CF_3$, —$OCH_2Ph$, —NHCO-alkyl, COOH, —C(O)Ph, C(O)O-alkyl, C(O)H, or—or —C(O)$NH_2$.

A "cryptandyl" group refers in some embodiments to a three dimensional structure that comprises several ether and alkylamino groups. In some embodiments, the structure is a [2.2.2]Cryptand: N[$CH_2CH_2OCH_2CH_2OCH_2CH_2$]$_3$N (1,10-diaza-4,7,13,16,21,24-hexaoxabicyclo[8.8.8]hexacosane). In some embodiments, the cyclic structure is substituted. Substitutions include but are not limited to: F, Cl, Br, I, $C_1$-$C_5$ linear or branched alkyl, $C_1$-$C_5$ linear or branched haloalkyl, $C_1$-$C_5$ linear or branched alkoxy, $C_1$-$C_5$ linear or branched haloalkoxy, $CF_3$, CN, $NO_2$, —$CH_2CN$, $NH_2$, NH-alkyl, N(alkyl)$_2$, hydroxyl, —OC(O)$CF_3$, —$OCH_2Ph$, —NHCO-alkyl, COOH, —C(O)Ph, C(O)O-alkyl, C(O)H, or—or —C(O)$NH_2$.

As used herein, the term "aryl" refers to any aromatic ring that is directly bonded to another group and can be either substituted or unsubstituted. The aryl group can be a sole substituent, or the aryl group can be a component of a larger substituent, such as in an arylalkyl, arylamino, arylamido, etc. Exemplary aryl groups include, without limitation, phenyl, tolyl, xylyl, furanyl, naphthyl, pyridinyl, pyrimidinyl, pyridazinyl, pyrazinyl, triazinyl, thiazolyl, oxazolyl, isooxazolyl, pyrazolyl, imidazolyl, thiophene-yl, pyrrolyl, phenylmethyl, phenylethyl, phenylamino, phenylamido, etc. Substitutions include but are not limited to: F, Cl, Br, I, $C_1$-$C_5$ linear or branched alkyl, $C_1$-$C_5$ linear or branched haloalkyl, $C_1$-$C_5$ linear or branched alkoxy, $C_1$-$C_5$ linear or branched haloalkoxy, $CF_3$, CN, $NO_2$, —$CH_2CN$, $NH_2$, NH-alkyl, N(alkyl)$_2$, hydroxyl, —OC(O)$CF_3$, —$OCH_2Ph$, —NHCO-alkyl, COOH, —C(O)Ph, C(O)O-alkyl, C(O)H, or—or —C(O)$NH_2$.

In some embodiments, the term "halide" used herein refers to any substituent of the halogen group (group 17). In some embodiments, halide is flouride, chloride, bromide or iodide. In some embodiments, halide is fluoride. In some embodiments, halide is chloride. In some embodiments, halide is bromide. In some embodiments, halide is iodide.

In some embodiments, "haloalkyl" refers to alkyl, alkenyl, alkynyl or cycloalkyl substituted with one or more halide atoms. In some embodiments, haloalkyl is partially halogenated. In some embodiments haloalkyl is perhalogenated (completely halogenated, no C—H bonds). In some embodiments, haloalkyl is $CH_2CF_3$. In some embodiments. haloalkyl is $CH_2CCl_3$. In some embodiments, haloalkyl is $CH_2CBr_3$. In some embodiments, haloalkyl is $CH_2Cl_3$. In some embodiments, haloalkyl is $CF_2CF_3$. In some embodiments, haloalkyl is $CH_2CH_2CF_3$. In some embodiments, haloalkyl is $CH_2CF_2CF_3$. In some embodiments, haloalkyl is $CF_2CF_2CF_3$. In some embodiments, the haloalkyl group may be optionally substituted by one or more groups selected from halide, hydroxy, alkoxy, carboxylic acid, aldehyde, carbonyl, amido, cyano, nitro, amino, alkenyl, alkynyl, aryl, azide, epoxide, ester, acyl chloride and thiol.

In some embodiments, the term "benzyl" used herein refers to a methylene ($CH_2$, CHR or $CR_2$) connected to an "aryl" (described above) moiety. In some embodiments, the methylene is non substituted ($CH_2$). In some embodiments, the methylene is substituted (CHR or $CR_2$). In some embodiments, the methylene is substituted with alkyl, haloalkyl, cycloalkyl, heterocycloalkyl, aryl, benzyl or any combination of such moieties.

In some embodiments, $X^1$ is S, O or $CH_2$. In some embodiments, $X^1$ is S. In some embodiments, $X^1$ is O. In some embodiments, $X^1$ is $CH_2$.

In some embodiments, $X^2$ is S, O or $CH_2$. In some embodiments, $X^2$ is S. In some embodiments, $X^2$ is O. In some embodiments, $X^2$ is $CH_2$.

In some embodiments, $X^3$ is S, O or $CH_2$. In some embodiments, $X^3$ is S. In some embodiments, $X^3$ is O. In some embodiments, $X^3$ is $CH_2$.

In some embodiments, $X^4$ is S, O or $CH_2$. In some embodiments, $X^4$ is S. In some embodiments, $X^4$ is O. In some embodiments, $X^4$ is $CH_2$.

Figure 5A:
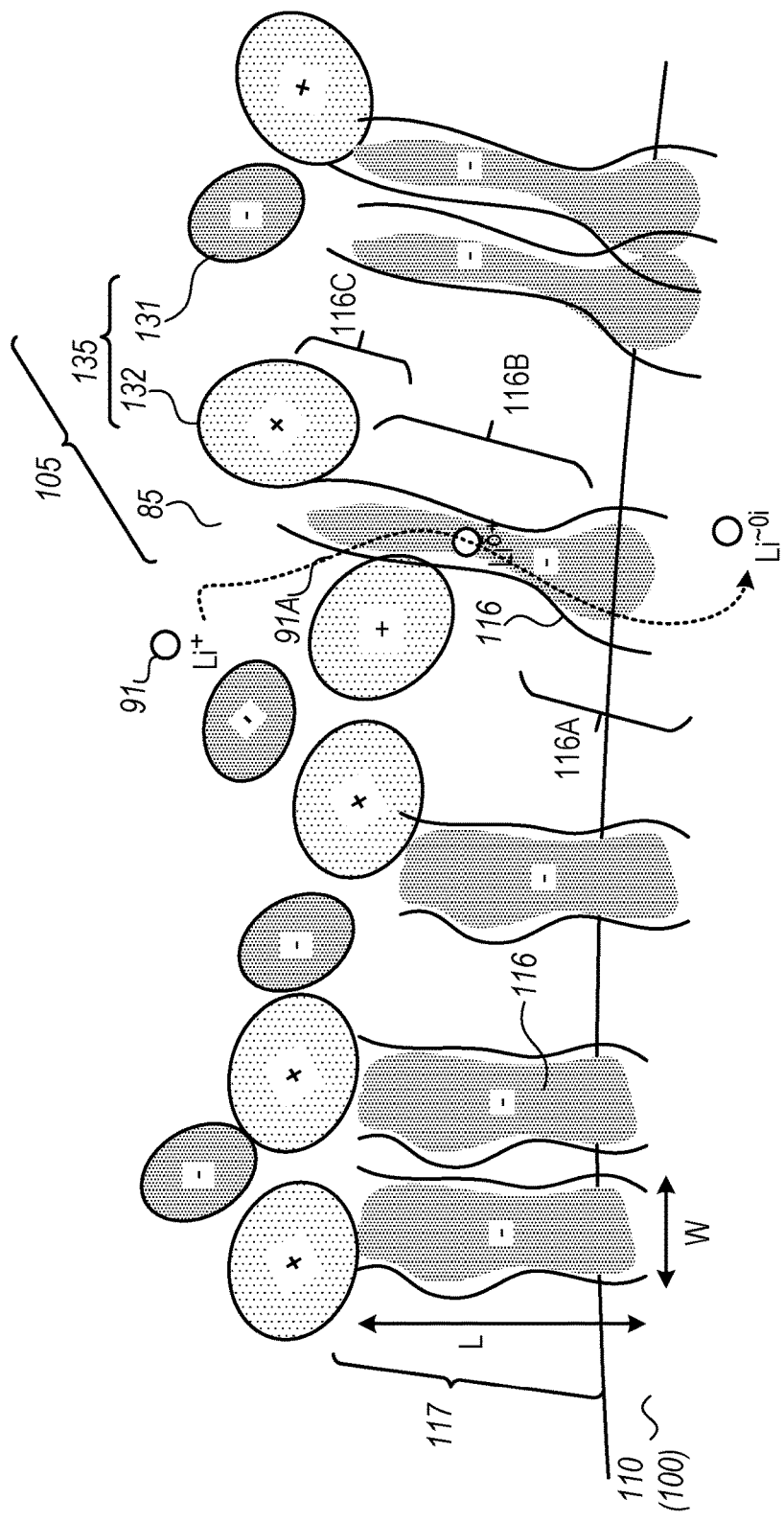
FIG. 5A is a high level schematic illustration of bonding molecules forming a surface molecular layer on the anode and/or anode active material particles, according to some embodiments of the invention.

FIG. 5A is a high level schematic illustration of bonding molecules 116 forming a surface molecules layer 117 on anode 100 and/or anode active material particles 110, according to some embodiments of the invention. It is emphasized that FIG. 5A is highly schematic and represents principles for selecting bonding molecules 116, according to some embodiments of the invention. Actual bonding molecules 116 may be selected according to requirements, e.g., from bonding molecules 116 represented by any one of formulas I-VII, under any of their embodiments.

FIG. 5B is a high level schematic illustration of non-limiting examples for bonding molecules 116, according to some embodiments of the invention. Non-limiting examples for bonding molecules 116 include any of the following: lithium 4-methylbenzenesulfonate, lithium 3,5-dicarboxybenzenesulfonate, lithium sulfate, lithium phosphate, lithium phosphate monobasic, lithium trifluoromethanesulfonate, lithium 4-dodecylbenzenesulfonate, lithium propane-1-sulfonate, lithium 1,1,2,2,3,3,4,4,5,5,6,6,7,7,8,8,8-heptadecafluorooctane-1-sulfonate, lithium 2,6-dimethylbenzene-1,4-disulfonate, lithium 2,6-di-tert-butylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), lithium aniline sulfonate (the sulfonate may be in any of para, meta and ortho positions) as well as poly(lithium-4-styrenesulfonate) applied in coating the anode material particles. It is noted that in cases of coatings that contain lithium (e.g., metallic lithium), ionic liquid additive(s) 135 may be selected to be not reactive toward it.

For example, various coatings of the anode active material may be used to bond or enhance bonding of molecules 116 to anode material 110, as disclosed above. The size(s) of molecules 116 may be selected to provide good lithium ion conductivity therethrough. In certain embodiments, molecules 116 may be selected (e.g., some of the disclosed salts) to form channels configured to enable fast lithium ion movement therethrough.

Surface molecules layer 117 may be configured to prevent contact of electrolyte solvent (of electrolyte 85) with anode active material 110, e.g., through steric hindrance by molecules 116. Non-limiting examples are embodiments represented e.g., by formulas II, IV and V, among others, such as the non-limiting examples lithium 3,5-dicarboxybenzenesulfonate, lithium 2,6-di-tert-butylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), etc.

Molecules 116 may be selected and attached onto anode active material 110 in a way that forms a mechanical and/or electrostatic barrier towards electrolyte solvent and prevents it from reaching and interacting with anode active material 110. Bonding molecules 116 may be selected to have electron rich groups that provide mobile electric charge on the surface of molecules layer 117. Non-limiting examples are embodiments represented e.g., by formulas II, and IV-VII, having conjugated double bonds, acidic groups and benzene groups, among others, such as the non-limiting examples lithium 4-methylbenzenesulfonate, lithium 3,5-dicarboxybenzenesulfonate, lithium 2,6-dimethylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy)) bis(N hydroxypropanamide), lithium aniline sulfonate, poly (lithium-4-styrenesulfonate) etc.

For example, bonding molecules 116 may be selected to have a width W (anchored in anode 100 and/or anode active material particles 110) of up to three benzene rings and a length L (protruding into electrolyte 105) of up to four benzene rings, as exemplified in a non-limiting manner in embodiments represented e.g., by formulas II and VII having bicyclic or tricyclic structures, e.g., anthracene-based structures and/or in embodiments represented e.g., by formulas IV and V.

In some embodiments, bonding molecules 116 may comprise an anode material anchoring part 116A, configured to bind to or be associated with anode active material 110, e.g., via lithium, thiols, or other functional groups in bonding molecules 116. In some embodiments, anode material anchoring part 116A may be pre-lithiated exemplified in a non-limiting manner in embodiments represented by any of formulas I-VII which include lithium, such as the non-limiting examples illustrated in FIG. 5B.

In some embodiments, bonding molecules 116 may comprise an ionic conductive part 116B having an ionic conductivity which is much higher than its electronic conductivity, e.g., by one, two, three or more orders of magnitude. Ionic conductive part 116B may extend through most or all of length L of bonding molecules 116 and provide a conductivity path 91A (illustrated schematically) for lithium ions 91 moving back and forth between electrolyte 105 and anode 110 during charging and discharging cycles. Conductivity paths 91A may be provided e.g., by conjugated double bonds, acidic groups, benzene rings, carbon-fluorine bonds, charged functional groups etc. which are disclosed above. For example, the charge distribution on bonding molecules 116 may be selected to be mobile and support lithium ion movement across molecules layer 117, possibly reducing the charge of the lithium ion to Li$^{δ+}$ as explained above, to prevent metallization on the surface of anode 110. Partial charge reduction may be carried out by electron rich groups such as aromatic groups and acidic groups disclosed above.

In some embodiments, bonding molecules 116 may comprise a top, ionic liquid binding part 116C configured to bind cations 132 and/or anions 131 of ionic liquid additive 135 in electrolyte 105. For example, embodiments represented by any of formulas I-VII which involve charged and/or polar functional groups may provide top, ionic liquid binding part 116C, e.g., lithium 3,5-dicarboxybenzenesulfonate, lithium sulfate, lithium phosphate, lithium phosphate monobasic, lithium trifluoromethanesulfonate, lithium 1,1,2,2,3,3,4,4,5,5,6,6,7,7,8,8-heptadecafluorooctane-1-sulfonate, lithium 2,6-dimethylbenzene-1,4-disulfonate, lithium 2,6-di-tert-butylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), lithium aniline sulfonate (the sulfonate may be in any of para, meta and ortho positions) as well as poly(lithium-4-styrenesulfonate), as some non-limiting examples. Ionic liquid binding part 116C may be further configured to stabilize electrolyte-buffering zone(s) 130 as described above.

Figure 6:
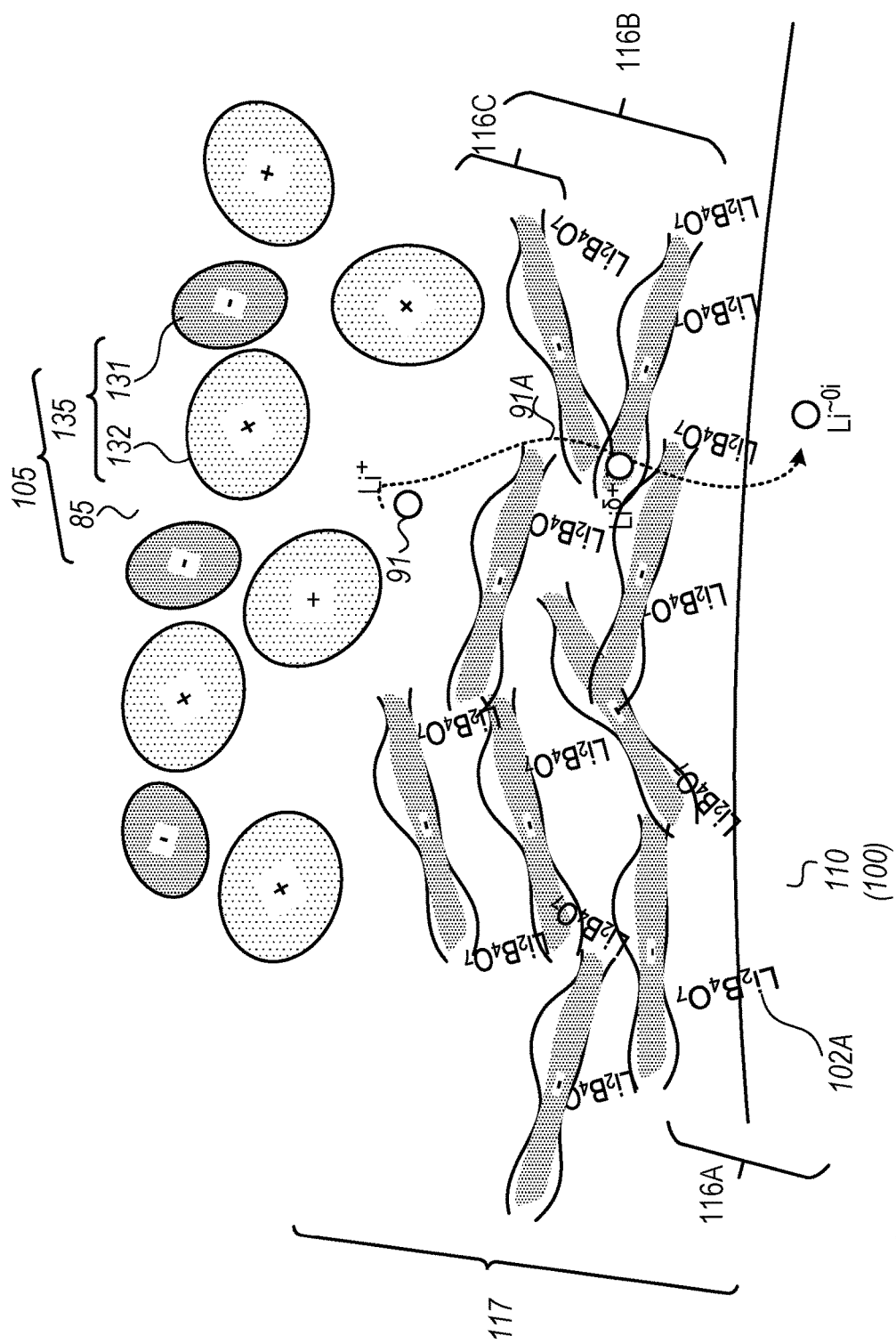
FIG. 6 is a high level schematic illustration of bonding molecules forming a surface molecular layer on the anode and/or anode active material particles, according to some embodiments of the invention.

FIG. 6 is a high level schematic illustration of bonding molecules 116 forming surface molecules layer 117 on anode 100 and/or anode active material particles 110, according to some embodiments of the invention. In the illustrated non-limiting example, bonding molecules 116 comprise a combination of lithium borates 102A which anchor (116A) layer 117 to anode active material 110, and polymer molecules (116B) having electron rich groups (e.g., conjugated bonds, acidic groups, etc.) which provide, together with lithium borates interconnecting the polymer molecules, ionic conductivity paths 91A through layer 117 and have an ionic conductivity which is much larger than electronic conductivity (e.g., by one or few orders of magnitude). Either or both the lithium borate molecules and the polymer molecules may have electron rich groups and may be pre-lithiated. Surface molecules layer 117 may comprise multiple polymer layers interconnected by lithium borates. Surface molecules layer 117 may bond cations 132 and/or anions 131 of ionic liquid (additive) at its top layer 116C, yet may also operate with prior art electrolyte 85 due to its efficient blocking of contact between the solvent of electrolyte 85 and anode active material 110. It is noted that lithium borates and lithium phosphates 102A may likewise be used similarly to Li$_2$B$_4$O$_7$, which is provided in FIG. 6 as a non-limiting example.

Figure 7:
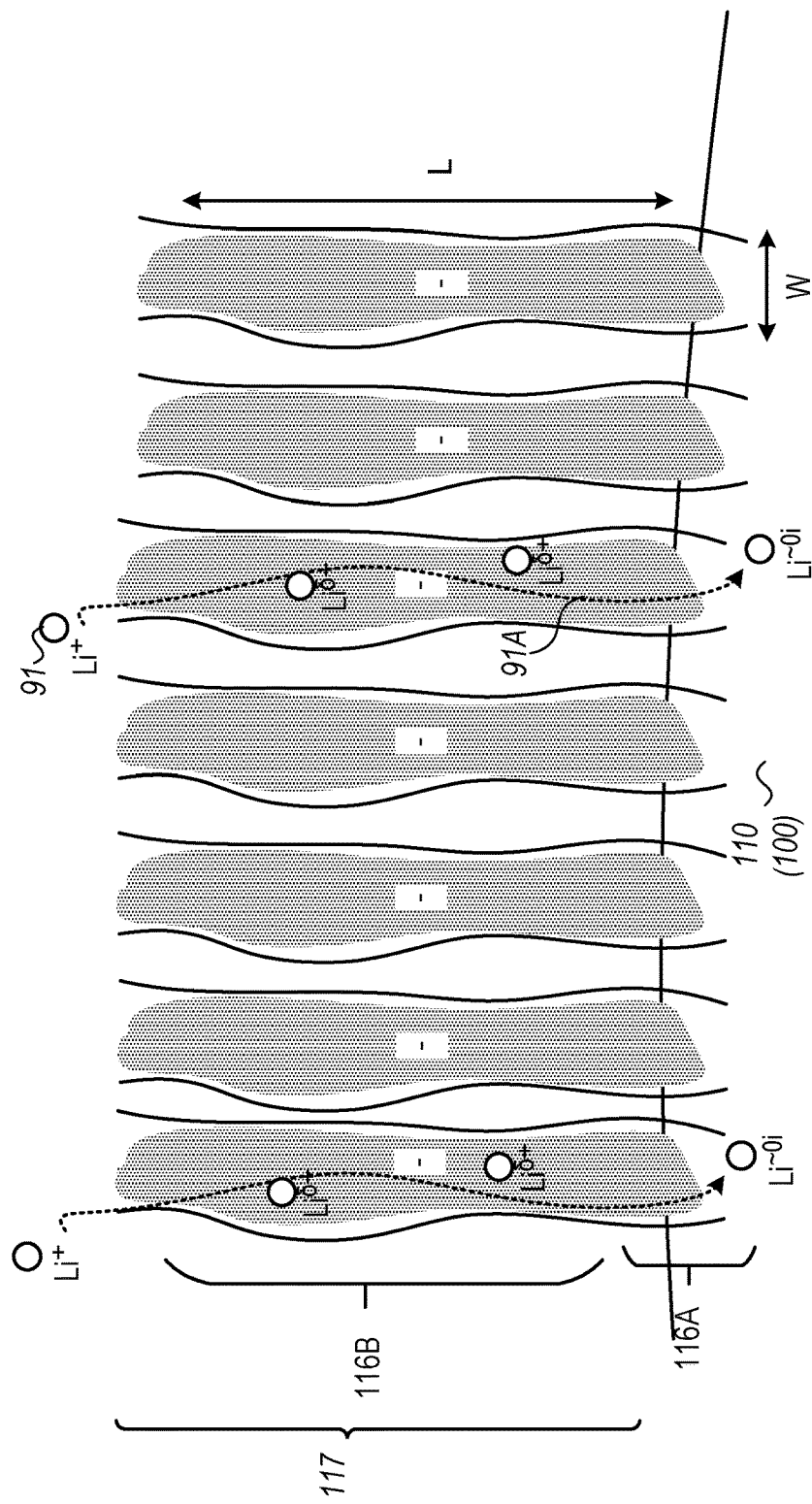
FIG. 7 is a high level schematic illustration of bonding molecules forming thick surface molecules layer on the anode and/or anode active material particles, according to some embodiments of the invention.

FIG. 7 is a high level schematic illustration of bonding molecules 116 forming thick surface molecules layer 117 on anode 100 and/or anode active material particles 110, according to some embodiments of the invention. In certain embodiments, bonding molecules 116 may extend deep into electrolyte 105 to form thick surface molecules layer 117 having a length L of more than ten benzene rings. For example, surface layer 117 may be thick to an extent of 10% or more of the distance between anode 100 and separator 86. The charge distribution on bonding molecules 116 in ionic conductive part 116B may be selected to be mobile and support lithium ion movement across molecules layer 117, possibly reducing the charge of the lithium ion to Li$^{δ+}$ as explained above, to prevent metallization on the surface of anode 110. Partial charge reduction may be carried out by electron rich groups such as aromatic groups and acidic groups disclosed above. Certain embodiments comprise surface molecules layer 117 having intermediate thickness of between 4-10 benzene rings.

Figure 8A:
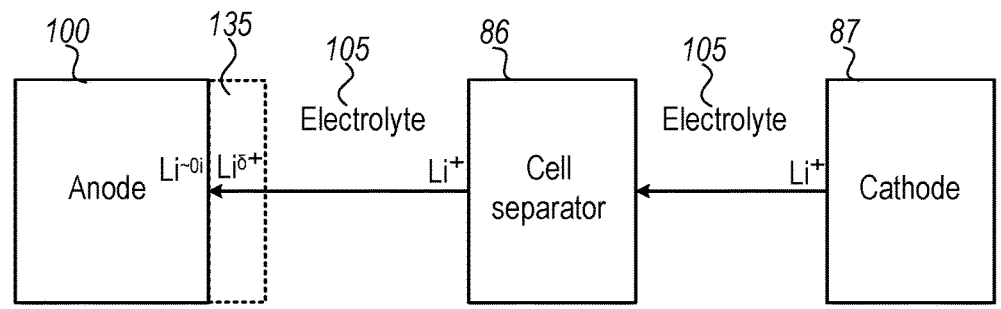
FIGS. 8A and 8B are high level schematic illustrations of a lithium ion cell with the electrolyte during charging, according to some embodiments of the invention.
Figure 8B:
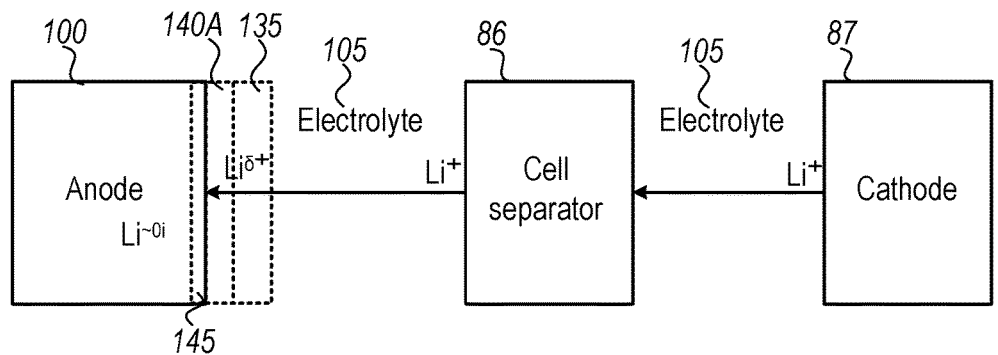

FIGS. 8A and 8B are high level schematic illustrations of a lithium ion cell 150 with electrolyte 105 during charging, according to some embodiments of the invention. Lithium ion cell 150 comprises a metalloid anode 100, comprising at least one of C, graphite, Si, Sn, Ge and Al, and electrolyte 105 comprising at most 20% of at least one ionic liquid as ionic liquid additive 135. Ionic liquid additive 135 may form a mobile SEI (e.g., in place of the (static) SEI, in addition to the SEI or in an interaction with the SEI) on anode 100, e.g., during charging, as illustrated in FIG. 8A and disclosed above.

In certain embodiments, electrolyte 105 may comprise at most 5% of the at least one ionic liquid. In certain embodiments, the at least one ionic liquid may comprise sulfonylimides-piperidinium derivatives ionic liquid(s). Ionic liquid additive 135 may be selected to have a melting temperature below 10° C., below 0° C. or below −4° C., in certain embodiments.

Layer 145 may be part of the anode surface or coated thereupon, and bind at least a part of ionic liquid additive 135 to hold at least stationary portion 140A of ionic liquid additive 135 at the anode surface to support the SEI, prevent decomposition of electrolyte 105 and prevent lithium metallization on anode 100. Layer 145 of bonding molecules 116 and/or layer 140A of bonded ionic liquid additive may also provide some negative electric charge that partly reduces the lithium ion, leaving them with a partial charge δ$^+$ and preventing full reduction and metallization of lithium on the anode surface.

Layer 145 of bonding molecules 116 and/or layer 140A of bonded ionic liquid additive may be configured to support gradient 120 described in FIG. 3A.

Figure 9:
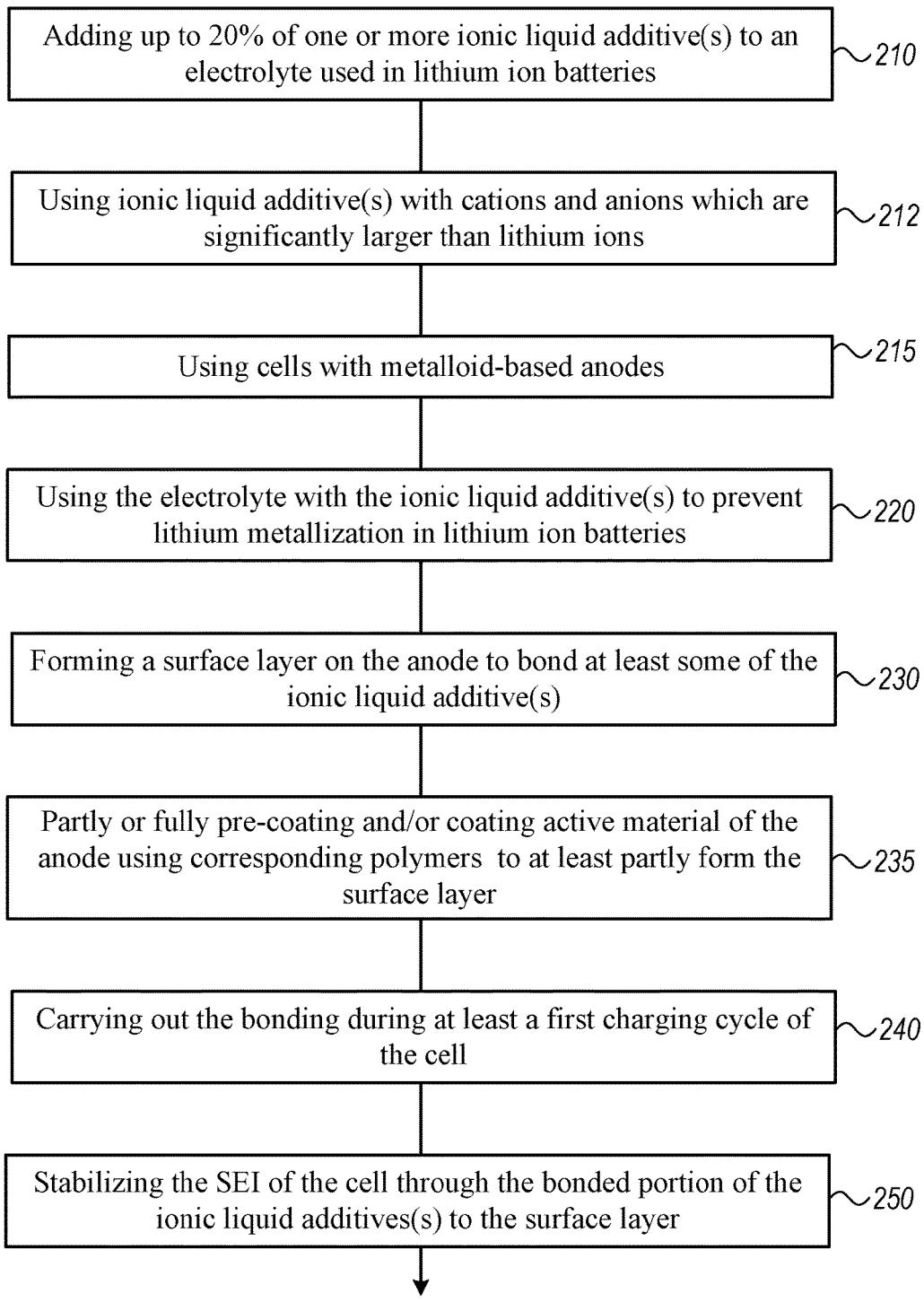
FIG. 9 is a high level flowchart illustrating a method, according to some embodiments of the invention.
Figure 9:
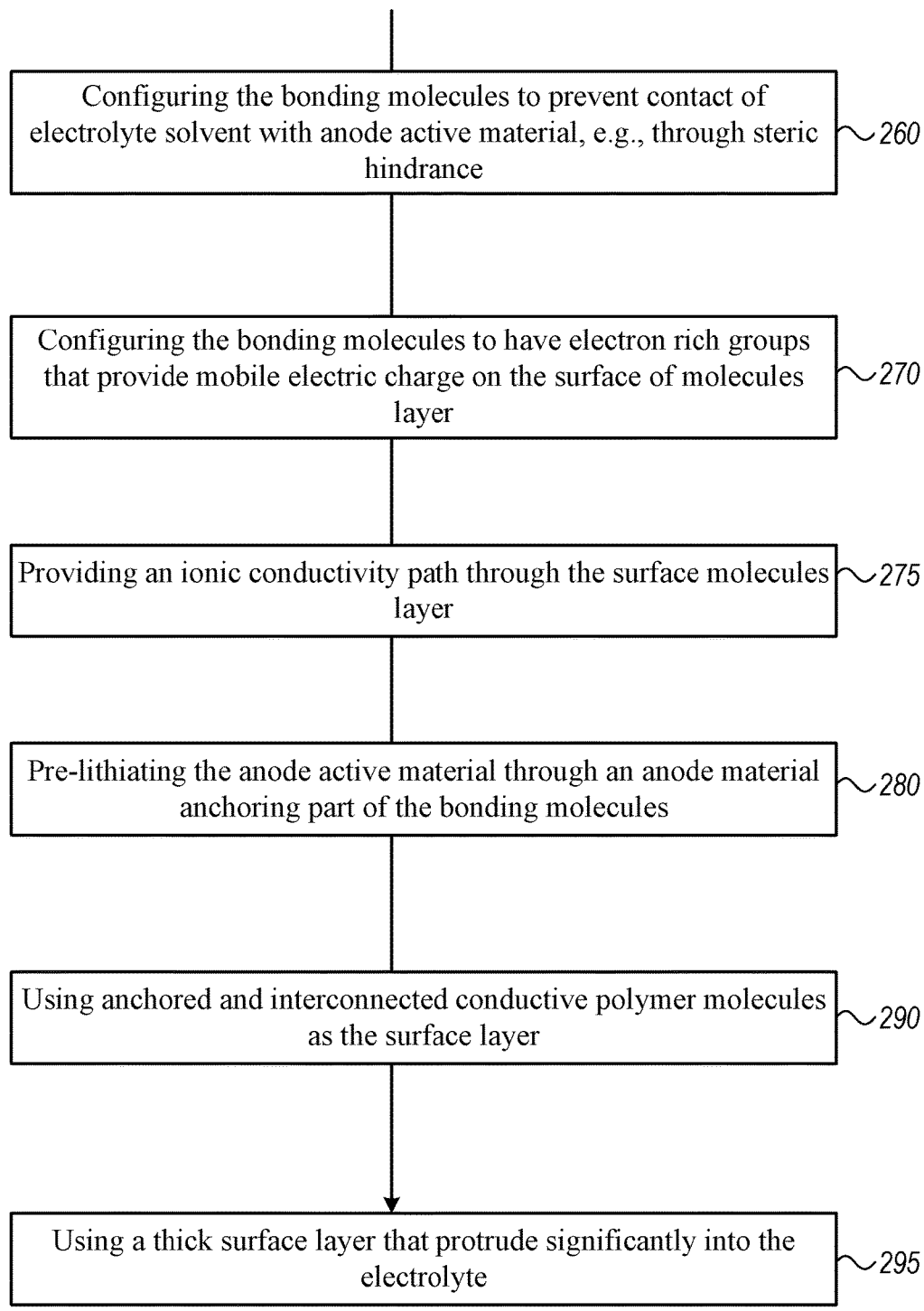

FIG. 9 is a high level flowchart illustrating a method 200, according to some embodiments of the invention. The method stages may be carried out with respect to cells 150 described above and lithium ion batteries constructed therefrom, which may optionally be configured to implement method 200. Method 200 may comprise stages for producing, preparing and/or using cells 150, such as any of the following stages, irrespective of their order.

Method 200 may comprise adding up to 20% of at least one ionic liquid to an electrolyte used in lithium ion batteries (stage 210), using metalloid-based anodes (stage 215), e.g., comprising at least one of C, graphite, Si, Sn, Ge and Al, and using the electrolyte with the ionic liquid additive to prevent lithium metallization in lithium ion batteries (stage 220). Method 200 may comprise selecting one or more ionic liquids to have cations and/or anions which are much larger than lithium ions, e.g., two to ten times the size (e.g., volume) thereof (stage 212). In certain embodiments, electrolyte 105 may comprise at most 5% of the at least one ionic liquid. In certain embodiments, the at least one ionic liquid may comprise sulfonylimides-piperidinium derivatives ionic liquid(s). Ionic liquid additive 135 may be selected to have a melting temperature below 10° C., below 0° C. or below −4° C.

In certain embodiments, method 200 may comprise forming a surface layer on the anode to bond (e.g., electrostatically and/or ionically) at least some of the ionic liquid additive(s) (stage 230), e.g., by coating the anode active material by various bonding molecules as disclosed above and/or partly or fully pre-coating and/or coating the active material using corresponding polymers (stage 235).

Method 200 may comprise carrying out the bonding during at least a first charging cycle of the cell (stage 240), possibly during several first charging and discharging cycles. In certain embodiments, the bonding of cations and/or anions may be carried out, at least partially, on the active material itself, even before the first charging cycle. The bonding of the ionic liquid to the bonding layer may be electrostatic and/or salt-like (ionic). In certain embodiments, the bonding may be at least partly covalent.

Method 200 may comprise stabilizing the SEI of the cell through the bonded portion of the ionic liquid additive(s) to the surface layer (stage 250).

Method 200 may further comprise configuring the bonding molecules to prevent contact of electrolyte solvent with anode active material, e.g., through steric hindrance (stage 260).

Method 200 may further comprise configuring the bonding molecules to have electron rich groups that provide mobile electric charge on the surface of molecules layer (stage 270), e.g., to provide an ionic conductivity path through the surface molecules layer (stage 275).

Method 200 may further comprise pre-lithiating the anode active material through an anode material anchoring part of the bonding molecules (stage 280).

Method 200 may comprise using anchored and interconnected conductive polymer molecules as the surface layer (stage 290). Alternatively or complementarily, method 200 may comprise using a thick surface layer that protrude significantly into the electrolyte (stage 295).

Figure 10A:
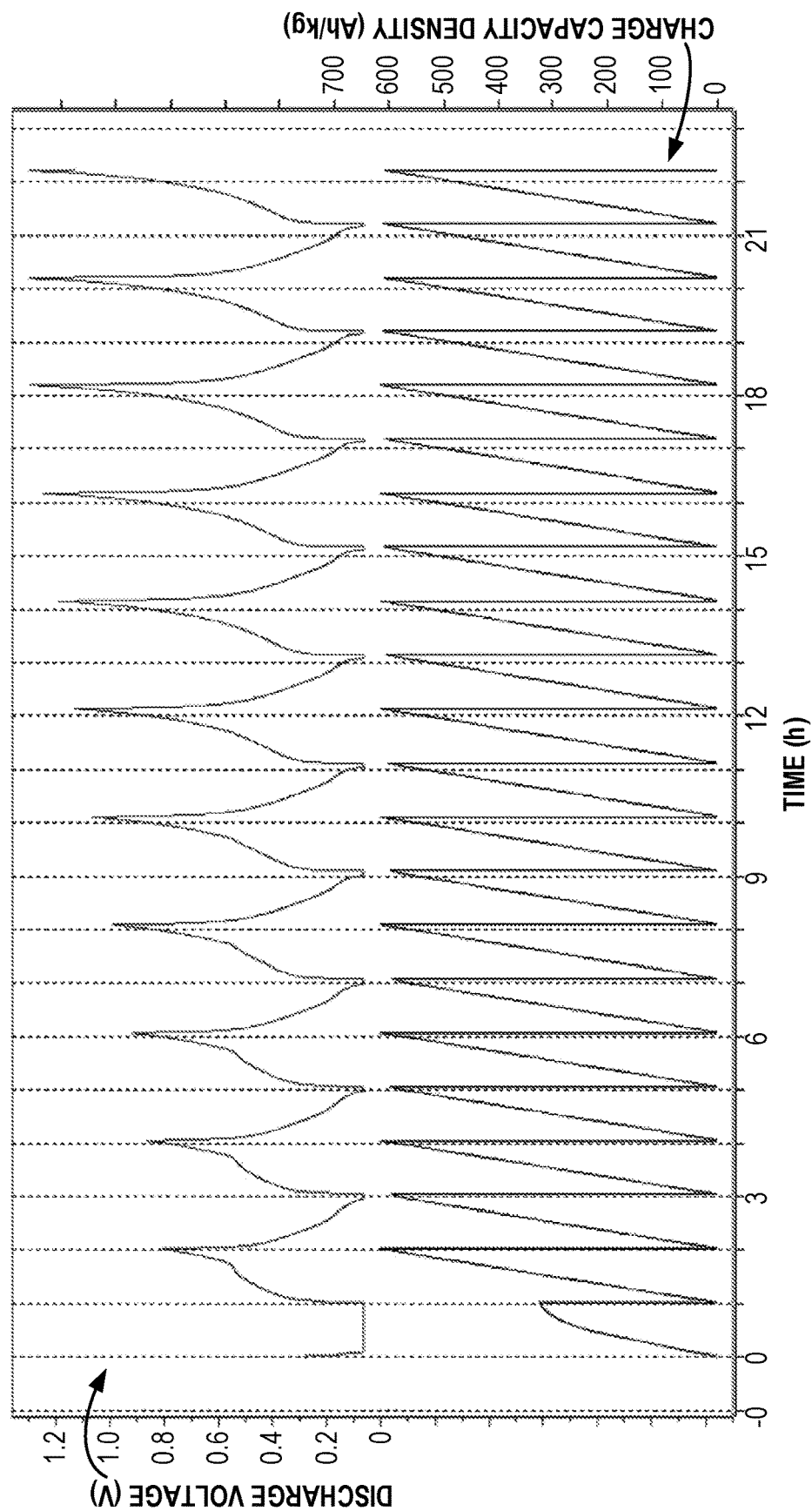

FIGS. 10A and 10B are non-limiting examples which indicate reversible lithiation at the anode when using the ionic liquid additive according to some embodiments of the invention (FIG. 10A) with respect to the prior art (FIG. 10B).

Charging and discharging cycles at IC (ca. 1 hour charging followed by 1 hour discharging) are shown for half-cells having anodes 100 operate with lithium as cathodes 87—in FIG. 10A with ionic liquid additive 135 being N,N-Diethyl-N-methyl-N-propylammonium (cation 132) and bis(fluorosulfonyl)imide (anion 131) (electrolyte 105, with 1% ionic liquid additive 135) and in FIG. 10B without ionic liquid additive 135 (electrolyte 85—FEC:DMC (3:7) and 2% VC). The cycles were performed after four formation cycles at 0.03 C (discharge to 80% of the capacity) followed by one cycle at 0.1 C, limited by capacity. Without being bound by theory, the continuous rise in the discharge voltage from cycle to cycle (while the capacity during charging and discharging remains constant at ca. 600 mAh/gr) in FIG. 10A (in contrast to FIG. 10B) is understood as indicating the reversibility of lithium excess in the anode (e.g., lithiated lithium during the first slow cycles) facilitated through the ionic liquid additive preventing the lithium ions from binding to the anode active material permanently and/or possibly contributing to formation of a relatively lithium poor SEI.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
adding, into a carbonate-containing electrolyte of a lithium ion battery, up to 10 percent by volume of at least one ionic liquid, which consists of cations and anions,
forming, during charging of the lithium ion battery and at surfaces of anode material particles thereof, a mobile layer comprising at least some of the cations, and
establishing a gradient of electric charge at the mobile layer during charging of the lithium ion battery, to provide an interphase transition between the electrolyte and the anode material particles, the gradient configured to have a gradual change of parameters which gradually reduces an activation energy of a reduction reaction of lithium ions being charged from the electrolyte into the anode material particles.

2. The method of claim 1, further comprising selecting the cations and/or anions to be at least 50% larger in volume than lithium ions, preventing lithium metallization at the anode material particles by steric hindrance.

3. The method of claim 1, further comprising selecting the cations and anions to have molecular shapes that prevent, by steric hindrance, lithium metallization on the anode material particles.

4. The method of claim 1, further comprising selecting the at least one ionic liquid to have a melting temperature below 0° C.

5. The method of claim 1, further comprising selecting the cations to comprise at least one piperidinium, substituted or unsubstituted.

6. The method of claim 1, further comprising selecting the anions to comprise at least one sulfonylimide, substituted or unsubstituted.

7. The method of claim 1, wherein the forming is carried out repeatedly during cycling of the lithium ion battery.

8. The method of claim 1, wherein the adding comprises less than percent by volume of the at least one ionic liquid, added into the carbonate-containing electrolyte.

9. A method comprising:
adding, into a carbonate-containing electrolyte of a lithium ion battery, up to 10 percent by volume of at least one ionic liquid, which consists of cations and anions,
forming, during charging of the lithium ion battery and at surfaces of anode material particles thereof, a mobile layer comprising at least some of the cations, and configuring the formed mobile layer to fill in cracks in the anode material particles.

10. The method of claim 1, further comprising producing the anode material particles from Ge, Si and/or Sn.

11. The method of claim 1, further comprising preparing the lithium ion battery with the carbonate-containing electrolyte and anodes made of the anode material particles and operating the prepared lithium ion battery through at least one cycle, to carry out the forming of the mobile layer controllably.

12. A method comprising:
adding, into a carbonate-containing electrolyte of a lithium ion battery, up to 10 percent by volume of at least one ionic liquid, which consists of cations and anions,
forming, during charging of the lithium ion battery and at surfaces of anode material particles thereof, a mobile layer comprising at least some of the cations, and
coating the anode material particles with a coating that binds at least some of the cations of the mobile layer.

13. The method of claim 12, wherein the coating comprises at least one lithium sulfonate, substituted or unsubstituted.

14. The method of claim 1, further comprising coating the anode material particles with a coating that binds at least some of the cations of the mobile layer.

15. The method of claim 14, wherein the coating comprises at least one lithium sulfonate, substituted or unsubstituted.

16. The method of claim 9, wherein the forming is carried out repeatedly during cycling of the lithium ion battery.

17. The method of claim 9, further comprising selecting the cations and/or anions to be at least 50% larger in volume than lithium ions, preventing lithium metallization at the anode material particles by steric hindrance.

18. The method of claim 9, further comprising selecting the cations and anions to have molecular shapes that prevent, by steric hindrance, lithium metallization on the anode material particles.

19. The method of claim 9, further comprising selecting the at least one ionic liquid to have a melting temperature below 0° C.

20. The method of claim 9, further comprising selecting the cations to comprise at least one piperidinium, substituted or unsubstituted.

21. The method of claim 9, further comprising selecting the anions to comprise at least one sulfonylimide, substituted or unsubstituted.

22. The method of claim 9, further comprising producing the anode material particles from Ge, Si and/or Sn.

23. The method of claim 9, further comprising preparing the lithium ion battery with the carbonate-containing electrolyte and anodes made of the anode material particles and operating the prepared lithium ion battery through at least one cycle, to carry out the forming of the mobile layer controllably.

24. The method of claim 9, further comprising coating the anode material particles with a coating that binds at least some of the cations of the mobile layer.

25. The method of claim 24, wherein the coating comprises at least one lithium sulfonate, substituted or unsubstituted.

26. The method of claim 12, wherein the forming is carried out repeatedly during cycling of the lithium ion battery.

27. The method of claim 12, further comprising selecting the cations and/or anions to be at least 50% larger in volume than lithium ions, preventing lithium metallization at the anode material particles by steric hindrance.

28. The method of claim 12, further comprising selecting the cations and anions to have molecular shapes that prevent, by steric hindrance, lithium metallization on the anode material particles.

29. The method of claim 12, further comprising selecting the at least one ionic liquid to have a melting temperature below 0° C.

30. The method of claim 12, further comprising selecting the cations to comprise at least one piperidinium, substituted or unsubstituted.

31. The method of claim 12, further comprising selecting the anions to comprise at least one sulfonylimide, substituted or unsubstituted.

32. The method of claim 12, further comprising producing the anode material particles from Ge, Si and/or Sn.

33. The method of claim 12, further comprising preparing the lithium ion battery with the carbonate-containing electrolyte and anodes made of the anode material particles and operating the prepared lithium ion battery through at least one cycle, to carry out the forming of the mobile layer controllably.

34. The method of claim 9, further comprising establishing a gradient of electric charge at the mobile layer during charging of the lithium ion battery, to provide an interphase transition between the electrolyte and the anode material particles, the gradient configured to have a gradual change of parameters which gradually reduces an activation energy of a reduction reaction of lithium ions being charged from the electrolyte into the anode material particles.

35. The method of claim 12, further comprising establishing a gradient of electric charge at the mobile layer during charging of the lithium ion battery, to provide an interphase transition between the electrolyte and the anode material particles, the gradient configured to have a gradual change of parameters which gradually reduces an activation energy of a reduction reaction of lithium ions being charged from the electrolyte into the anode material particles.

36. The method of claim 1, further comprising configuring the formed mobile layer to fill in cracks in the anode material particles.

37. The method of claim 12, further comprising configuring the formed mobile layer to fill in cracks in the anode material particles.

* * * * *